(12) United States Patent
Buchner

(10) Patent No.: US 12,549,550 B2
(45) Date of Patent: Feb. 10, 2026

(54) DECENTRALIZED TRUST ESTABLISHMENT USING SENTIMENT

(71) Applicant: Block, Inc., San Francisco, CA (US)

(72) Inventor: Daniel Buchner, Austin, TX (US)

(73) Assignee: Block, Inc., Oakland, CA (US)

( * ) Notice: Subject to any disclaimer, the term of this patent is extended or adjusted under 35 U.S.C. 154(b) by 272 days.

(21) Appl. No.: 18/322,796

(22) Filed: May 24, 2023

(65) Prior Publication Data

US 2024/0396890 A1 Nov. 28, 2024

(51) Int. Cl.
*H04L 9/40* (2022.01)
(52) U.S. Cl.
CPC ............... *H04L 63/0884* (2013.01)
(58) Field of Classification Search
CPC .................................................. H04L 63/0884
See application file for complete search history.

(56) References Cited

U.S. PATENT DOCUMENTS

| | | | | |
|---|---|---|---|---|
| 9,356,971 | B1* | 5/2016 | McClintock | H04L 63/0853 |
| 2003/0187973 | A1* | 10/2003 | Wesley | H04L 61/45 |
| | | | | 709/224 |
| 2008/0022384 | A1* | 1/2008 | Yee | H04L 63/102 |
| | | | | 726/11 |
| 2008/0175226 | A1* | 7/2008 | Alperovitch | H04L 63/10 |
| | | | | 370/352 |
| 2008/0256619 | A1* | 10/2008 | Neystadt | H04L 63/10 |
| | | | | 726/5 |
| 2009/0300739 | A1* | 12/2009 | Nice | H04L 63/0884 |
| | | | | 709/225 |
| 2020/0127847 | A1* | 4/2020 | Yang | H04L 63/0876 |
| 2021/0385216 | A1* | 12/2021 | Khalil | H04L 9/50 |
| 2024/0396890 | A1* | 11/2024 | Buchner | H04L 63/0884 |

OTHER PUBLICATIONS

Buchner et al., "Decentralized Web Node", DIF, Available online at <https://identity.foundation/decentralized-web-hode/spec/#interfaces>, retrieved on Mar. 7, 2023, 46 Pages.

* cited by examiner

*Primary Examiner* — Ponnoreay Pich
(74) *Attorney, Agent, or Firm* — IP Spring

(57) ABSTRACT

Decentralized trust establishment using sentiment documents is described. In an implementation, a decentralized network of nodes is generated. A first entity is associated with a select node of the nodes. A user interface is presented including one or more options at an edge device of the first entity. The options support inputs specifying identification of a second entity, sentiment regarding the second entity, and supporting information describing why the sentiment is expressed towards the second entity. A plurality of sentiment documents are collected, respectively, from the plurality of nodes of the decentralized network. A sentiment is determined as associated with an entity by processing the plurality of sentiment documents. The determined sentiment is output.

20 Claims, 21 Drawing Sheets

1300

_US 12,549,550 B2_

DECENTRALIZED TRUST ESTABLISHMENT USING SENTIMENT

TECHNICAL FIELD

Decentralized networks provide a variety of functionality in connection with implementing and securely transferring data, examples of which include cryptocurrencies and cryptographic-based tokens, such as tokens for decentralized web applications implemented as part of a distributed state machine. Additional functionality has been developed that leverages decentralized networks.

BRIEF DESCRIPTION OF THE DRAWINGS

One or more embodiments of the disclosed technologies are illustrated by way of example and are not limited by the figures of the accompanying drawings, in which like references indicate similar elements.

DETAILED DESCRIPTION

Figure 1:
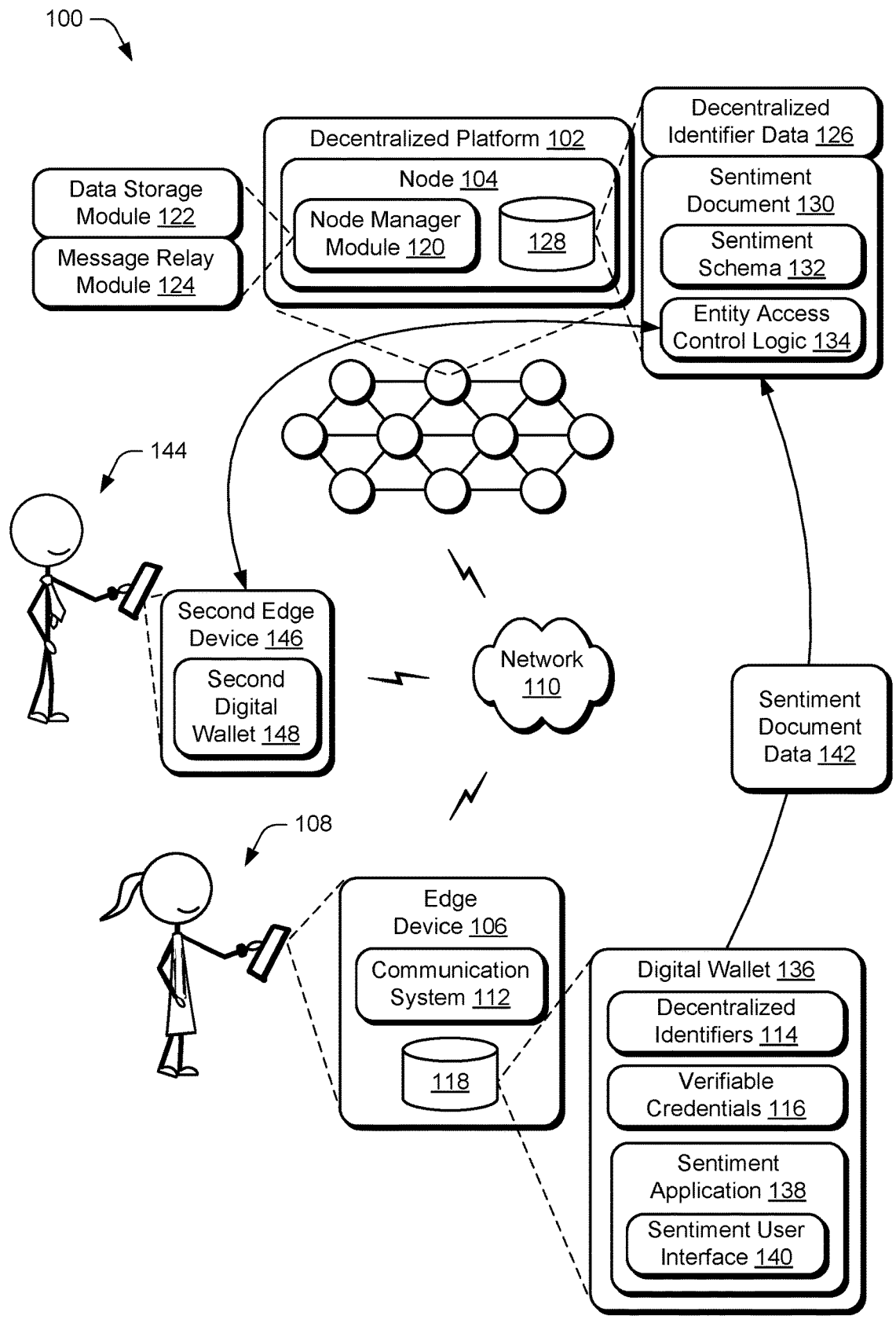
FIG. 1 is a non-limiting illustration of an example system that is operable to implement decentralized trust establishment techniques using sentiment documents as described herein according to an implementation of the present subject matter.

Establishment of trust is used as part of interactions (e.g., transactions involving resource transfer) both to ensure "an entity is who they say they are" as well as quantify past interactions of the entity, e.g., time to ship, reliability, and so forth. Conventional techniques used as part of centralized platform scenarios rely on a centralized authority. The centralized authority, for instance, is relied upon to manage identity and quantify entity actions, e.g., order fulfillment, time to pay. The centralized authority is also tasked with managing data describing a view other entities have with respect to that entity, e.g., remarks, reviews, ratings, and so forth involved in the platform.

Consequently, trust establishment in decentralized networks is challenged by the lack of such a centralized platform to correlate entities of the platform in a manner to establish trust. For example, a standard does not exist for expressing "what an entity thinks about other entities" in a decentralized network. Further, trust establishment is also challenged in conventional webpage networks due to a lack of a unified structure of the webpages to express data of interest.

To address these challenges, a sentiment document is maintained as part of a select decentralized node accessible via a decentralized identifier within a decentralized network. The sentiment document is used to publish a set of criteria usable to grade other entities and relationships with those entities. The sentiment document is exposed as part of the decentralized identifier and is "crawlable" as part of the decentralized network to learn sentiments entities have toward other entities. The sentiment document is configurable to support a rich range of information that is usable to describe a sentiment an entity has toward another entity as well as supporting (e.g., quantifiable) information for that sentiment, i.e., "why they think that." The sentiment document is thus usable to support a variety of functionality.

To do so in a general example, a decentralized identity resolver of a decentralized network is used by an originating entity to resolve a decentralized identifier associated with another entity. A sentiment document is made accessible at a decentralized node associated with the other entity. A schema and semantics of the sentiment document are then parsed for information deemed relevant by the originating entity. This process is repeatable for multiple decentralized identifiers to "crawl" a space defined by the decentralized identifiers, such as to generate one or more results relevant to an input provided by the originating entity.

In some examples, the sentiment is used to determine by a first entity what sentiment is expressed by a second entity regarding a third entity. In some cases, bidirectional sentiment control is also supported in which the second entity also references the sentiment expressed by the third entity. Bidirectional sentiment is usable, for instance, for the second entity to establish reputation and trust within the decentralized network based on the opinions of other entities. Bidirectional sentiment is also usable to provide the second entity with an ability to address sentiment expressed by the third entity towards the second entity.

A user, for instance, in a conventional example of trying to determine the most trusted suppliers for bacon by a particular entity is nearly impossible to perform using conventional search engines. However, use of the sentiment document in a decentralized network supports this determination through an ability for the particular entity (a bacon supplier in this example) to directly provide this information via a sentiment document. The sentiment document in the decentralized network provided by the entity (e.g., the bacon supplier and/or an entity that received a product from the supplier) is discoverable by parsing various sentiment documents based on an input provided by the user. Direct provision of this information supports a degree of control and security (e.g., by the bacon supplier in the ongoing example) that is not possible in conventional centralized approaches which are often invisible to an entity, if provided at all.

In a usage scenario, a sentiment document generation module is executed by a sentiment application to expose functionality to assist generation and maintenance of the sentiment document. The sentiment document generation module is usable, for instance, to expose a user interface to promote provision of inputs describing different sentiments. In one example, the module is configurable to parse a webpage, GS1 barcode (e.g., captured as a digital image by a camera of an edge device associated with the user), or other content (e.g., using natural language understanding as part of machine learning) and generate a user interface with drop down menus based on fields parsed from the content to provide additional information usable to form the sentiment document. Generative artificial intelligence ("AI") techniques are also usable in this scenario to generate the sentiment document. Implementation of the sentiment document is performable by leveraging corresponding APIs to support access to different "parts of the pie" of the sentiment document via access options input by the entity.

Weighting techniques are also usable to assign weights to different aspects of expressed sentiment, e.g., to derive an overall sentiment score associated with an entity. Weighting is performable in one example using an ensemble model of machine-learning models that are then weighted and adjusted over time. Generative AI techniques to generate a visualization of the resulting data are also contemplated, e.g., to derive an avatar visual based on the data for an entity, badges describing differing degrees of sentiment and associated criteria, and so forth.

In this way, the sentiment document supports a variety of functionalities. In one example, the sentiment documents are used to establish trust as part of performing a transaction. Consider a scenario, in which, a user navigates to a webpage of a merchant using a corresponding computing device to purchase an item of interest. A user interface output by the user's device includes an option to establish a level of trust (or other form of sentiment) associated with the merchant. Selection of the option causes a sentiment application of the computing device to crawl the decentralized network to obtain (e.g., access) sentiment documents generated by other entities that describe a sentiment those entities have towards the merchant, e.g., using generative artificial intelligence that employs machine-learning models to generate a sentiment score. The sentiment score is displayed in the user interface along with an option to continue the transaction. In this way, establishment of trust is supported in a decentralized scenario, which is not possible in conventional techniques. Further discussion of these and other examples is included in the following sections and shown in corresponding figures.

In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

FIG. 1 is a non-limiting illustration of an example system 100 that is operable to implement decentralized trust establishment techniques using sentiment documents as described herein according to an implementation of the present subject matter. The illustrated system 100 includes a decentralized platform 102 implemented using a plurality of nodes (e.g., web nodes, decentralized nodes), an example of which is illustrated as node 104. The system 100 also includes an edge device 106 as representative of functionality available at an "edge" of the system 100 to an entity 108, e.g., via respective computing devices. The node 104 of the decentralized platform and the edge device 106 are communicatively coupled, one to another, via a network 110. The edge device 106, for instance, includes a communication system 112 that includes hardware and software functionality to support network communication, e.g., including a modem, browser, a network-enabled application, an applet, and so forth.

Computing devices that implement the system 100 (e.g., the edge device 106) are configurable in a variety of ways. A computing device, for instance, is configurable as a server, a desktop computer, a laptop computer, a mobile device (e.g., assuming a handheld configuration such as a tablet or mobile phone), an IoT device, a wearable device (e.g., a smart watch), an AR/VR device, and so forth. Thus, a computing device ranges from full resource devices with substantial memory and processor resources to low-resource devices with limited memory and/or processing resources. Although in instances in the following discussion reference is made to a computing device in the singular, a computing device may also represent any number of different computing devices, such as multiple servers of a server farm utilized to perform operations "over the cloud" as part of a service provider system.

In accordance with the described techniques, the system 100 implements a decentralized platform 102 through use of decentralized identifiers 114 and verifiable credentials 116 that are illustrated as maintained in a local storage device 118 of the edge device 106. The decentralized identifiers 114 are configured as a self-owned identifier that supports decentralized authentication and routing. A self-owned identifier in a decentralized network is a unique identifier that is owned and controlled by an individual entity, also referred to as a "self-sovereign identity," as contrasted with an entity controlled by a centralized authority (e.g., service provider system) that is vulnerable to attacks, hacks, and data breaches. The verifiable credentials 116 employ a data format for cryptographic presentation and verification of claims.

The node 104 includes a node manager module 120 having functionality in support of communication and message relay between the nodes 104 of the decentralized platform 102 as well as with the edge device 106 via the network 110. Examples of functionality to do so include a data storage module 122 and a message relay module 124. The data storage module 122 is configured to collect and maintain decentralized identifier data 126, which is illustrated as maintained in a storage device 128. The decentralized identifier data 126 is formatted to support decentralized authentication and routing as performed by the message relay module 124, e.g., for communication between nodes and/or with the edge device 106.

The decentralized identifiers 114 are configurable without use of subjective consensus as implemented using a conventional centralized service provider, but rather are self-generated and self-owned. Persistence of the decentralized identifiers 114 is maintainable by the edge device 106 (e.g., via local storage device 118) of the entity 108 and are resistant to interruption or stoppage by outside forces or authorities. Decentralized identifiers 114 are also universally indexed and discoverable as part of the decentralized identifier data 126 as further described in relation to FIGS. 3 and 4.

The node 104 of the decentralized platform 102, as representative of one of a plurality of decentralized nodes (e.g., decentralized web nodes), supports data storage and relays that allows entities, service provider systems, individuals, organizations and so forth to send, store, and receive encrypted or public messages and data. The node 104 is universally addressable and is "crawlable" using data addressing in relation to the decentralized identifiers. The node 104 is also configured to support decentralized replication of data across the nodes that is "eventually consistent" (e.g., the data is consistent across the nodes over time through continued data communication between the nodes) through communication of instances across individual nodes in the decentralized platform 102. The node 104 is configurable to support secure encryption through use of a cryptographic key associated with an individual's decentralized identifier 114 and support semantic discovery to discover different forms of published data based on a corresponding semantic type.

Figure 3:
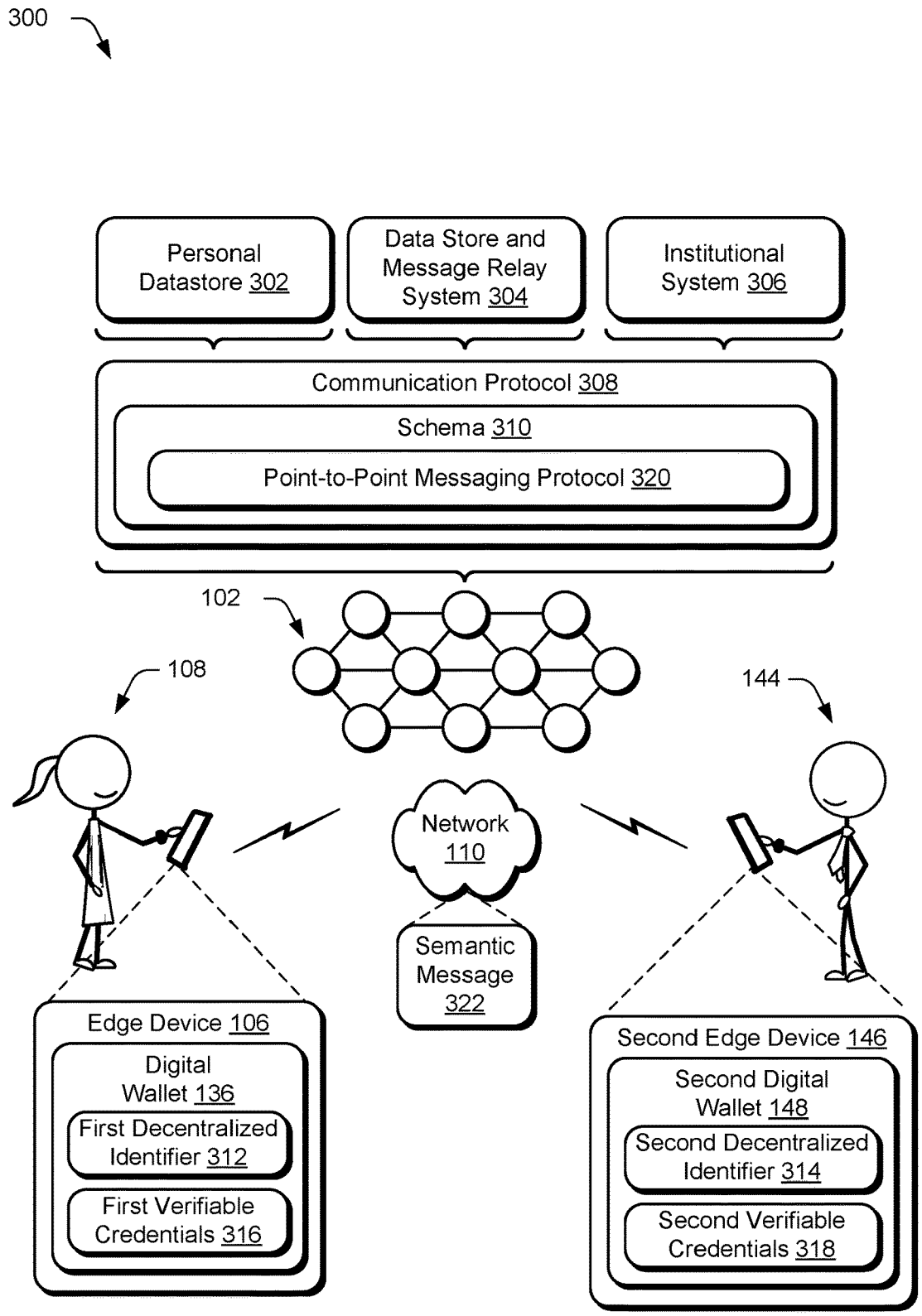
FIG. 3 is a non-limiting illustration of an example system that is operable to implement a resource transfer communication protocol and trust establishment techniques described herein according to an implementation of the present subject matter.

The node 104 is further configured to implement a sentiment document 130 implemented using a sentiment schema 132 and having entity access control logic 134, e.g., implemented using a distributed state machine of a decentralized web application as further described in relation to FIG. 3. The sentiment document 130 is configured to support control by the entity 108 of decentralized sentiment document data 142 made available via the sentiment document 130 to respective third-party service provider systems and/or entities of the decentralized platform 102. As such, the sentiment document 130 gives the entity 108 a degree of control of the access to the decentralized sentiment document data 142 that is not possible in conventional techniques that are maintained and centralized at a service provider system, itself. The sentiment document 130 may be configured to store a variety of data, such as text, images, video, audio, and so forth.

In order to generate the sentiment document 130, a digital wallet 136 is executed by an edge device 106. The digital wallet 136 is configured in this example to store cryptographic keys. The digital wallet 136 is configurable to associate the entity 108 with a select node 104 of the decentralized platform 102, which is accessible and locatable via a corresponding decentralized identifier 114. A decentralized identifier 114 of the entity 108, for instance, is usable by a second entity 144 as further described below to locate the sentiment document as associated with the entity 108.

The digital wallet 136 also includes functionality to generate and output a user interface and corresponding features to manage credentials and other data stored in a node 104 as part of a decentralized platform 102. As part of this functionality, the digital wallet 136 includes a sentiment application 138 that is executable to output a sentiment user interface 140 to generate the sentiment document 130 and entity access control logic 134 as executed by the node 104. The user interface is configurable to specify decentralized identity data that is stored as part of the sentiment document 130 as well as how the data is accessed, e.g., via respective APIs, as further described in relation to FIGS. 7-9.

In the illustrated example, the sentiment user interface 140 is output by the sentiment application 138. The sentiment user interface 140 is configured to support input of sentiment document data 142 through use of one or more options, which are generated by the sentiment application 138. The options support input specifying identification of an entity that is a subject of the sentiment document data 142, sentiment regarding the entity, and supporting information describing why the sentiment is expressed towards the entity. The sentiment document data 142 is configured in accordance with a sentiment schema 132 that describes "how" data is to be configured for access by a third party.

The sentiment document data 142 is then stored in a storage device 128 associated with a node 104 of the decentralized platform 102. The sentiment document 130, as associated with the entity 108, is locatable using corresponding decentralized identifiers 114. A second entity 144 associated with a second edge device 146, for instance, utilizes a corresponding second digital wallet 148 to access the sentiment document data 142 maintained as part of the sentiment document 130. Entity access and control logic 134, as specified by the entity 108, is used to control access to corresponding portions of the sentiment document data 142, control "how long" access is permitted, criteria regarding that access through use of verifiable credentials, and so forth.

The sentiment application 138, for instance, uploads the sentiment document data 142 for incorporation as part of the sentiment document 130. The sentiment document 130 is exposed via a corresponding node 104 of the decentralized platform 102 for access by other entities, e.g., the second entity 144. The second entity 144, in one or more examples, desires insight into a sentiment provided by the entity 108. To gain this insight, the second entity 144 executes a second digital wallet 148 by the second edge device 146 to resolve a corresponding decentralized identifier 114 associated with the entity 108. Upon resolution of the decentralized identifiers 114, access is controlled by the sentiment document 130 using entity access control logic 134. Once access is granted, the second digital wallet 148 obtains the sentiment document data 142 from the sentiment document 130, further discussion of which is included in the following examples.

Figure 2:
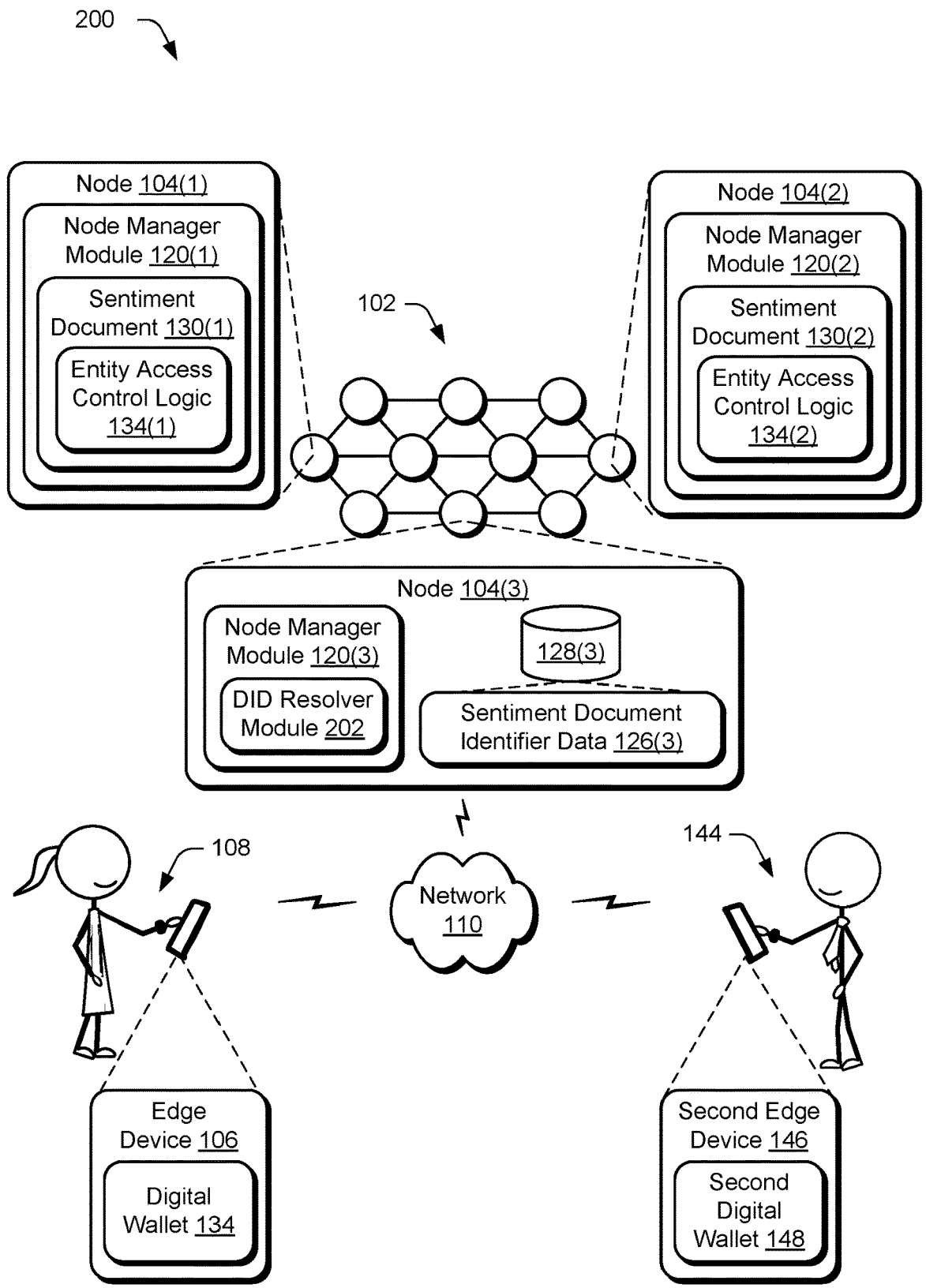
FIG. 2 is a non-limiting illustration of an example system depicting a topology of nodes as part of a decentralized network that are configurable to implement sentiment documents according to an implementation of the present subject matter.

FIG. 2 is a non-limiting illustration of an example system 200 depicting a topology of nodes as part of a decentralized network that are configurable to implement sentiment documents according to an implementation of the present subject matter. The system 200 includes an entity 108 and associated edge device 106 executing a digital wallet 136 as described in FIG. 1. The system 200 also includes a second entity 144 and associated second edge device 146 and a second digital wallet 148. The edge device 106, the second edge device 146, and the decentralized platform 102 are communicatively coupled, one to another, via the network 110.

Examples of the node 104 of FIG. 1 include a node 104(1) having a node manager module 120(1) as executing a sentiment document 130(1) and entity access control logic 134(1) as corresponding to the digital wallet 136 of the entity 108. Likewise, a node 104(2) is also included as executing a sentiment document 130(2) and entity access control logic 134(2) as corresponding to the second digital wallet 148 of the second entity 144.

Node 104(3) includes a node manager module 120(3) and decentralized identifier data 126(3) as maintained in a respective storage device 128(3). The node manager module 120(3) includes a DID resolver module 202 that is configured to resolve requests to locate decentralized identifiers and corresponding nodes associated with the respective entities.

In one example, the digital wallet 136 of the entity 108 is used to message the second digital wallet 148 of the second entity 144. To do so, the digital wallet 136 resolves a decentralized identifier associated with the second digital wallet 148 through communication with the DID resolver module 202 of node 104(3). A message is then sent based on the decentralized identifier from the digital wallet 136 to be included in the sentiment document 130(2) of the second entity 144. In examples, the message is formatted according to a standard that can be read by the second digital wallet 148. Further, in some cases, the message may be encrypted such that the second digital wallet 148 receives the message securely and is capable of decrypting the message. The message, for instance, is configurable as part of a universal standard to employ semantic constructs as part of a schema implementing a naming convention of the datatypes of objects included in the message. Configuration of the message using the semantic constructs enables entities that receive the semantic message to readily parse the message using the schema to locate desired data. The sentiment document 130(2), through execution by a respective node, communicates the message to the second digital wallet 148.

The second edge device 146 is also configurable to resolve a decentralized identifier through communication with the DID resolver module 202 of node 104(3) using the decentralized identifier data 126(3). The decentralized identifier is then used by the second digital wallet 148 to access the sentiment document 130(1) of the entity 108, data from which is then communicated back to the digital wallet 136 as executed by the edge device 106 as controlled by the entity access control logic 134(1). In this way, a combination of decentralized identifiers and decentralized nodes supports a web of decentralized-identifier-secured messaging, data sharing, and credential exchange as a replacement for one-off protocols with a universal standard for semantic data exchange that supports encryption. As a result, the decentralized platform 102 supports execution of decentralized applications that use decentralized identifiers and decentralized nodes to return ownership and control over trust establishment to respective entities.

FIG. 3 is a non-limiting illustration of an example system 300 that is operable to implement a decentralized network supported resource transfer communication protocol and trust establishment techniques described herein according to an implementation of the present subject matter. The illustrated system 100 includes the edge device 106, the second edge device 146, a second entity 144 and associated second edge device 146, a personal datastore 302, a data store and message relay system 304, and an institutional system 306 (as an example of a third-party service provider system) that are communicatively coupled, one to another, via the network 110. The institutional system 306 is configurable in a variety of ways as representative of third-party functionality incorporated as part of the example system 300. In some examples, the institutional system 306 incorporates functionality supportive of exchange of cryptographic and fiat currencies between the entities. Alternatively or additionally, the institutional system 306 is a subject of a sentiment expressed by a sentiment document 130, e.g., representative of a physical merchant, service provider, website, venue, artist, and so forth.

In accordance with the described techniques, the system 300 implements a communication protocol 308 configured to provide support for decentralized identities as well as resource transfer in this example. Trust establishment is also supported as part of the transaction through use of sentiment documents of FIG. 2. The communication protocol 308 incorporates various components, including decentralized identifiers and credentials as previously described as well as a schema 310. Examples of the decentralized identifiers include first decentralized identifier 312 implemented by the digital wallet 136 and second decentralized identifier implemented by the second digital wallet 148. Additionally, examples of credentials include first verifiable credentials 316 implemented by the digital wallet 136 and second verifiable credentials 318 implemented by the second digital wallet 148.

The schema 310 is employed as part of decentralized networks to define the format in which the data can be shared across the personal datastore 302, the digital wallet 136, the second digital wallet 148, and institutional systems 306. In one implementation, the personal datastore 302 changes the schema 310 based on the context of the request and other data, such as for personally identifiable information and distributed identifiers.

Decentralized identifiers (DIDs) are configurable as uniform resource identifiers (URIs) that associate a DID subject with a DID document, thereby supporting trustworthy interactions associated with that subject. Examples of the decentralized identifiers include a first decentralized identifier 312 associated with the digital wallet 136 and a second decentralized identifier 314 associated with the second digital wallet 148. Decentralized identifier (DID) documents, which are linked to the decentralized identifiers, are configurable as a metadata file that includes a variety of data elements, examples of which include cryptographic material and routing endpoints. Cryptographic material is usable by an entity that is associated with the decentralized identifier to provide control, e.g., through use of public keys, digital signatures, and so forth. Routing endpoints specify locations, at which, data with an entity that is associated with the decentralized identifier is exchanged and/or at which the entity is contacted. The routing endpoints, for instance, specify an personal datastore 302 having associated personal data storage and relay nodes used by a data store and message relay system 304.

The data store and message relay system 304 provides an interface, through which, to store, discover, and fetch data related to communications involved in a request, e.g., identity access, supported by the communication protocol 308. The data store and message relay system 304 supports use of a semantic message 322 and respective data interfaces (e.g., as inferential application programming interfaces (APIs)) in accordance with the schema 310 that are accessible without direct knowledge of a semantic type of data that is to be exchanged. A diverse set of interactions and flows are modeled within these interfaces as part of the schema 310 by externally codifying sets of message schemas and processing directives to form respective protocols.

The semantic message 322 employs the schema 310 as supporting a naming convention of the datatypes of objects included in the message. Configuration of the semantic message 322 enables entities that receive the semantic message 322 to readily parse the message using the schema 310, e.g., to determine whether the semantic message 322 is of interest to the entity and process it accordingly. As such, the schema 310 of the semantic message 322 helps support the distributed architecture of the communication protocol 308

Digital wallets (e.g., digital wallet 136, second digital wallet 148, as well as digital wallets for the institutional system 306) act as agents for individuals or institutions by facilitating exchanges with the institutional system 306 or other third-party service provider system. As such, digital wallets are configurable to support a variety of functionalities. Digital wallets, for instance, support secure encrypted storage for verifiable credentials as illustrated, e.g., the first and second verifiable credentials 316, 318. Digital wallets also support discovery of an institutional system 306 or other third-party service provider system by crawling the personal datastore 302.

A point-to-point messaging protocol 320 is implemented as part of the communication protocol 308 and data store and message relay system 304. The point-to-point messaging protocol 320 is used to implement secure communication between a digital wallet and the institutional system 306, e.g., to exchange data used to obtain and receive decentralized identity data.

The semantic messages 326 exchanged between the digital wallets and institutional system 306 (e.g., using the data store and message relay system 304 of the personal datastore 302) contains semantically defined objects adherent to the schema 310. The message objects also contain data usable by the entities to evaluate requests, verify credentials, and execute value exchanges. The semantic message 322 is configurable as a JavaScript Object Notation (JSON) object, which is signed by each entity from a sending entity to the receiving entity for each segment of the resource transfer. The semantic message 322 is encrypted in one example and employs programming hooks that enable a message handler service to receive the semantic message 322 in real time at the personal datastore 302 and process the messages as part of a data store and message relay system 304 in accordance with the semantics and rule set by the communication protocol 308 and schema 310 that are defined for a given message type. In this way, the identity data exchange is secured.

Figure 4:
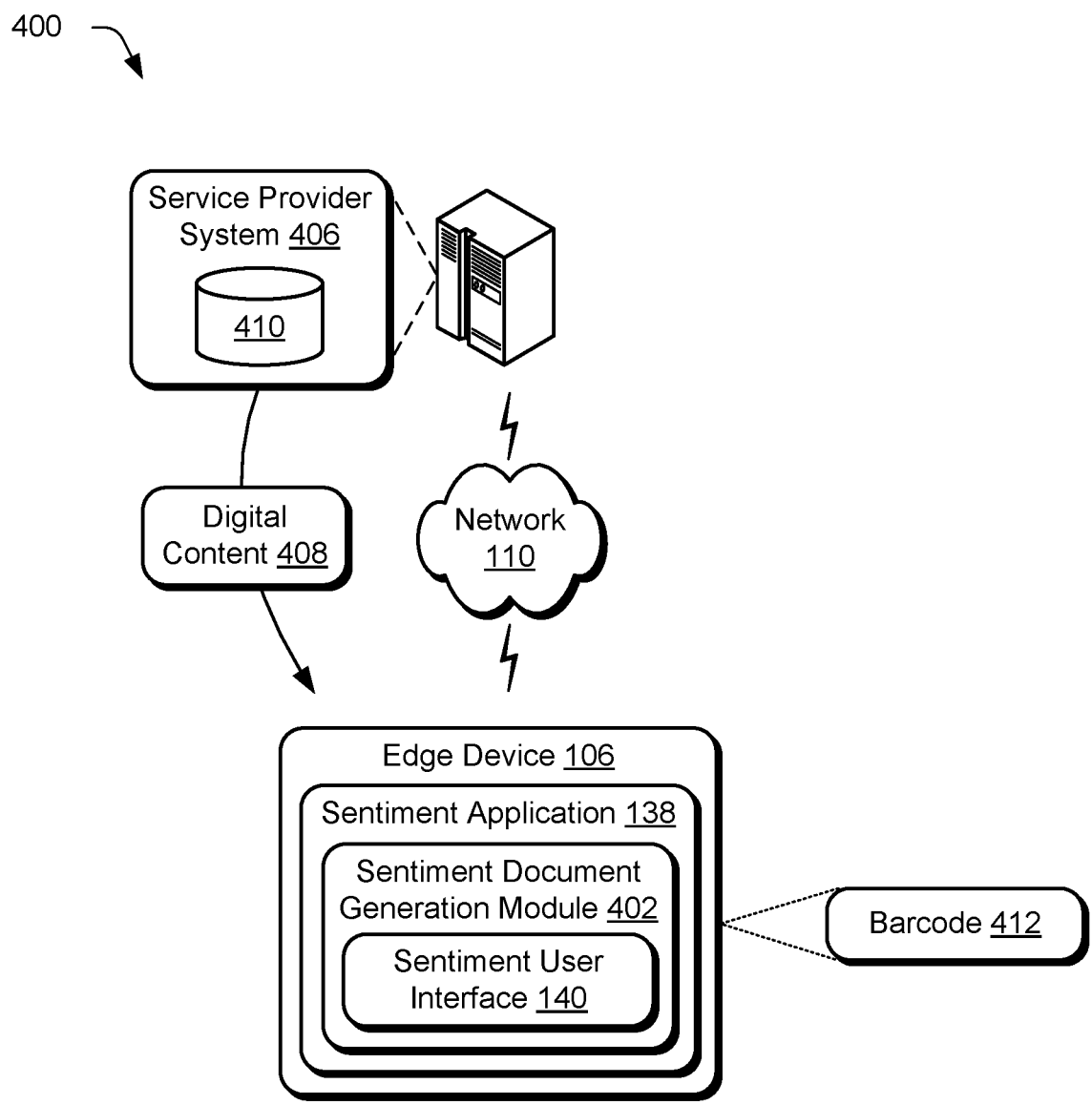
FIG. 4 is a non-limiting example showing operation of a sentiment application as supporting input of sentiment document data according to an implementation of the present subject matter.

FIG. 4 is a non-limiting example 400 showing operation of a sentiment application as supporting input of sentiment document data according to an implementation of the present subject matter. The sentiment application 138 is executed by an edge device 106. The sentiment application 138 includes a sentiment document generation module 402. The sentiment user interface 140 in this example is output by the sentiment document generation module 402 in support of user interaction to input sentiment document data that is maintained as part of the sentiment document 130 at the node 104.

The sentiment application 138 is configurable to obtain the sentiment document data in a variety of ways. The sentiment document generation module 402, in one example, is configured to receive a user input identifying a subject of the sentiment as further described in relation to FIG. 5. Examples of a subject of a sentiment include an entity associated with a physical establishment (e.g., a restaurant, brick and mortar location of a merchant, venue, etc.), an entity associated with a digital establishment such as an online store, media, a human being, an item of digital content, digital music, satisfaction with a point-of-sale system, and so forth. The sentiment document generation module 402 is then configured to obtain baseline data that acts as a starting point for entry of the sentiment document data, thereby improving user efficiency, reducing computational resource consumption, and reducing power consumption.

In a digital example, the identifier of the source of the sentiment (e.g., obtained via a webpage, social media identifier, and so forth) is used as a search query to a service provider system 406 to obtain digital content 408 from a storage device 410 that describes the source. The storage device 410, for instance, may be associated with a social media service, digital content streaming service, payment service, and so forth. The digital content 408 is then used as a basis to prepopulate the sentiment user interface 140. The sentiment document generation module 402, for instance, employs the sentiment schema 132 to determine a type associated with the entity (e.g., type of physical entity, type of digital content, and so forth) and then parses the digital content 408 to prepopulate the sentiment user interface 140.

A merchant service provider, for instance, generates a sentiment schema 132 defining "how" sentiments are to be expressed for corresponding merchants of a platform implemented by the merchant service provider. The sentiment schema 132 is usable to specify how different types of merchants, goods and/or services made available by those merchants, and sentiment regarding the goods or services are expressed. The sentiment schema 132, in examples, includes options usable to specify sentiments regarding digital services for an online merchant that specializes in online services and therefore does not include options for specifying sentiments such as "condition of package on delivery." Continuing with these examples, the sentiment schema 132 may specify options for a physical merchant relating to physical structures, e.g., condition of a hotel room, available parking, and so forth. Likewise, a merchant that provides online services that do involve physical objects is addressed by the sentiment schema 132 to include options relating to delivery time, package quality, and so forth. A variety of other examples are also contemplated, including use as part of trust verification as further described below.

In some instances, a camera of the edge device 106 is used to scan a physical representation associated with the entity, an example of which is illustrated as a barcode 412, e.g., a "GS1" barcode. Based on a digital image captured of the physical representation, the sentiment document generation module 402 is again configured to initiate a search query (e.g., using an identifier obtained from the digital image via the service provider system 406) to locate digital content 408 describing the entity.

Generative artificial intelligence (AI) techniques are then usable, along with the sentiment schema 132, to prepopulate the sentiment user interface 140, such as to configure drop-down menus with options taken from the digital content 408 based on the sentiment schema 132. For instance, sentiment document generation module 402 may initiate a search query based on a barcode and provide results of the search to a generative artificial intelligence (AI) model. The generative AI model may then generate a user interface having sentiment categories as drop-down menus, and/or selectable sentiment options as options of the drop-down menus, based on sentiments reflected in the results of the search. In this way, data storage and transmission can be reduced by focusing on relevant sentiment, in contrast to conventional systems that request sentiment information that may be irrelevant or redundant for a particular entity, product, service, or the like.

Figure 5:
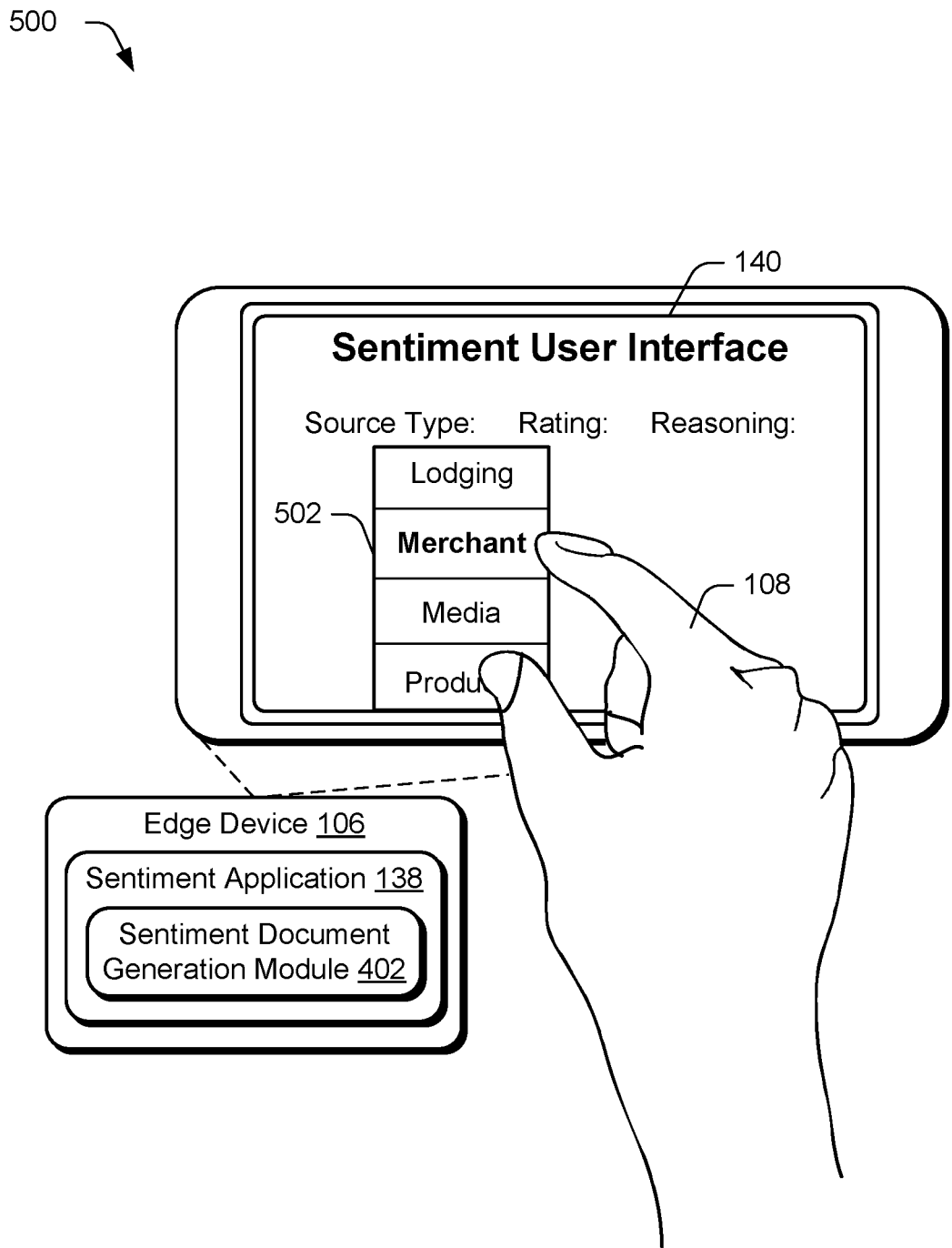
FIG. 5 is a non-limiting example showing a sentiment user interface of FIG. 4 in greater detail as supporting input of sentiment document data according to an implementation of the present subject matter.

FIG. 5 is a non-limiting example 500 showing a sentiment user interface of FIG. 4 in greater detail as supporting input of sentiment document data according to an implementation of the present subject matter. User inputs are then received via the sentiment user interface 140 from the entity to generate sentiment document data. The inputs, for instance, are configurable to select representations of a source type, rating, and reasoning for the rating via the sentiment user interface 140. In the illustrated example, a representation 502 of a source type of "merchant" is selected, which then causes output of a representation for "rating" and then "reasoning" for the rating. In this way, the entity 108 is provided with representations to increase efficiency by locating data describing the entity and configuring the user interface to include options that are usable to input sentiment regarding the entity. Supporting information is also enterable via the sentiment user interface 140 to describe why the sentiment is expressed towards the entity.

Figure 6:
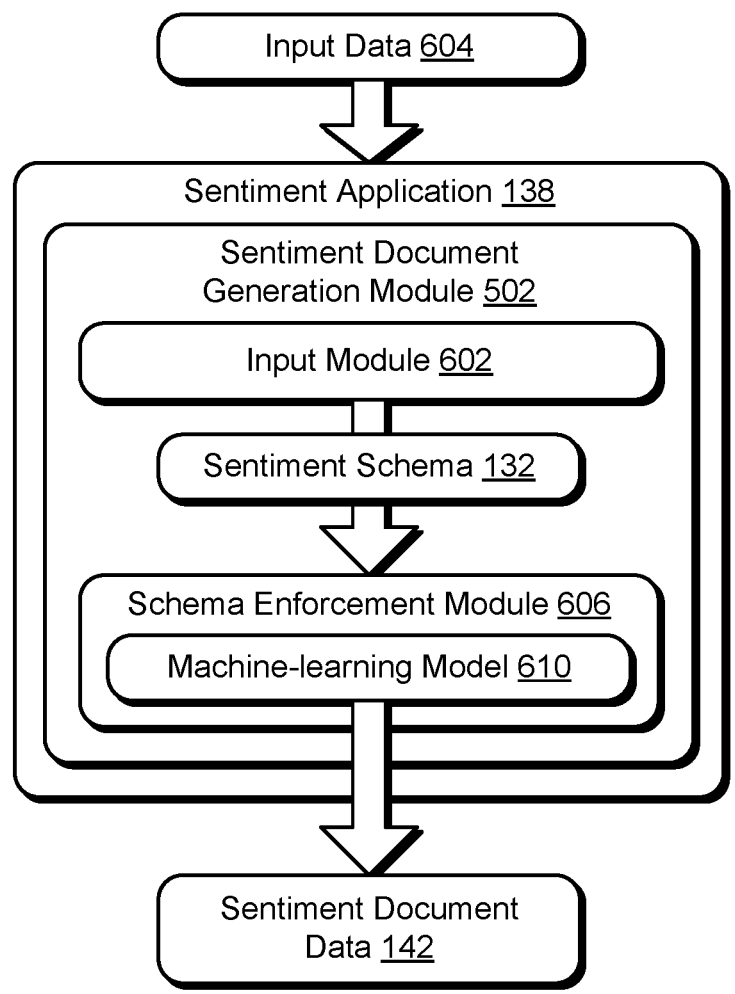
FIG. 6 is a non-limiting example showing operation of a sentiment document generation module of a sentiment application as supporting input of sentiment document data using a sentiment schema according to an implementation of the present subject matter.

FIG. 6 is a non-limiting example 600 showing operation of a sentiment document generation module of a sentiment application as supporting input of sentiment document data using a sentiment schema according to an implementation of the present subject matter. In this example, an input module 602 is tasked with obtaining input data 604 describing a sentiment towards a subject of the sentiment as described in relation to FIG. 5. The input module 602 is also configured to obtain the sentiment schema 132 which describes how data describing the entity associated with a sentiment, the sentiment, and a reasoning behind the sentiment is to be expressed as part of the sentiment document 130.

A schema enforcement module 606 is then utilized by the sentiment application 138 to generate the sentiment document data 142 as compatible with the sentiment schema 132 and as such is usable as part of the sentiment document 130. For instance, a machine-learning model 610 is employed to implement generative artificial intelligence techniques in the generation of the sentiment document data 142 from the input data 604 according to the sentiment schema. The schema enforcement module 606 is also configured to specify how the sentiment document data 142 is to be uploaded and accessed, e.g., via respective APIs as further described below.

The sentiment schema 132, for instance, defines a structure and format for the sentiment document data 142, which may include placeholders, specific instructions, or cues that guide the machine-learning model 610. The sentiment schema 132 is then tokenized and preprocessed into a form that is understandable by the machine-learning model 610, examples of which include lowercasing, removal of special characters, and other transformations. The machine-learning model 610 is conditioned on a training dataset that follows the sentiment schema 132 to train the model to learn patterns and inferences in achieving a corresponding output. The machine-learning model 610, once trained, is then usable to generate an output (e.g., text) based on a prompt (e.g., the input data 604) and predict a token sequence that has a highest probability that follows the input data 604 based on the sentiment schema 132. Postprocessing techniques are also employable by the schema enforcement module 606, e.g., for readability. The sentiment document data 142 is then output for inclusion as part of the sentiment document 130. In examples, the machine-learning model 610 is retrained based on postprocessing, user inputs to modify the output, user inputs to confirm the output, and so forth.

Figure 7:
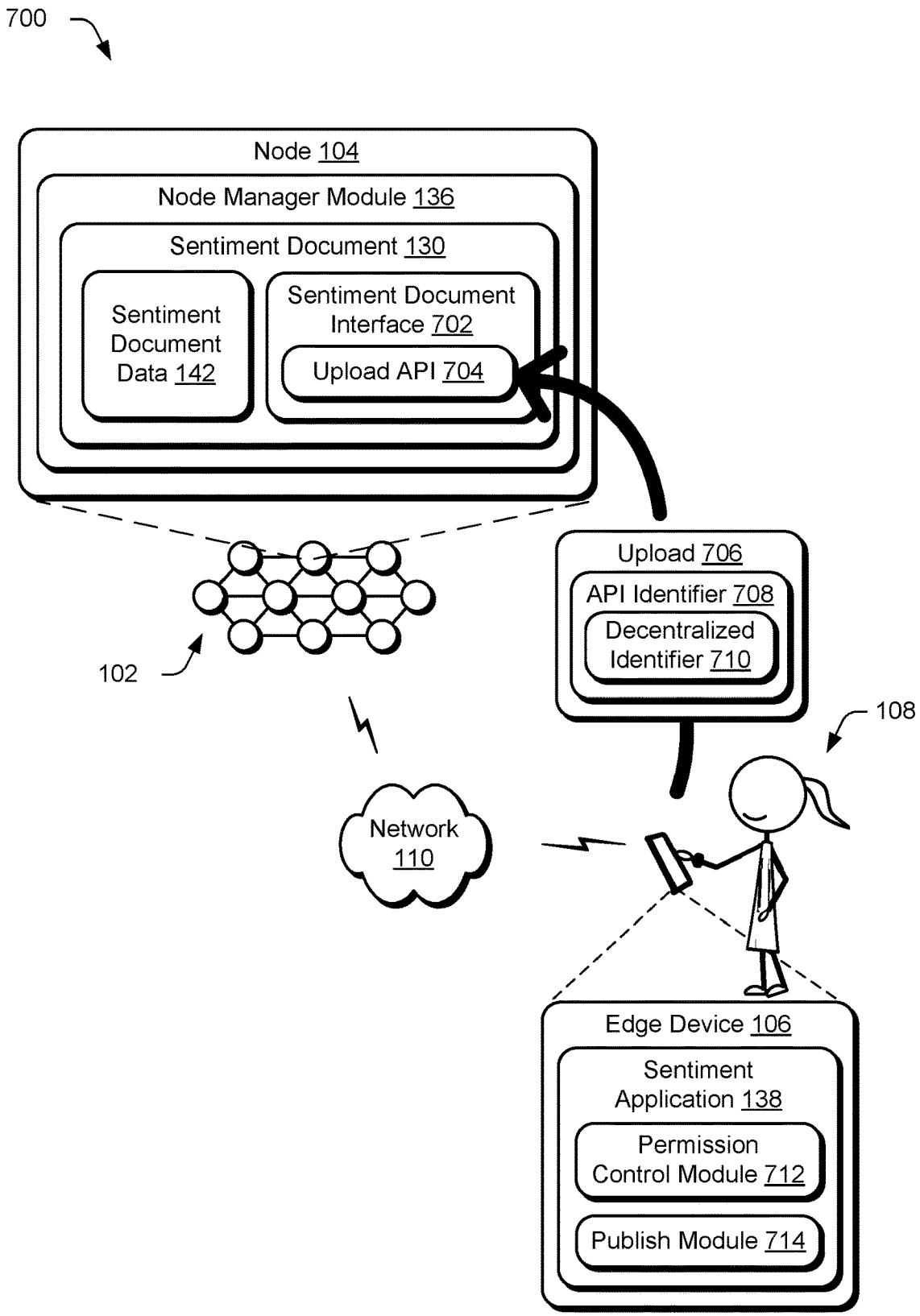
FIG. 7 is a non-limiting example showing operation of a sentiment application as performing an upload of the sentiment document data as generated via FIG. 6 for inclusion as part a sentiment document maintained by a node manager module of a node according to an implementation of the present subject matter.

FIG. 7 is a non-limiting example 700 showing operation of a sentiment application as performing an upload of the sentiment document data 142 as generated via FIG. 6 for inclusion as part a sentiment document 130 maintained by a node manager module 120 of a node 104 according to an implementation of the present subject matter. In examples, the sentiment application 138 accesses a sentiment document interface 702 of the sentiment document 130 as maintained by the node 104. The sentiment document interface 702 includes an upload API 704 that is configured to receive an upload 706 of the sentiment document data 142. The upload 706 in this example includes an API identifier 708 that identifies an API, via which, respective portions of the sentiment document data 142 are made available by entity access control logic 134 and a corresponding decentralized identifier 710.

The sentiment application 138, for instance, outputs an input user interface as shown in FIG. 6 that is also configured to specify a type of the data, an access point to be used to access the data (e.g., a particular application programming interface), access rules for access to the data via the API (e.g., to permit sharing and forwarding of the API), and the sentiment document data 142 itself. As previously described, a generative AI model may be used to generate classes of data, into which, the sentiment document data 142 is classified, generate the rules that control the use of the decentralized identity data, and the like. Once generated, the sentiment application 138 may provide a user interface to modify classes of data, which class(es) of data the sentiment document data 142 has been classified into, rules that control use of the sentiment document data 142, and so forth. Likewise, generative AI models may also be leveraged to generate the sentiment document data itself, including techniques used to collect, format, and edit the data for inclusion as part of the sentiment document.

The sentiment application 138 also includes functionality to control exposure of the sentiment document data 142 via the node 104. Examples of this functionality include a permission control module 712 and a publish module 714. The permission control module 712 is configurable to set access rules used to control access to corresponding portions of the sentiment document data 142. For example, the permission control module 712 may set an access rule that defines a particular entity or entities that can access a portion of the sentiment document data 142, while withholding the portion of the sentiment document data 142 from other entities. The publish module 714 is configured to support review of the sentiment document data 142 before publishing and permitting access via the decentralized platform 102.

Review of the sentiment document data 142, for instance, includes an ability to set access control rules, review the data for accuracy, confirm an entity's desires to expose this data publicly, and so forth. If acceptable, the publish module 714 is utilized to publish the sentiment document data 142 received via the upload 706 as being available as part of the sentiment document 130, e.g., via respective application programming interfaces.

Figure 8:
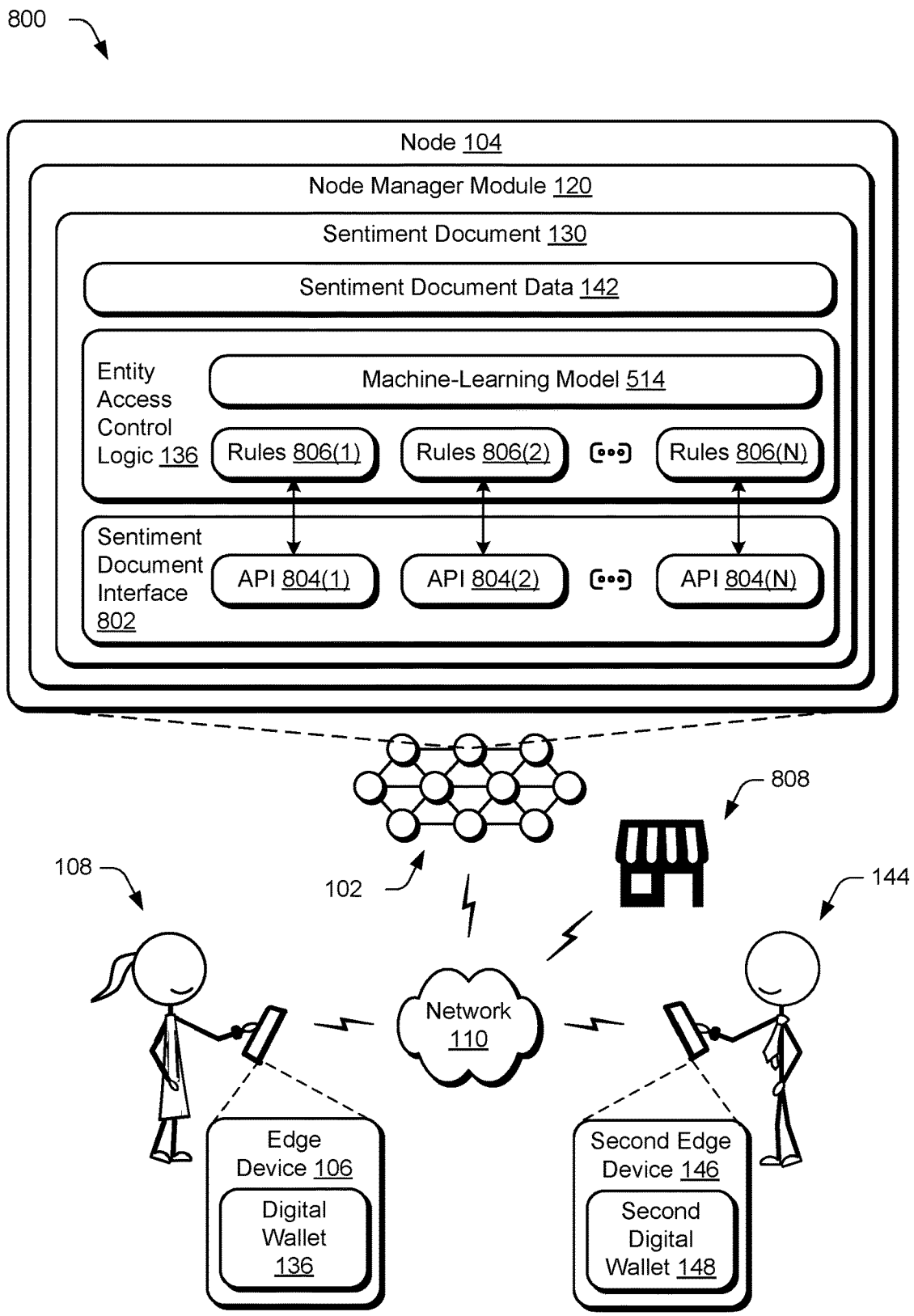
FIG. 8 is a non-limiting example showing operation of a sentiment document, as executed by a node, configured to control exposure of sentiment document data using respective application programming interfaces according to an implementation of the present subject matter.

FIG. 8 is a non-limiting example 800 showing operation of a sentiment document 130, as executed by a node 104, configured to control exposure of sentiment document data 142 using respective application programming interfaces according to an implementation of the present subject matter. The sentiment document 130 in this example includes a sentiment document interface 802 and entity access control logic 134. The sentiment document interface 802 includes a plurality of application programming interfaces, examples of which are illustrated as API 804(1), API 804(2), . . . , API 804(N).

Each of these APIs has associated rules 806(1), 806(2), . . . , 806(N) implemented as part of the entity access control logic 134 to control access to respective portions of the sentiment document data 142. Through use of the different APIs 804(1)-804(N), access is provided to different portions of the sentiment document data 142 to different entities and associated devices, e.g., to the second edge device 146 associated with the second entity 144.

The APIs 804(1)-804(N) are configurable in a variety of ways, such as uniform resource locators (URLs), uniform resource identifiers (URIs), through use of decentralized identifiers, and so forth. Decentralized identifiers (DIDs) are configurable as uniform resource identifiers (URIs) that associate a DID subject with a DID document, thereby supporting trustworthy interactions associated with that subject. Decentralized identifier (DID) documents, which are linked to the decentralized identifiers, are configurable as a metadata file that includes a variety of data elements, examples of which include cryptographic material and routing endpoints. Cryptographic material is usable by an entity that is associated with the decentralized identifier to provide control, e.g., through use of public keys, digital signatures, and so forth. Routing endpoints specify locations, at which, data with an entity that is associated with the decentralized identifier is exchanged and/or at which the entity is contacted, e.g., through use of the personal datastore 302 of FIG. 3 and/or the decentralized identifier data 126 of FIG. 1. Through use of the decentralized identifiers, access may be made available to a variety of entities in a variety of scenarios, further discussion of which is included in the following description.

In this way, the decentralized identifiers support access to a "big pie" of sentiment document data 142 that is portioned using the identifiers, e.g., via APIs for particular access rights. The APIs 804(1)-804(2), for instance, are configurable based on a type of entity and therefore sentiment document data 142 is locatable from the sentiment document 130 by accessing a corresponding API. An API 804(1), for instance, is configurable as relating to digital music and the sentiment document data 142 describes sentiments of the entity 108 towards respective items of the digital music. Accordingly, the second entity 144 may utilize a second digital wallet 148 to access these sentiments via the API 804(1).

In the illustrated example, a subject 808 of a sentiment is illustrated as a merchant. An API 804(2) is exposed by the sentiment document interface 802 of the sentiment document 130 to make available respective sentiment document data 142 corresponding to the merchant. Sentiment document data 142 describing an experience by the entity 108 with the merchant is therefore usable by the second entity 144 to establish and quantify an amount of trust to be given, e.g., in performing a transaction involving a resource transfer between the second entity 144 and the merchant as further described below. The quantifying, for instance, is performable using generative artificial intelligence implemented using one or more machine-learning models. In this way, the second entity 144 is provided with insight that is not possible in conventional centralized or decentralized networks.

Figure 9:
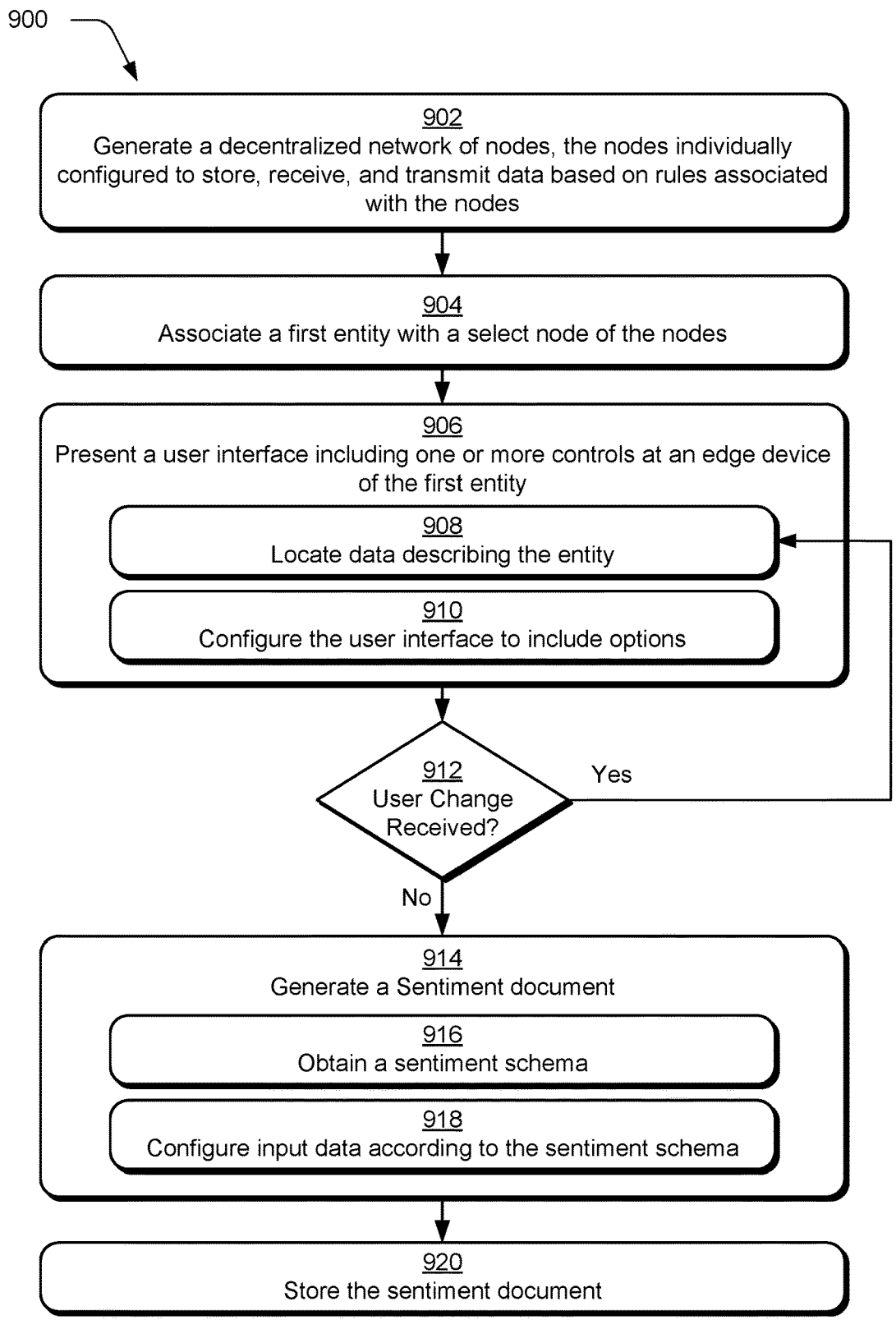
FIG. 9 is a flow diagram depicting a procedure in a non-limiting example of use of options in a user interface to generate a sentiment document of an entity at a selected decentralized node according to an implementation of the present subject matter.

FIG. 9 is a flow diagram depicting a procedure 900 in a non-limiting example of use of options in a user interface to generate a sentiment document of an entity at a selected decentralized node according to an implementation of the present subject matter. The following discussion describes techniques that are implementable utilizing the previously and/or subsequently described systems and devices. Aspects of the procedure are implemented in hardware, firmware, software, or a combination thereof. The procedure is shown as a set of blocks that specify operations performed by one or more devices and are not necessarily limited to the orders shown for performing the operations by the respective blocks.

To begin in this example, a network of decentralized nodes is generated that are individually configured to store, receive, and transmit data based on rules associated with the nodes (block 902). As shown in FIG. 1, for instance, the decentralized platform 102 is implemented using a plurality of nodes, an example of which is illustrated as node 104.

A sentiment document 130 of an entity is associated with a select node of the nodes 104(block 904). A digital wallet 136, for instance, selects the node 104 from the plurality of nodes, e.g., based on a decentralized identifier associated with the entity 108.

A user interface is presented including one or more options at an edge device (block 906). To do so, data is located that describes the entity (block 908), e.g., physically or digitally as described in relation to FIG. 5. The user interface is configured to include options (block 910) usable to provide input data that serves as a basis to generate the sentiment document.

The options support inputs specifying identification of a second entity, sentiment regarding the second entity, and supporting information describing why the sentiment is expressed towards the second entity. As shown in FIG. 5, for instance, a sentiment user interface 140 includes representations of "source type," "rating," and "reasoning" that are user selectable to generate corresponding input data. In an implementation, the sentiment user interface 140 is prepopulated by configuring digital content 408 according to a sentiment schema 132.

A determination is then made as to whether an input is received via the user interface as making a change using the options (decision block 912). If a change is made ("Yes" from decision block 912) data describing the entity based on the change is located (block 908) and used to reconfigure the user interface accordingly (block 910). In this way, the user interface is updated to dynamically react to edits. If so ("yes" from decision block 912), a sentiment document is generated (block 914) based on inputs received via the user interface. To do so, a sentiment schema is obtained (block 916) and the input data as received via the user interface configured according to the sentiment schema (block 918) and the sentiment document is stored (block 920).

In an example, the options are provided as user-friendly UI aspects for search, in which the options are implemented as search fields that are customizable based on an initial input and the schema. As part of this, generative AI techniques are usable to translate results into a natural language output, thereby improving processing resource efficiency over conventional systems that are tasked with parsing a natural language and format of input data, e.g., webpages.

The sentiment schema, for instance, describes how the input data is to be formatted and provided via respective APIs of the sentiment document 130. The generation is performable manually through interaction with a user interface and/or automatically and without user intervention using generative artificial intelligence techniques that leverage machine learning. A variety of other examples are also contemplated. Having described generation of the sentiment document 130 in relation to FIGS. 5-9, the following discussion transitions to a discussion of uses of the sentiment document.

Figure 10:
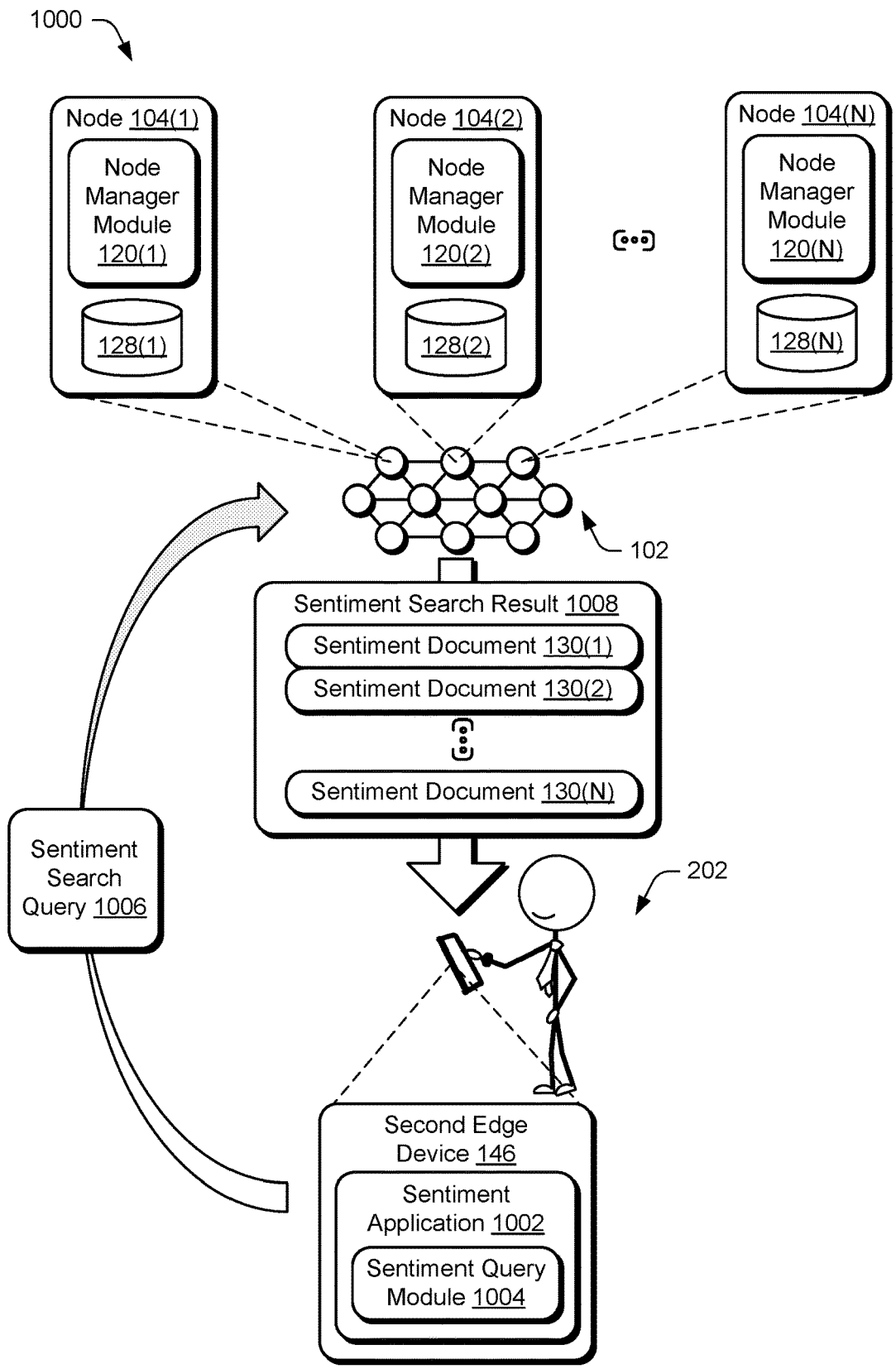
FIG. 10 is a non-limiting example showing operation of a second edge device to obtain sentiment documents usable to quantify a sentiment towards another entity according to an implementation of the present subject matter.

FIG. 10 is a non-limiting example 1000 showing operation of a second edge device to obtain sentiment documents usable to quantify a sentiment towards another entity according to an implementation of the present subject matter. In examples, the second entity 144 interacts with a sentiment application 1002 executed by the second edge device 146 to determine a sentiment held by other entities towards a particular entity. To do so, the sentiment application 1002 includes a sentiment query module 1004 that is configured to generate a sentiment search query 1006 that identifies a subject of a sentiment search.

The sentiment search query 1006, for instance, is input using techniques similar to those described in relation to FIG. 5 including digital scenarios in which an identifier of the subject of the subject of the sentiment search is obtained in a service provider system 406, e.g., via a webpage, social media identifier, title, address, and so forth. In some cases, physical techniques are employed, such as to scan a barcode 412 on a physical product, employ object identification as part of machine learning based on digital images captured of the product, and so forth.

Identification of the subject 808 of the sentiment is then resolved to locate sentiment documents in the decentralized platform 102. In the illustrated example, nodes 104(1), 104(2), . . . , 104(N) include respective node manager modules 120(1), 120(2), . . . , 120(N) and storage devices 128(1), 128(2), . . . , 128(N). For example, a DID resolver module 202 of FIG. 2 is configured to resolve requests to locate decentralized identifiers and corresponding nodes associated with the respective entities. The DID resolver module 202, for instance, maintains data (via crawling a sentiment document space) as to which decentralized nodes include sentiments regarding a respective entity. The requests are then sent to the nodes 104(1)-104(N) and a sentiment search result 1008 is received in response based on respective sentiment documents 130(1), 130(2), . . . , 130(N).

In some examples, the sentiment application 1002 of the second edge device 146 itself is used to crawl the decentralized platform 102 to locate the nodes 104(1)-104(N) and corresponding sentiment documents 130(1)-130(N). In a further example, the sentiment search query 1006 is sent as a broadcast to the decentralized platform 102 that identifies a particular subject 808. Node manager modules 120(1)-120(N) having sentiment documents 130(1)-130(N) that pertain to the subject 808 are then sent back as the sentiment search results 1008. A variety of other examples are also contemplated.

The sentiment documents 130(1)-130(N) and/or corresponding portions of the sentiment document data 142 are provided back as part of the sentiment search result 1008 in a variety of ways. In some cases the sentiment documents 130(1)-130(N) are obtained in their entirety. Alternatively or additionally, the DID resolver module 202 resolves the sentiment search query 1006 to particular APIs 804(1)-804(N) that correspond to the request. A search query for a music streaming service, for instance, is resolved by the DID resolver module 202 to a respective API via a respective decentralized identifier. A corresponding portion of the sentiment document data 142 is then received in response as part of the sentiment search result 1008. The sentiment search result 1008, once received, is usable by the sentiment application 1002 to quantify a sentiment towards a particular subject 808. The sentiment search query 1006, for instance, is usable to quantify a sentiment of the entity 108 towards a subject 808, which is then used by the second entity 144. For example, the sentiment search query 1006 is configured to determine the "top ten suppliers of bacon" to a retail merchant. Therefore, the sentiment search result 1008 in this example queries a node 104 associated with the retail merchant, accesses a sentiment document 130, and uses the sentiment document 130 to gain this information. As such, the sentiment document 130 provides a greater degree of accuracy of this information from the retail merchant, itself, as attesting to the information. These techniques are also "crawlable" to obtain a plurality of sentiment documents associated with a plurality of entities to determine commonalities, e.g., these are the top ten suppliers of bacon to 2000 retail merchants.

Bidirectional sentiment control is also supported in which a target entity references sentiment by other entities towards the target entity. The target entity, for instance, may expose data obtained from sentiment documents obtained from other entities that support sentiments towards the target entity. The data is also configurable to support verification, such as through links to the corresponding sentiment documents.

Bidirectional sentiment is also usable, for instance, for a target entity to establish reputation and trust within the decentralized network based on the opinions of other entities. As shown in greater detail in relation to FIG. 14, for instance, trust is established through collection of sentiment from other entities.

Bidirectional sentiment is further usable to provide a target entity with an ability to address sentiment expressed by another entity towards the target entity. Consider a scenario in which the other entity leaves a negative review and/or negative sentiment in a sentiment document. The sentiment document is configurable by the target entity to reference the negative review or negative sentiment and address it, either separately by the sentiment document of the target entity, itself, and/or in conjunction with the sentiment document of the other entity, e.g., as a "reply" to the expressed sentiment.

Figure 11:
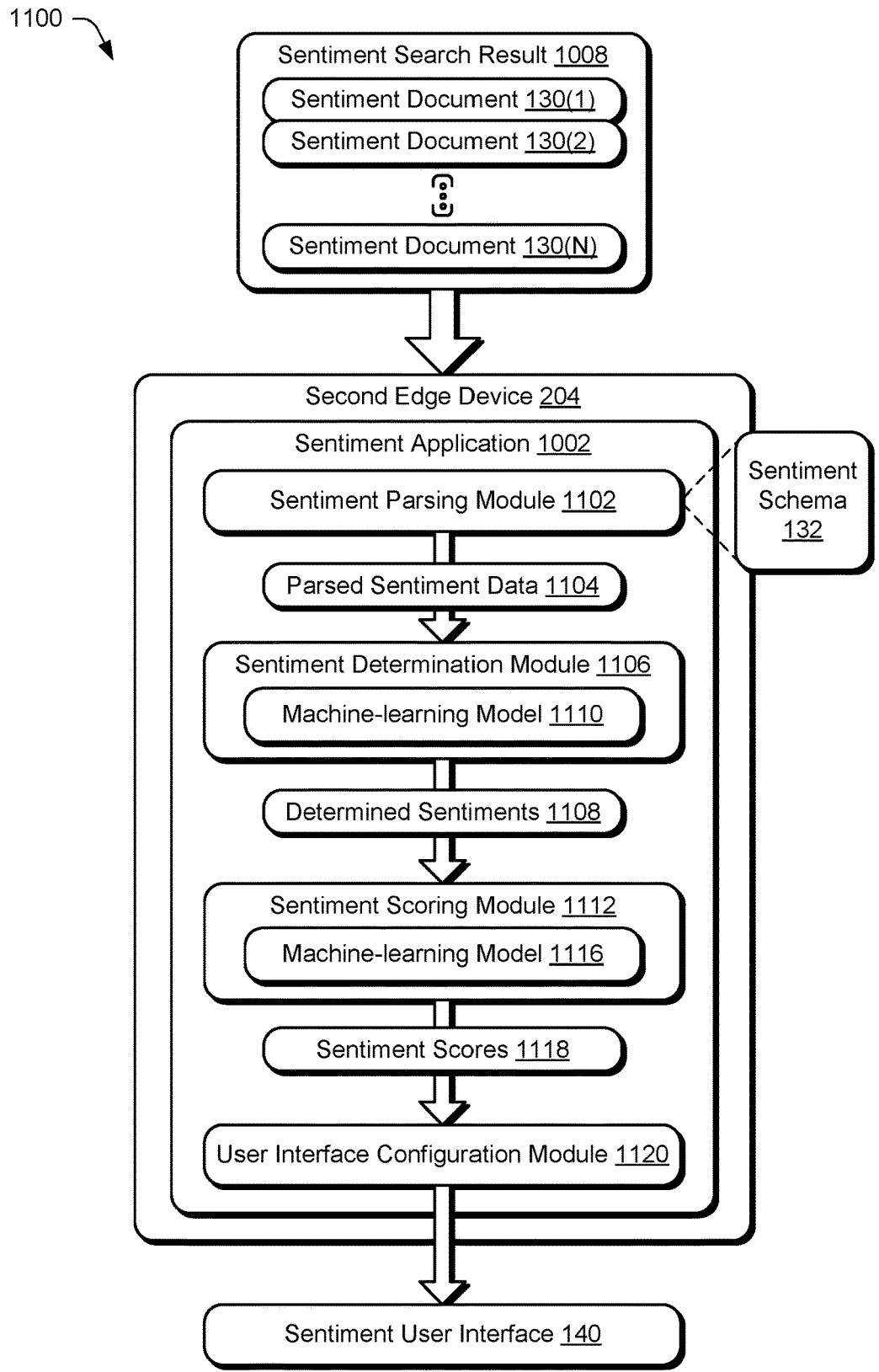
FIG. 11 is a non-limiting example showing operation of a second edge device to quantify a sentiment towards another entity based on access to sentiment documents as described in relation to FIG. 10 according to an implementation of the present subject matter.

FIG. 11 is a non-limiting example 1100 showing operation of a second edge device to quantify a sentiment towards another entity based on access to sentiment documents as described in relation to FIG. 10 according to an implementation of the present subject matter. To begin in this example, a sentiment search result 1008 is received by the sentiment application 1002 as executed by the second edge device 146. The sentiment search result 1008 includes sentiment document data obtained from a plurality of sentiment documents, which is illustrated as sentiment documents 130(1), 130(2), . . . , 130(N).

A sentiment parsing module 1102 is employed to generate parsed sentiment data 1104 from the sentiment search result 1008. To do so, the sentiment parsing module 1102 employs a sentiment schema 132. The sentiment schema 132 specifies how the sentiment document data 142 is to be stored as part of a sentiment document 130. Accordingly, the sentiment parsing module 1102 is usable to locate sentiment document data 142 from the sentiment document 130 that relates to a subject 808.

The sentiment parsing module 1102, for instance, identifies a type of entity that is a subject of the sentiment, e.g., a human being, merchant, business, item of digital content, or any other object that is subject to a sentiment. The sentiment parsing module 1102 also identifies data corresponding to a sentiment expressed towards that subject and, if available, data describing why that sentiment is expressed. The parsed sentiment data 1104 is then passed as an input to a sentiment determination module 1106.

The sentiment determination module 1106 is configured to determine sentiments based on the parsed sentiment data 1104. The sentiment determination module 1106, for instance, is employable to detect keywords that are indicative of sentiments, e.g., "liked it," "wouldn't go back," "best music track ever," and so on. In an implementation, a machine-learning model 1110 is employed.

The machine-learning model 1110, for instance, is trained to identify a plurality of sentiments, e.g., happy, dislike, disgust, enthusiasm, and so forth. A training dataset is then collected and preprocessed from a variety of sources that identifies a sentiment via respective labels, e.g., review and corresponding ratings from social media networks, product websites, review websites, and so forth.

The training dataset is processed using feature extraction to convert text into a form that is understandable by the machine-learning model 1110, e.g., Bag of Words (BoW), Word2Vec, and so forth. The machine-learning model 1110 is then trained based on the extracted features, such as a decision tree, support vector machine, logistic regression, neural networks, and so forth. Once trained and verified (e.g., for accuracy, precision, recall, etc.), the machine-learning model 1110 is configured to output the determined sentiments 1108 as expressed in the parsed sentiment data 1104.

The determined sentiments 1108 are then received as an input by a sentiment scoring module 1112 that is configured to generate sentiment scores 1118 that quantify an amount of sentiment expressed are part of the determined sentiments 1108. The sentiment scores 1118, for instance, are usable to define "how happy is happy" or "how bad is bad" as expressed by the determined sentiments 1108. In an implementation, the sentiment scores 1118 are also generated using a machine-learning model 1116 using natural language understanding to quantify an amount of sentiment. The machine-learning model 1116, for instance, is usable to assign a probability to each emotion category which are collectively weighted, classified, and/or employed as part of a regression task. The machine-learning model 1116 is also configurable to employ multi-label classification as further described in relation to FIG. 12 to generate the sentiment scores 1118.

Figure 12:
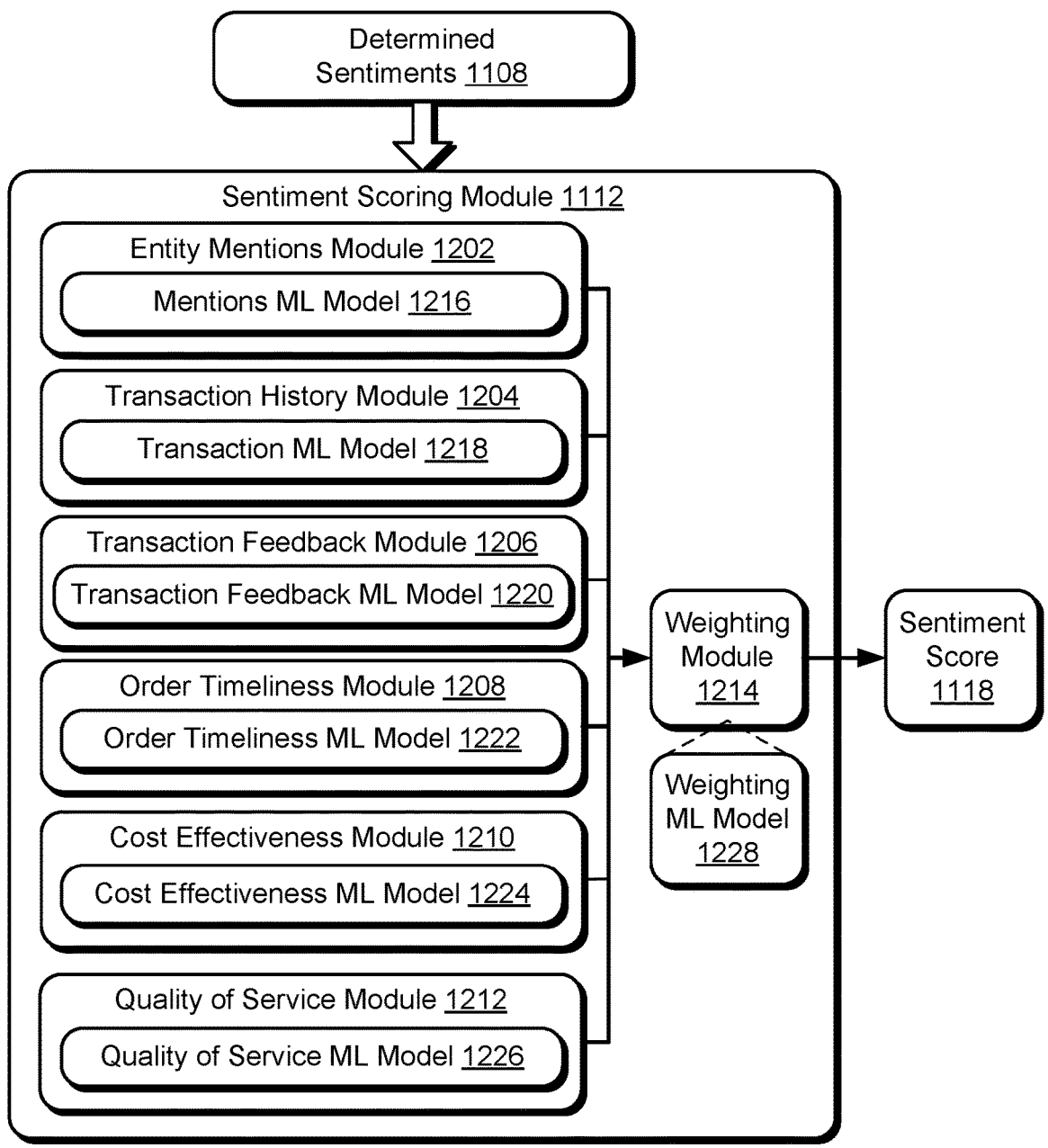
FIG. 12 is a non-limiting example showing operation of a machine-learning model to generate sentiment scores to quantify a sentiment towards another entity as an ensemble model implementing multi-label classification according to an implementation of the present subject matter.

FIG. 12 is a non-limiting example 1200 showing operation of a machine-learning model to generate sentiment scores to quantify a sentiment towards another entity as an ensemble model implementing multi-label classification according to an implementation of the present subject matter. Continuing with the previous example, the sentiment scoring module 1112 receives the determined sentiments 1108. The sentiment scoring module 1112 is configurable as described in FIG. 11 to quantify amounts of a particular sentiment, e.g., happiness on a scale of one to ten.

In this example, the sentiment scoring module 1112 is configured to quantify different types of sentiments, together, to arrive at an overall sentiment score 1118 for the entity that is a subject of the sentiment. In the illustrated example, the different types of sentiments are addressed using an entity mentions module 1202 which is configured to quantify a number of mentions by an entity via a digital service, e.g., social media. A transaction history module 1204 is configured to quantify sentiment based on a transaction history of a subject of the sentiments, e.g., a merchant. The transaction history, for instance, is usable to define a number of transactions, successful transaction completions, failure rate, chargebacks, and so forth.

A transaction feedback module 1206 is used to quantify sentiments regarding feedback that has been posted regarding and/or received by the entity. The transaction feedback module 1206, for instance, is usable to process reviews to quantify feedback received by the merchant. An order timeliness module 1208 is also included that is configurable to quantify order timeliness of transactions performed by a subject of the sentiment.

The cost effectiveness module 1210 is used to quantify sentiments regarding how cost effective transactions are considered with the entity that is a subject of the sentiment. Examples of which include cost effectiveness of individual products, cost effectiveness as a perception of the entity as a whole, and so forth. Likewise, a quality of service module 1212 is implemented to quantify a quality of service with respect to individual interactions, with the entity as a whole, and so forth.

In the illustrated example, a weighting module 1214 is employed to apply weights to respective outputs of the modules in order to generate an overall sentiment score 1118. The weights may be user selected via inputs received via a user interface, determined and adjusted automatically over time based on user feedback, and so forth.

Machine-learning model functionality is also usable by the sentiment scoring module 1112. Individual models, for instance, are trainable and retrainable over time to learn patterns from monitored user interaction and use of sentiments generated by respective modules. Examples of machine-learning functionality usable by the modules includes a mentions ML model 1216, transaction ML model 1218, transaction feedback ML model 1220, order timeliness ML model 1222, cost effectiveness ML model 1224, and quality of service ML model 1226. The weighting module 1214 is also configurable to employ machine-learning techniques to adjust weights applied to outputs of respective modules, where functionality to do so is represented by a weighting ML model 1228. The sentiment scores 1118 are then output by the sentiment scoring module 1112 to a user interface configuration module 1120 for representation in a sentiment user interface 140. The sentiment user interface 140 is configurable in a variety of ways to leverage use of the sentiment scores 1118, examples of which are described in the following examples.

Figure 13:
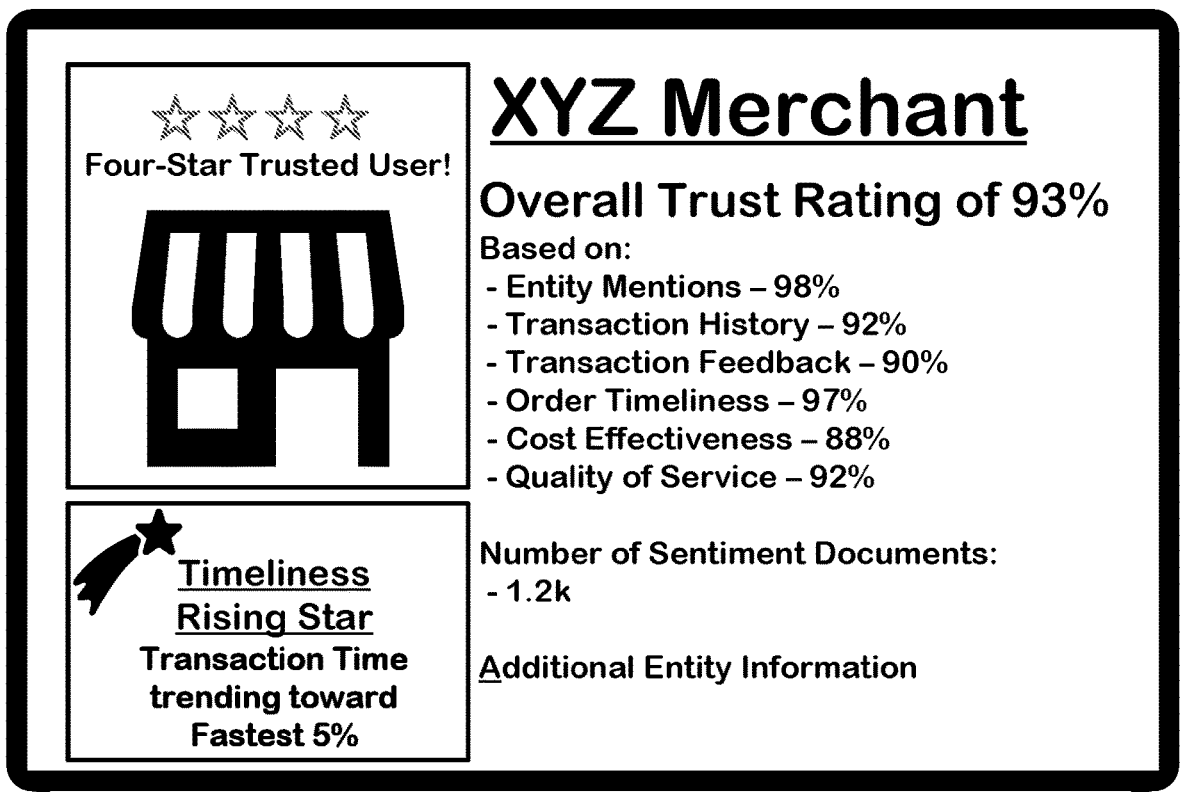
FIG. 13 is a non-limiting example showing operation of a sentiment application as outputting a sentiment user interface to quantify a sentiment towards another entity according to an implementation of the present subject matter.
Figure 13:
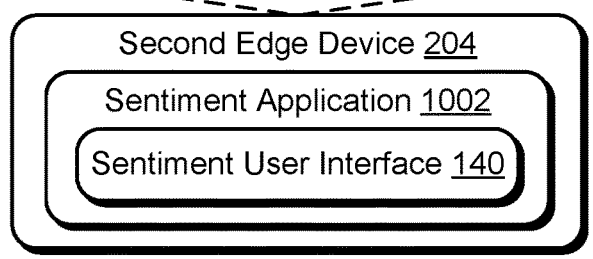

FIG. 13 is a non-limiting example 1300 showing operation of a sentiment application as outputting a sentiment user interface to quantify a sentiment towards another entity according to an implementation of the present subject matter. In this example, sentiment scores of a variety of types of sentiments are represented in numerous ways. The sentiment user interface 140, for instance, includes a text output over an overall trust rating for an entity "XYZ Merchant" that is a retail merchant, e.g., with an online and/or physical presence. The sentiment user interface 140 also includes a breakdown of sentiment scores for the types of sentiments, e.g., entity mentions, transaction history, transaction feedback, order timeliness, cost effectiveness, and quality of service.

Graphical representations are also generated, which in examples include badging as a "Four-Star Trusted User" and an indication of trends regarding sentiment associated with the entity, e.g., "Timeliness Rising Star." An indication is also provided of a number of sentiment documents that are user processed to serve as a basis for generating the scores. In an implementation, the indication is selectable to identify entities that provided the respective sentiments, how individual sentiments have been weighted, and so forth.

Figure 14:
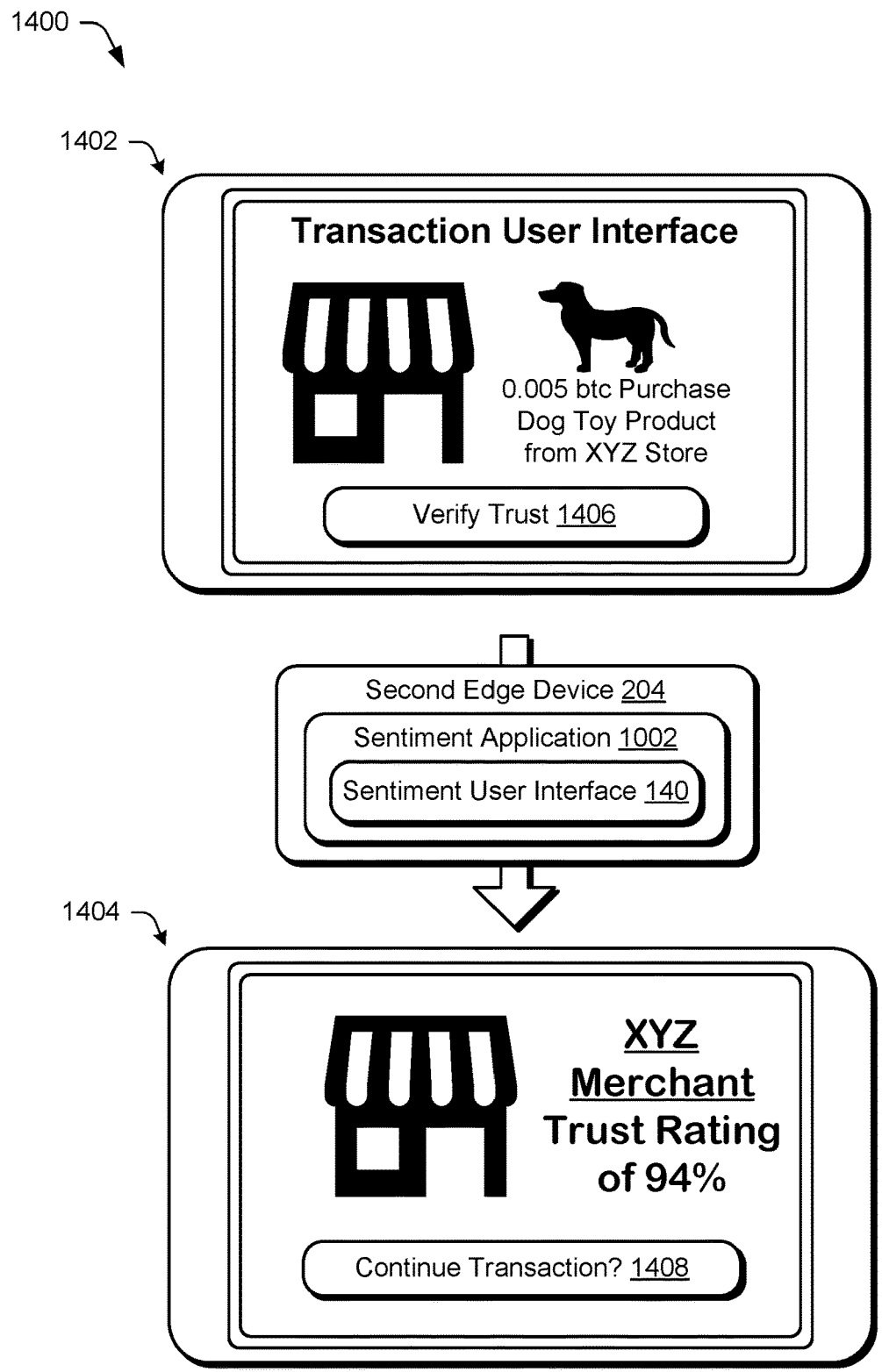
FIG. 14 is a non-limiting example showing operation of a sentiment application as outputting a sentiment user interface as part of decentralized trust establishment using sentiment documents according to an implementation of the present subject matter.

FIG. 14 is a non-limiting example 1400 showing operation of a sentiment application as outputting a sentiment user interface as part of decentralized trust establishment using sentiment documents according to an implementation of the present subject matter. This example is depicted using a first stage 1402 and a second stage 1404 in initiating a transaction.

At the first stage 1402, a transaction user interface is shown that is configured to initiate a transaction with an entity, e.g., to buy a dog toy product from XYZ merchant. The transaction user interface also includes an option 1406 that is user selectable to verify an amount of trust associated with the entity based on sentiment documents.

Establishment of trust is used as part of interactions (e.g., transactions involving resource transfer) both to ensure "an entity is who they say they are" as well as quantify past interactions of the entity, e.g., time to ship, reliability, and so forth. However, conventionally trust establishment in decentralized networks is challenged by a lack of a centralized platform to correlate entities of the platform in a manner to establish trust. Accordingly, in this example the option 1406 is selectable to obtain information based on sentiment document 130 as described above in order to establish trust. The sentiment application 1002, for instance, may process sentiment documents as described in relation to FIG. 11.

At the second stage 1404, a sentiment score 1118 is output in the sentiment user interface 140 that indicates a trust rating associated with the entity. An option 1408 is also output by the 140 that is user selectable to continue the transaction. In this way, the user is provided with techniques for decentralized trust establishment non-modally within a transaction workflow, which is not possible in conventional techniques. In the previous examples, the sentiment scores are used by a first entity to determine sentiment expressed by a second entity towards a third entity. The functionality described herein is also usable to determine sentiment expressed towards the entity, itself, by other entities.

Figure 15:
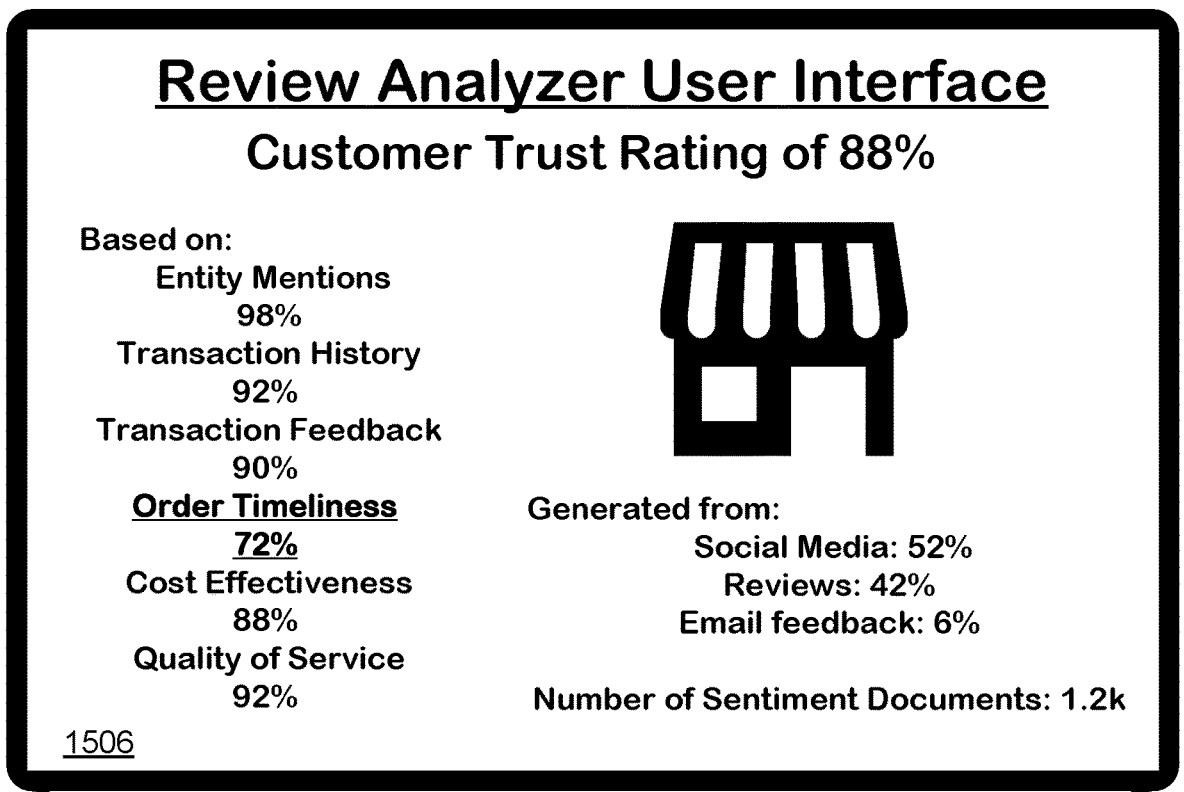
FIG. 15 is a non-limiting example showing operation of a sentiment application as outputting a review analyzer user interface to quantify a sentiment towards an entity, itself, according to an implementation of the present subject matter.
Figure 15:
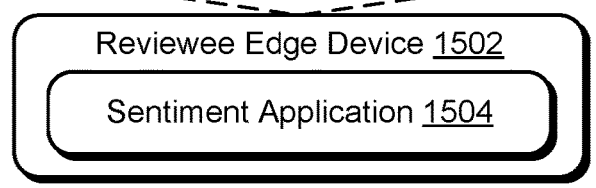

FIG. 15 is a non-limiting example 1500 showing operation of a sentiment application as outputting a review analyzer user interface to quantify a sentiment towards an entity, itself, according to an implementation of the present subject matter. In the previous examples, sentiment of an entity 108 towards a third entity (e.g., XYZ merchant) is used by a second entity 144 to establish trust with the third entity. In this example, the review analyzer user interface leverages the sentiment document 130 to gain real time insight into sentiments by entities towards a target entity, themselves.

The insights, for instance, leverage the types of sentiments, sentiments, and reasoning behind the sentiment as described above, but are output by a reviewed edge device 1502 by a corresponding sentiment application 1504 in a review analyzer user interface 1506. The insights are usable, as implemented by the reviewed edge device 1502, to implement an automated process that understands and analyzes sentiment and summarizes take aways in order to achieve actionable recommendations, e.g., "what do highest-rating customers like," "what is a common concern from lowest rating customers," and "what are sentiment trends exhibited by the sentiment documents." Generative artificial intelligence techniques are also usable that leverage machine learning along with search technology to filter for date of review, locations, incentivize reviews, and how changes affect a rating or review. For instance, a generative AI model may receive as an input a number of sentiment documents and/or summaries, and generate an incentive program to bring back customers indicated as "satisfied" in the sentiment documents. Thus, the sentiment document 130 supports insights into what sentiments are expressed by other entities towards a target entity and are usable by the target entity, itself, to gain those insights.

Figure 16:
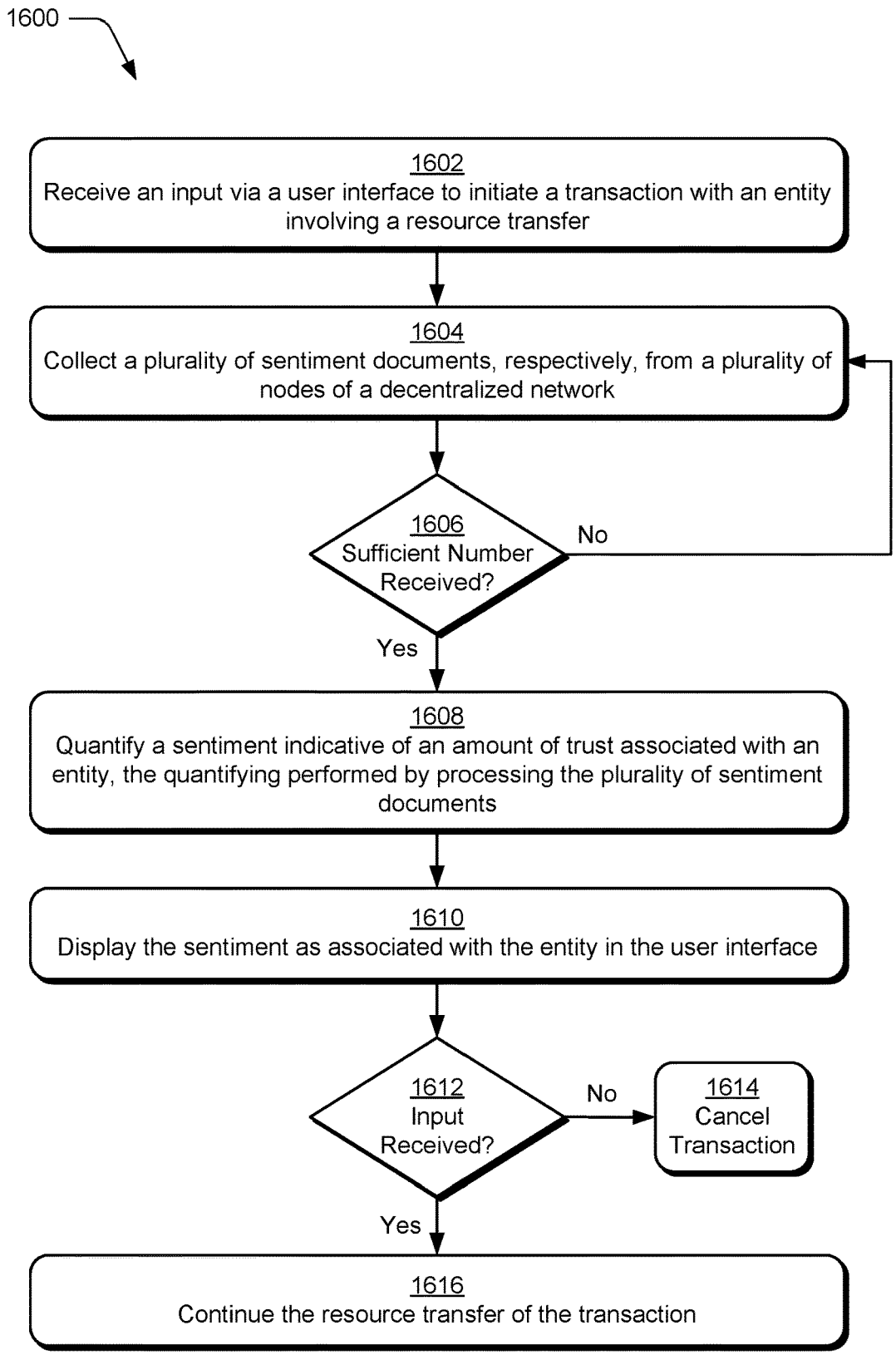
FIG. 16 is a flow diagram depicting a procedure in a non-limiting example of decentralized trust establishment using sentiment documents according to an implementation of the present subject matter.

FIG. 16 is a flow diagram depicting a procedure 1600 in a non-limiting example of decentralized trust establishment using sentiment documents according to an implementation of the present subject matter. The following discussion describes techniques that are implementable utilizing the previously and/or subsequently described systems and devices. Aspects of the procedure are implemented in hardware, firmware, software, or a combination thereof. The procedure is shown as a set of blocks that specify operations performed by one or more devices and are not necessarily limited to the orders shown for performing the operations by the respective blocks.

To begin in this example, an input is received via a user interface to initiate a transaction with an entity involving a resource transfer (block 1602). As shown in an example implementation of FIG. 14, for instance, a transaction user interface is displayed that includes an option 1406 that is selectable to verify trust of a party to the transaction.

A plurality of sentiment documents is collected, respectively, from a plurality of nodes of a decentralized network (block 1604). The plurality of sentiment documents 130(1)-130(N) are collectable, for instance, responsive to selection of the option 1406, performable in advance and cached, and so forth.

A determination is made as to whether a sufficient number of sentiment documents are received (decision block 1606). The determination, for instance, is based on whether a statistically sufficient sampling is received in support of a confidence value on making an accurate assessment. Alternatively or additionally, the determination of a sufficient number can be based on comparison to a threshold, where the threshold may be set to ensure anonymity of sentiment contributors if desired by the contributors. If not ("no" from decision block 1606), collection of sentiment documents continues.

If so ("yes" from decision block 1606), a sentiment is quantified that is indicative of an amount of trust associated with an entity. This quantification is performed by processing the plurality of sentiment documents (block 1608). The sentiment application 1002, for instance, includes a sentiment parsing module 1102 to generate parsed sentiment data 1104. A sentiment determination module 1106 is used to determine sentiments expressed via the parsed sentiment data 1104, which are then processed by a sentiment scoring module 1112 to generate the sentiment scores 1118.

The sentiment is displayed as associated with the entity in the user interface (block 1610), e.g., as a numerical value, graphic representation, badge, avatar, and so forth. An example of which is shown at the second stage 1404 of FIG. 14, in which a sentiment user interface 140 includes an option 1408 to continue the transaction along with a display of the sentiment score 1118.

A determination is made as to whether an input is received (decision block 1612), e.g., to continue the transaction. If an input is not received ("no" from decision block 1612), the transaction is cancelled (block 1614). If an input is received ("yes" from decision block 1612), the resource transfer of the transaction is continued (block 1616). In this way, the user is provided with techniques for decentralized trust establishment non-modally within a transaction workflow, which is not possible in conventional techniques.

Example System and Device

Figure 17:
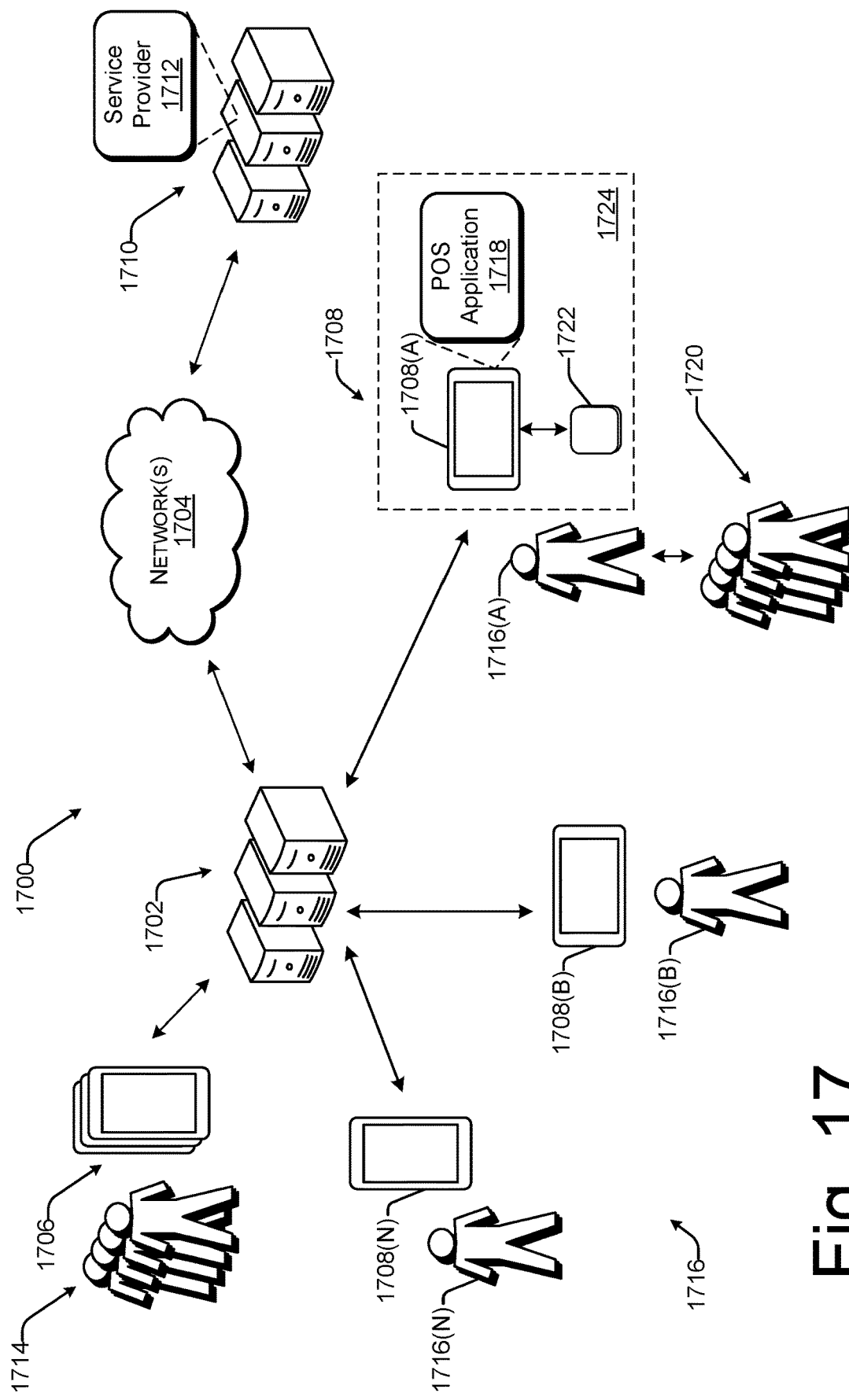
FIG. 17 is an example environment with which techniques described herein can be implemented, according to an embodiment described herein.

FIG. 17 illustrates an example environment 1700. The environment 1700 includes server(s) 1702 that can communicate over a network 1704 with user devices 1706 (which, in some examples can be merchant devices 1708 (individually, 1708(A)-1708(N))) and/or server(s) 1710 associated with third-party service provider(s). The server(s) 1702 can be associated with a service provider 1712 that can provide one or more services for the benefit of users 1714 (e.g., the entity 108 and the second entity 144), as described below. Actions attributed to the service provider 1712 can be performed by the server(s) 1702.

The environment 1700 can include a plurality of user devices 1706, as described above for the edge device 106 and the second edge device 146. Each one of the plurality of user devices 1706 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. In some examples, individual ones of the user devices can be operable by users 1714. The users 1714 can be referred to as customers, buyers, merchants, sellers, borrowers, employees, employers, payors, payees, couriers and so on. The users 1714 can interact with the user devices 1706 via user interfaces presented via the user devices 1706. In at least one example, a user interface can be presented via a web browser, or the like. In other examples, a user interface can be presented via an application, such as a mobile application or desktop application, which can be provided by the service provider or which can be an otherwise dedicated application. In some examples, individual of the user devices 1706 can have an instance or versioned instance of an application, which can be downloaded from an application store, for example, which can present the user interface(s) described herein. In at least one example, a user 1714 can interact with the user interface via touch input, spoken input, or any other type of input.

As described above, in at least one example, the users 1714 can include merchants 1716 (individually, 1716(A)-1716(N)). In an example, the merchants 1716 can operate respective merchant devices 1708, which can be user devices 1706 configured for use by merchants 1716. For the purpose of this discussion, a "merchant" can be any entity that offers items (e.g., goods or services) for purchase or other means of acquisition (e.g., rent, borrow, barter, etc.). The merchants 1716 can offer items for purchase or other means of acquisition via brick-and-mortar merchants, mobile merchants (e.g., pop-up shops, food trucks, etc.), online merchants, combinations of the foregoing, and so forth. In some examples, at least some of the merchants 1716 can be associated with a same entity but can have different merchant locations and/or can have franchise/franchisee relationships. In additional or alternative examples, the merchants 1716 can be different merchants. That is, in at least one example, the merchant 1716(A) is a different merchant than the merchant 1716(B) and/or the merchant 1716(C).

For the purpose of this discussion, "different merchants" can refer to two or more unrelated merchants. "Different merchants" therefore can refer to two or more merchants that are different legal entities (e.g., natural persons and/or corporate persons) that do not share accounting, employees, branding, etc. "Different merchants," as used herein, have different names, employer identification numbers (EIN) s, lines of business (in some examples), inventories (or at least portions thereof), and/or the like. Thus, the use of the term "different merchants" does not refer to a merchant with various merchant locations or franchise/franchisee relationships. Such merchants—with various merchant locations or franchise/franchisee relationships—can be referred to as merchants having different merchant locations and/or different commerce channels.

Each merchant device 1708 can have an instance of a POS application 1718 stored thereon. The POS application 1718 can configure the merchant device 1708 as a POS terminal, which enables the merchant 1716(A) to interact with one or more customers 1720. As described above, the users 1714 can include customers, such as the customers 1720 shown as interacting with the merchant 1716(A). For the purpose of this discussion, a "customer" can be any entity that acquires items from merchants. While only two customers 1720 are illustrated in FIG. 17, any number of customers 1720 can interact with the merchants 1716. Further, while FIG. 17 illustrates the customers 1720 interacting with the merchant 1716(A), the customers 1720 can interact with any of the merchants 1716.

In at least one example, interactions between the customers 1720 and the merchants 1716 that involve the exchange of funds (from the customers 1720) for items (from the merchants 1716) can be referred to as "transactions." In at least one example, the POS application 1718 can determine transaction data associated with the POS transactions. Transaction data can include payment information, which can be obtained from a reader device 1722 associated with the merchant device 1708(A), user authentication data, purchase amount information, point-of-purchase information (e.g., item(s) purchased, date of purchase, time of purchase, etc.), etc. The POS application 1718 can send transaction data to the server(s) 1702 such that the server(s) 1702 can track transactions of the customers 1720, merchants 1716, and/or any of the users 1714 over time. Furthermore, the POS application 1718 can present a UI to enable the merchant 1716(A) to interact with the POS application 1718 and/or the service provider via the POS application 1718.

In at least one example, the merchant device 1708(A) can be a special-purpose computing device configured as a POS terminal (via the execution of the POS application 1718). In at least one example, the POS terminal may be connected to a reader device 1722, which is capable of accepting a variety of payment instruments, such as credit cards, debit cards, gift cards, short-range communication based payment instruments, and the like, as described below. In at least one example, the reader device 1722 can plug in to a port in the merchant device 1708(A), such as a microphone port, a headphone port, an audio-jack, a data port, or other suitable port. In additional or alternative examples, the reader device 1722 can be coupled to the merchant device 1708(A) via another wired or wireless connection, such as via a Bluetooth®, BLE, and so on. Additional details are described below with reference to FIG. 19. In some examples, the reader device 1722 can read information from alternative payment instruments including, but not limited to, wristbands and the like.

In some examples, the reader device 1722 may physically interact with payment instruments such as magnetic stripe payment cards, EMV payment cards, and/or short-range communication (e.g., near field communication (NFC), radio frequency identification (RFID), Bluetooth®, Bluetooth® low energy (BLE), etc.) payment instruments (e.g., cards or devices configured for tapping). The POS terminal may provide a rich user interface, communicate with the reader device 1722, and communicate with the server(s) 1702, which can provide, among other services, a payment processing service. The server(s) 1702 associated with the service provider can communicate with server(s) 1710, as described below. In this manner, the POS terminal and reader device 1722 may collectively process transaction(s) between the merchants 1716 and customers 1720. In some examples, POS terminals and reader devices can be configured in one-to-one pairings. In other examples, the POS terminals and reader devices can be configured in many-to-one pairings (e.g., one POS terminal coupled to multiple reader devices or multiple POS terminals coupled to one reader device). In some examples, there could be multiple POS terminal(s) connected to a number of other devices, such as "secondary" terminals, e.g., back-of-the-house systems, printers, line-buster devices, POS readers, and the like, to allow for information from the secondary terminal to be shared between the primary POS terminal(s) and secondary terminal(s), for example via short-range communication technology. This kind of arrangement may also work in an offline-online scenario to allow one device (e.g., secondary terminal) to continue taking user input, and synchronize data with another device (e.g., primary terminal) when the primary or secondary terminal switches to online mode. In other examples, such data synchronization may happen periodically or at randomly selected time intervals.

While the POS terminal and the reader device 1722 of the POS system 1724 are shown as separate devices, in additional or alternative examples, the POS terminal and the reader device 1722 can be part of a single device. In some examples, the reader device 1722 can have a display integrated therein for presenting information to the customers 1720. In additional or alternative examples, the POS terminal can have a display integrated therein for presenting information to the customers 1720. POS systems, such as the POS system 1724, may be mobile, such that POS terminals and reader devices may process transactions in disparate locations across the world. POS systems can be used for processing card-present transactions and card-not-present (CNP) transactions, as described below.

A card-present transaction is a transaction where both a customer 1720 and his or her payment instrument are physically present at the time of the transaction. Card-present transactions may be processed by swipes, dips, taps, or any other interaction between a physical payment instrument (e.g., a card), or otherwise present payment instrument, and a reader device 1722 whereby the reader device 1722 is able to obtain payment data from the payment instrument. A swipe is a card-present transaction where a customer 1720 slides a card, or other payment instrument, having a magnetic strip through a reader device 1722 that captures payment data contained in the magnetic strip. A dip is a card-present transaction where a customer 1720 inserts a payment instrument having an embedded microchip (i.e., chip) into a reader device 1722 first. The dipped payment instrument remains in the payment reader until the reader device 1722 prompts the customer 1720 to remove the card, or other payment instrument. While the payment instrument is in the reader device 1722, the microchip can create a one-time code which is sent from the POS system 1724 to the server(s) 1710(which can be associated with third-party service providers that provide payment services, including but not limited to, an acquirer bank, an issuer, and/or a card payment network (e.g., Mastercard®, VISA®, etc.)) to be matched with an identical one-time code. A tap is a card-present transaction where a customer 1720 may tap or hover his or her payment instrument (e.g., card, electronic device such as a smart phone running a payment application, etc.) over a reader device 1722 to complete a transaction via short-range communication (e.g., NFC, RFID, Bluetooth®, BLE, etc.). Short-range communication enables the payment instrument to exchange information with the reader device 1722. A tap may also be called a contactless payment.

A CNP transaction is a transaction where a card, or other payment instrument, is not physically present at the POS such that payment data is required to be manually keyed in (e.g., by a merchant, customer, etc.), or payment data is required to be recalled from a card-on-file data store, to complete the transaction.

The POS system 1724, the server(s) 1702, and/or the server(s) 1710 may exchange payment information and transaction data to determine whether transactions are authorized. For example, the POS system 1724 may provide encrypted payment data, user authentication data, purchase amount information, point-of-purchase information, etc. (collectively, transaction data) to server(s) 1702 over the network(s) 1704. The server(s) 1702 may send the transaction data to the server(s) 1710. As described above, in at least one example, the server(s) 1710 can be associated with third-party service providers that provide payment services, including but not limited to, an acquirer bank, an issuer, and/or a card payment network (e.g., Mastercard®, VISA®, etc.)

For the purpose of this discussion, the "payment service providers" can be acquiring banks ("acquirer"), issuing banks ("issuer"), card payment networks, and the like. In an example, an acquirer is a bank or financial institution that processes payments (e.g., credit or debit card payments) and can assume risk on behalf of merchants(s). An acquirer can be a registered member of a card association (e.g., Visa®, MasterCard®), and can be part of a card payment network. The acquirer (e.g., the server(s) 1710 associated therewith) can send a fund transfer request to a server computing device of a card payment network (e.g., Mastercard®, VISA®, etc.) to determine whether the transaction is authorized or deficient. In at least one example, the service provider can serve as an acquirer and connect directly with the card payment network.

The card payment network (e.g., the server(s) 1710 associated therewith) can forward the fund transfer request to an issuing bank (e.g., "issuer"). The issuer is a bank or financial institution that offers a financial account (e.g., credit or debit card account) to a user. An issuer can issue payment cards to users and can pay acquirers for purchases made by cardholders to which the issuing bank has issued a payment card. The issuer (e.g., the server(s) 1710 associated therewith) can make a determination as to whether the customer has the capacity to absorb the relevant charge associated with the payment transaction. In at least one example, the service provider can serve as an issuer and/or can partner with an issuer. The transaction is either approved or rejected by the issuer and/or the card payment network (e.g., the server(s) 1710 associated therewith), and a payment authorization message is communicated from the issuer to the POS device via a path opposite of that described above, or via an alternate path.

As described above, the server(s) 1710, which can be associated with payment service provider(s), may determine whether the transaction is authorized based on the transaction data, as well as information relating to parties to the transaction (e.g., the customer 1720 and/or the merchant 1716(A)). The server(s) 1710 may send an authorization notification over the network(s) 1704 to the server(s) 1702, which may send the authorization notification to the POS system 1724 over the network(s) 1704 to indicate whether the transaction is authorized. The server(s) 1702 may also transmit additional information such as transaction identifiers to the POS system 1724. In one example, the server(s) 1702 may include a merchant application and/or other functional components for communicating with the POS system 1724 and/or the server(s) 1710 to authorize or decline transactions.

Based on the authentication notification that is received by the POS system 1724 from server(s) 1702, the merchant 1716(A) may indicate to the customer 1720 whether the transaction has been approved. In some examples, approval may be indicated at the POS system 1724, for example, at a display of the POS system 1724. In other examples, such as with a smart phone or watch operating as a short-range communication payment instrument, information about the approved transaction may be provided to the short-range communication payment instrument for presentation via a display of the smart phone or watch. In some examples, additional or alternative information can additionally be presented with the approved transaction notification including, but not limited to, receipts, special offers, coupons, or loyalty program information.

As mentioned above, the service provider can provide, among other services, payment processing services, inventory management services, catalog management services, business banking services, financing services, lending services, reservation management services, web-development services, payroll services, employee management services, appointment services, loyalty tracking services, restaurant management services, order management services, fulfillment services, onboarding services, identity verification (IDV) services, and so on. In some examples, the users 1714 can access all of the services of the service provider. In other examples, the users 1714 can have gradated access to the services, which can be based on risk tolerance, IDV outputs, subscriptions, and so on. In at least one example, access to such services can be availed to the merchants 1716 via the POS application 1718. In additional or alternative examples, each service can be associated with its own access point (e.g., application, web browser, etc.).

The service provider can offer payment processing services for processing payments on behalf of the merchants 1716, as described above. For example, the service provider can provision payment processing software, payment processing hardware and/or payment processing services to merchants 1716, as described above, to enable the merchants 1716 to receive payments from the customers 1720 when conducting POS transactions with the customers 1720. For instance, the service provider can enable the merchants 1716 to receive cash payments, payment card payments, and/or electronic payments from customers 1720 for POS transactions and the service provider can process transactions on behalf of the merchants 1716.

As the service provider processes transactions on behalf of the merchants 1716, the service provider can maintain accounts or balances for the merchants 1716 in one or more ledgers. For example, the service provider can analyze transaction data received for a transaction to determine an amount of funds owed to a merchant 1716(A) for the transaction. In at least one example, such an amount can be a total purchase price less fees charged by the service provider for providing the payment processing services. Based on determining the amount of funds owed to the merchant 1716(A), the service provider can deposit funds into an account of the merchant 1716(A). The account can have a stored balance, which can be managed by the service provider. The account can be different from a conventional bank account at least because the stored balance is managed by a ledger of the service provider and the associated funds are accessible via various withdrawal channels including, but not limited to, scheduled deposit, same-day deposit, instant deposit, and a linked payment instrument.

A scheduled deposit can occur when the service provider transfers funds associated with a stored balance of the merchant 1716(A) to a bank account of the merchant 1716 (A) that is held at a bank or other financial institution (e.g., associated with the server(s) 1710). Scheduled deposits can occur at a prearranged time after a POS transaction is funded, which can be a business day after the POS transaction occurred, or sooner or later. In some examples, the merchant 1716(A) can access funds prior to a scheduled deposit. For instance, the merchant 1716(A) may have access to same-day deposits (e.g., wherein the service provider deposits funds from the stored balance to a linked bank account of the merchant on a same day as POS transaction, in some examples prior to the POS transaction being funded) or instant deposits (e.g., wherein the service provider deposits funds from the stored balance to a linked bank account of the merchant on demand, such as responsive to a request). Further, in at least one example, the merchant 1716(A) can have a payment instrument that is linked to the stored balance that enables the merchant to access the funds without first transferring the funds from the account managed by the service provider to the bank account of the merchant 1716(A).

In at least one example, the service provider may provide inventory management services. That is, the service provider may provide inventory tracking and reporting. Inventory management services may enable the merchant 1716(A) to access and manage a database storing data associated with a quantity of each item that the merchant 1716(A) has available (i.e., an inventory). Furthermore, in at least one example, the service provider can provide catalog management services to enable the merchant 1716(A) to maintain a catalog, which can be a database storing data associated with items that the merchant 1716(A) has available for acquisition (i.e., catalog management services). In at least one example, the catalog may include a plurality of data items and a data item of the plurality of data items may represent an item that the merchant 1716(A) has available for acquisition. The service provider can offer recommendations related to pricing of the items, placement of items on the catalog, and multi-party fulfillment of the inventory.

In at least one example, the service provider can provide business banking services, which allow the merchant 1716(A) to track deposits (from payment processing and/or other sources of funds) into an account of the merchant 1716(A), payroll payments from the account (e.g., payments to employees of the merchant 1716(A)), payments to other merchants (e.g., business-to-business) directly from the account or from a linked debit card, withdrawals made via scheduled deposit and/or instant deposit, etc. Furthermore, the business banking services can enable the merchant 1716(A) to obtain a customized payment instrument (e.g., credit card), check how much money they are earning (e.g., via presentation of available earned balance), understand where their money is going (e.g., via deposit reports (which can include a breakdown of fees), spend reports, etc.), access/use earned money (e.g., via scheduled deposit, instant deposit, linked payment instrument, etc.), feel in control of their money (e.g., via management of deposit schedule, deposit speed, linked instruments, etc.), etc. Moreover, the business banking services can enable the merchants 1716 to visualize their cash flow to track their financial health, set aside money for upcoming obligations (e.g., savings), organize money around goals, etc.

In at least one example, the service provider can provide financing services and products, such as via business loans, consumer loans, fixed term loans, flexible term loans, and the like. In at least one example, the service provider can utilize one or more risk signals to determine whether to extend financing offers and/or terms associated with such financing offers.

In at least one example, the service provider can provide financing services for offering and/or lending a loan to a borrower that is to be used for, in some instances, financing the borrower's short-term operational needs (e.g., a capital loan). For instance, a potential borrower that is a merchant can obtain a capital loan via a capital loan product in order to finance various operational costs (e.g., rent, payroll, inventory, etc.). In at least one example, the service provider can offer different types of capital loan products. For instance, in at least one example, the service provider can offer a daily repayment loan product, wherein a capital loan is repaid daily, for instance, from a portion of transactions processed by the payment processing service on behalf of the borrower. Additionally and/or alternatively, the service provider can offer a monthly repayment loan product, wherein a capital loan is repaid monthly, for instance, via a debit from a bank account linked to the payment processing service. The credit risk of the merchant may be evaluated using risk models that take into account factors, such as payment volume, credit risk of similarly situated merchants, past transaction history, seasonality, credit history, and so on.

Additionally or alternatively, the service provider can provide financing services for offering and/or lending a loan to a borrower that is to be used for, in some instances, financing the borrower's consumer purchase (e.g., a consumer loan). In at least one example, a borrower can submit a request for a loan to enable the borrower to purchase an item from a merchant, which can be one of the merchants 1716. The service provider can generate the loan based at least in part on determining that the borrower purchased or intends to purchase the item from the merchant. The loan can be associated with a balance based on an actual purchase price of the item and the borrower can repay the loan over time. In some examples, the borrower can repay the loan via installments, which can be paid via funds managed and/or maintained by the service provider (e.g., from payments owed to the merchant from payments processed on behalf of the merchant, funds transferred to the merchant, etc.). The service provider can offer specific financial products, such as payment instruments, tied specifically to the loan products. For example, in one implementation, the server provider 1712 associates capital to a merchant or customer's debit card, where the use of the debit card is defined by the terms of the loan. In some examples, the merchant may only use the debit card for making specific purchases. In other examples, the "installment" associated with the loan product is credited directly via the payment instrument. The payment instrument is thus customized to the loan and/or the parties associated with the loan.

The service provider can provide web-development services, which enable users 1714 who are unfamiliar with HTML, XML, JavaScript®, CSS, or other web design tools to create and maintain professional and aesthetically pleasing websites. Some of these web page editing applications allow users to build a web page and/or modify a web page (e.g., change, add, or remove content associated with a web page). Further, in addition to websites, the web-development services can create and maintain other online omni-channel presences, such as social media posts for example. In some examples, the resulting web page(s) and/or other content items can be used for offering item(s) for sale via an online/e-commerce platform. That is, the resulting web page(s) and/or other content items can be associated with an online store or offering by the one or more of the merchants 1716. In at least one example, the service provider can recommend and/or generate content items to supplement omni-channel presences of the merchants 1716. That is, if a merchant of the merchants 1716 has a web page, the service provider—via the web-development or other services—can recommend and/or generate additional content items to be presented via other channel(s), such as social media, email, etc.

Furthermore, the service provider can provide payroll services to enable employers to pay employees for work performed on behalf of employers. In at least one example, the service provider can receive data that includes time worked by an employee (e.g., through imported timecards and/or POS interactions), sales made by the employee, gratuities received by the employee, and so forth. Based on such data, the service provider can make payroll payments to employee(s) on behalf of an employer via the payroll service. For instance, the service provider can facilitate the transfer of a total amount to be paid out for the payroll of an employee from the bank of the employer to the bank of the service provider to be used to make payroll payments. In at least one example, when the funds have been received at the bank of the service provider, the service provider can pay the employee, such as by check or direct deposit, often a day, a week, or more after when the work was actually performed by the employee. In additional or alternative examples, the service provider can enable employee(s) to receive payments via same-day or instant deposit based at least in part on risk and/or reliability analyses performed by the service provider.

Moreover, in at least one example, the service provider can provide employee management services for managing schedules of employees. Further, the service provider can provide appointment services for enabling users 1714 to set schedules for scheduling appointments and/or users 1714 to schedule appointments.

In some examples, the service provider can provide restaurant management services to enable users 1714 to make and/or manage reservations, to monitor front-of-house and/or back-of-house operations, and so on. In such examples, the merchant device(s) 1708 and/or server(s) 1702 can be configured to communicate with one or more other computing devices, which can be located in the front-of-house (e.g., POS device(s)) and/or back-of-house (e.g., kitchen display system(s) (KDS)). In at least one example, the service provider can provide order management services and/or fulfillment services to enable restaurants to manage open tickets, split tickets, and so on and/or manage fulfillment services. In some examples, such services can be associated with restaurant merchants, as described above. In additional or alternative examples, such services can be any type of merchant.

In at least one example, the service provider can provide fulfilment services, which can use couriers for delivery, wherein couriers can travel between multiple locations to provide delivery services, photography services, etc. Couriers can be users 1714 who can travel between locations to perform services for a requesting user 1714 (e.g., deliver items, capture images, etc.). In some examples, the courier can receive compensation from the service provider. The courier can employ one or more vehicles, such as automobiles, bicycles, scooters, motorcycles, buses, airplanes, helicopters, boats, skateboards, etc. Although, in other instances the courier can travel by foot or otherwise without a vehicle. Some examples discussed herein enable people to participate as couriers in a type of crowdsourced service economy. Here, essentially any person with a mobile device is able to immediately become a courier, or cease to be a courier, in a courier network that provides services as described herein. In at least one example, the couriers can be unmanned aerial vehicles (e.g., drones), autonomous vehicles, or any other type of vehicle capable of receiving instructions for traveling between locations. In some examples, the service provider can receive requests for courier services, automatically assign the requests to active couriers, and communicate dispatch instructions to couriers via user interface (e.g., application, web browser, or other access point) presented via respective devices 1706.

In some examples, the service provider can provide omni-channel fulfillment services. For instance, if a customer places an order with a merchant and the merchant cannot fulfill the order because one or more items are out of stock or otherwise unavailable, the service provider can leverage other merchants and/or sales channels that are part of the platform of the service provider to fulfill the customer's order. That is, another merchant can provide the one or more items to fulfill the order of the customer. Furthermore, in some examples, another sales channel (e.g., online, brick-and-mortar, etc.) can be used to fulfill the order of the customer.

In some examples, the service provider can enable conversational commerce via conversational commerce services, which can use one or more machine learning mechanisms to analyze messages exchanged between two or more users 1714, voice inputs into a virtual assistant or the like, to determine intents of user(s) 1714. In some examples, the service provider can utilize determined intents to automate customer service, offer promotions, provide recommendations, or otherwise interact with customers in real-time. In at least one example, the service provider can integrate products and services, and payment mechanisms into a communication platform (e.g., messaging, etc.) to enable customers to make purchases, or otherwise transact, without having to call, email, or visit a web page or other channel of a merchant. That is, conversational commerce alleviates the need for customers to toggle back and forth between conversations and web pages to gather information and make purchases.

In at least one example, a user 1714 may be new to the service provider such that the user 1714 that has not registered (e.g., subscribed to receive access to one or more services offered by the service provider) with the service provider. The service provider can offer onboarding services for registering a potential user 1714 with the service provider. In some examples, onboarding can involve presenting various questions, prompts, and the like to a potential user 1714 to obtain information that can be used to generate a profile for the potential user 1714. In at least one example, the service provider can provide limited or short-term access to its services prior to, or during, onboarding (e.g., a user of a peer-to-peer payment service can transfer and/or receive funds prior to being fully onboarded, a merchant can process payments prior to being fully onboarded, etc.). In at least one example, responsive to the potential user 1714 providing all necessary information, the potential user 1714 can be onboarded to the service provider. In such an example, any limited or short-term access to services of the service provider can be transitioned to more permissive (e.g., less limited) or longer-term access to such services.

The service provider can be associated with IDV services, which can be used by the service provider for compliance purposes and/or can be offered as a service, for instance to third-party service providers (e.g., associated with the server(s) 1710). That is, the service provider can offer IDV services to verify the identity of users 1714 seeking to use or using their services. Identity verification requires a customer (or potential customer) to provide information that is used by compliance departments to prove that the information is associated with an identity of a real person or entity. In at least one example, the service provider can perform services for determining whether identifying information provided by a user 1714 accurately identifies the customer (or potential customer), i.e., "Is the customer who they say they are?"

The service provider is capable of providing additional or alternative services and the services described above are offered as a sampling of services. In at least one example, the service provider can exchange data with the server(s) 1710 associated with third-party service providers. Such third-party service providers can provide information that enables the service provider to provide services, such as those described above. In additional or alternative examples, such third-party service providers can access services of the service provider. That is, in some examples, the third-party service providers can be subscribers, or otherwise access, services of the service provider.

Techniques described herein can be configured to operate in both real-time/online and offline modes. "Online" modes refer to modes when devices are capable of communicating with the service provider (e.g., the server(s) 1702) and/or the server(s) 1710 via the network(s) 1704. In some examples, the merchant device(s) 1708 are not capable of connecting with the service provider (e.g., the server(s) 1702) and/or the server(s) 1710, due to a network connectivity issue, for example. In additional or alternative examples, the server(s) 1702 are not capable of communicating with the server(s) 1710 due to network connectivity issue, for example. In such examples, devices may operate in "offline" mode where at least some payment data is stored (e.g., on the merchant device(s) 1708) and/or the server(s) 1702 until connectivity is restored and the payment data can be transmitted to the server(s) 1702 and/or the server(s) 1710 for processing.

In at least one example, the service provider can be associated with a hub, such as an order hub, an inventory hub, a fulfillment hub and so on, which can enable integration with one or more additional service providers (e.g., associated with the additional server(s) 1710). In some examples, such additional service providers can offer additional or alternative services and the service provider can provide an interface or other computer-readable instructions to integrate functionality of the service provider into the one or more additional service providers.

Techniques described herein are directed to services provided via a distributed system of user devices 1706 that are in communication with server(s) 1702 of the service provider. That is, techniques described herein are directed to a specific implementation—or, a practical application—of utilizing a distributed system of user devices 1706 that are in communication with server(s) 1702 of the service provider to perform a variety of services, as described above. The unconventional configuration of the distributed system described herein enables the server(s) 1702 that are remotely-located from end-users (e.g., users 1714) to intelligently offer services based on aggregated data associated with the end-users, such as the users 1714 (e.g., data associated with multiple, different merchants and/or multiple, different buyers), in some examples, in near-real time. Accordingly, techniques described herein are directed to a particular arrangement of elements that offer technical improvements over conventional techniques for performing payment processing services and the like. For small business owners in particular, the business environment is typically fragmented and relies on unrelated tools and programs, making it difficult for an owner to manually consolidate and view such data. The techniques described herein constantly or periodically monitor disparate and distinct merchant accounts, e.g., accounts within the control of the service provider, and those outside of the control of the service provider, to track the business standing (payables, receivables, payroll, invoices, appointments, capital, etc.) of the merchants. The techniques herein provide a consolidated view of a merchant's cash flow, predict needs, preemptively offer recommendations or services, such as capital, coupons, etc., and/or enable money movement between disparate accounts (merchant's, another merchant's, or even payment service's) in a frictionless and transparent manner.

As described herein, artificial intelligence, machine learning, and the like can be used to dynamically make determinations, recommendations, and the like, thereby adding intelligence and context-awareness to an otherwise one-size-fits-all scheme for providing payment processing services and/or additional or alternative services described herein. In some implementations, the distributed system is capable of applying the intelligence derived from an existing user base to a new user, thereby making the onboarding experience for the new user personalized and frictionless when compared to traditional onboarding methods. Thus, techniques described herein improve existing technological processes.

As described above, various graphical user interfaces (GUIs) can be presented to facilitate techniques described herein. Some of the techniques described herein are directed to user interface features presented via GUIs to improve interaction between users 1714 and user devices 1706. Furthermore, such features are changed dynamically based on the profiles of the users involved interacting with the GUIs. As such, techniques described herein are directed to improvements to computing systems.

Figure 18:
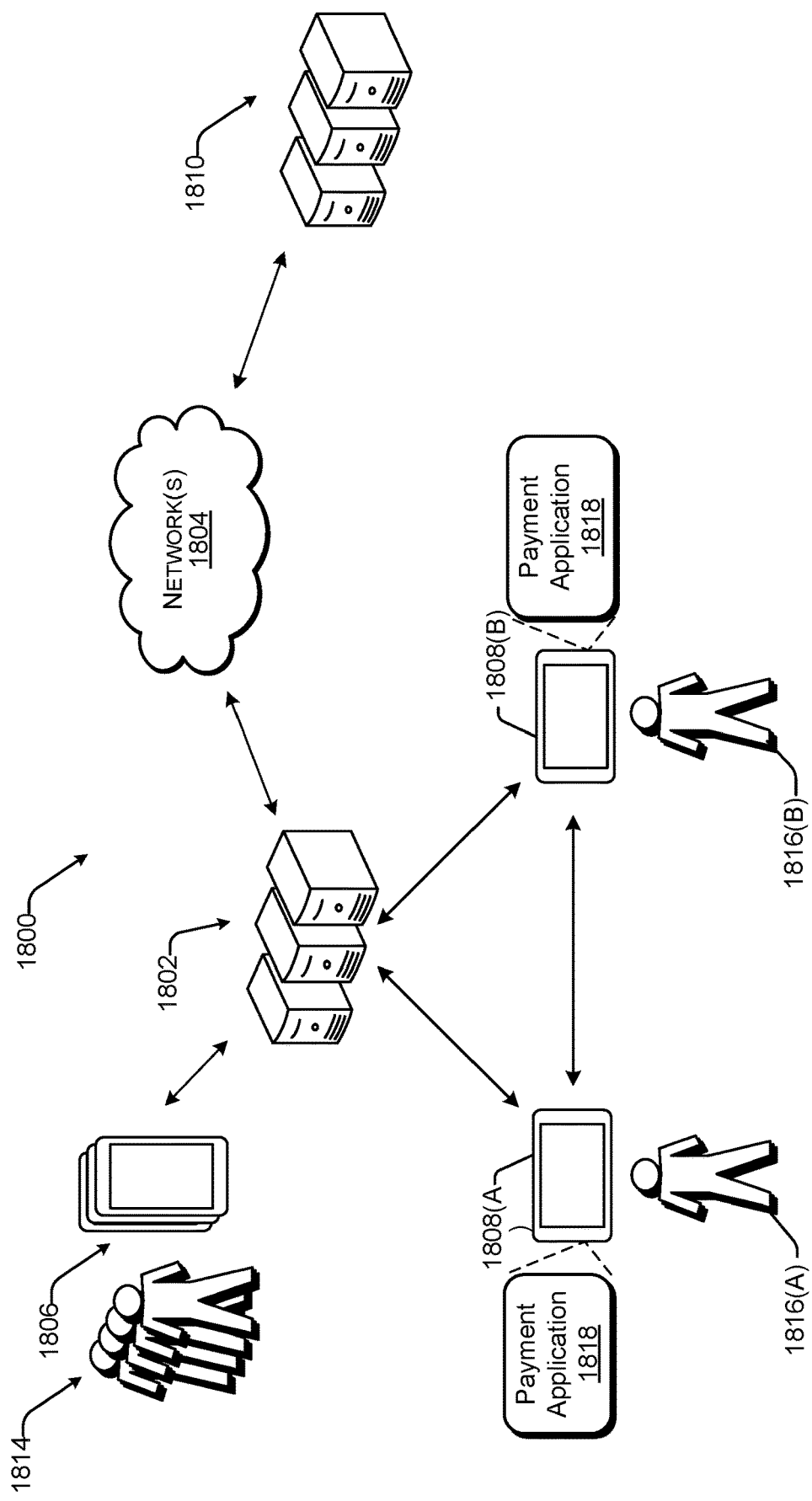
FIG. 18 is an example environment with which techniques described herein can be implemented, according to an embodiment described herein.

FIG. 18 illustrates an example environment 1800. The environment 1800 includes server(s) 1802 that can communicate over a network 1804 with user devices 1806 (which, in some examples can be user devices 1808 (individually, 1808(A), 1808(B)) and/or server(s) 1810 associated with third-party service provider(s). The server(s) 1802 can be associated with a service provider that can provide one or more services for the benefit of users 1814 (e.g., the entity 108 and the second entity 144), as described below. Actions attributed to the service provider can be performed by the server(s) 1802. In some examples, the service provider 1712 referenced in FIG. 17 can be the same or different than the service provider referenced in FIG. 18.

The environment 1800 can include a plurality of user devices 1806, as described above for the edge device 106 and the second edge device 146. Each one of the plurality of user devices 1806 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. In some examples, individual ones of the user devices can be operable by users 1814. The users 1814 can be referred to as customers, buyers, merchants, sellers, borrowers, employees, employers, payors, payees, couriers and so on. The users 1814 can interact with the user devices 1806 via user interfaces presented via the user devices 1806. In at least one example, a user interface can be presented via a web browser, or the like. In other examples, a user interface can be presented via an application, such as a mobile application or desktop application, which can be provided by the service provider or which can be an otherwise dedicated application. In some examples, individual of the user devices 1806 can have an instance or versioned instance of an application, which can be downloaded from an application store, for example, which can present the user interface(s) described herein. In at least one example, a user 1814 can interact with the user interface via touch input, spoken input, or any other type of input.

In at least one example, the service provider can provide a peer-to-peer payment service that enables peer-to-peer payments between two or more users 1814. Two users, user 1816(A) and user 1816(B) are illustrated in FIG. 18 as "peers" in a peer-to-peer payment. In at least one example, the service provider can communicate with instances of a payment application 1818 (or other access point) installed on devices 1806 configured for operation by users 1814. In an example, an instance of the payment application 1818 executing on a first device 1808(A) operated by a payor (e.g., user 1816(A)) can send a request to the service provider to transfer an asset (e.g., fiat currency, non-fiat currency, digital assets, cryptocurrency, securities, gift cards, and/or related assets) from the payor to a payee (e.g., user 1816(B)) via a peer-to-peer payment. In some examples, assets associated with an account of the payor are transferred to an account of the payee. In some examples, assets can be held at least temporarily in an account of the service provider prior to transferring the assets to the account of the payee.

Figure 19:
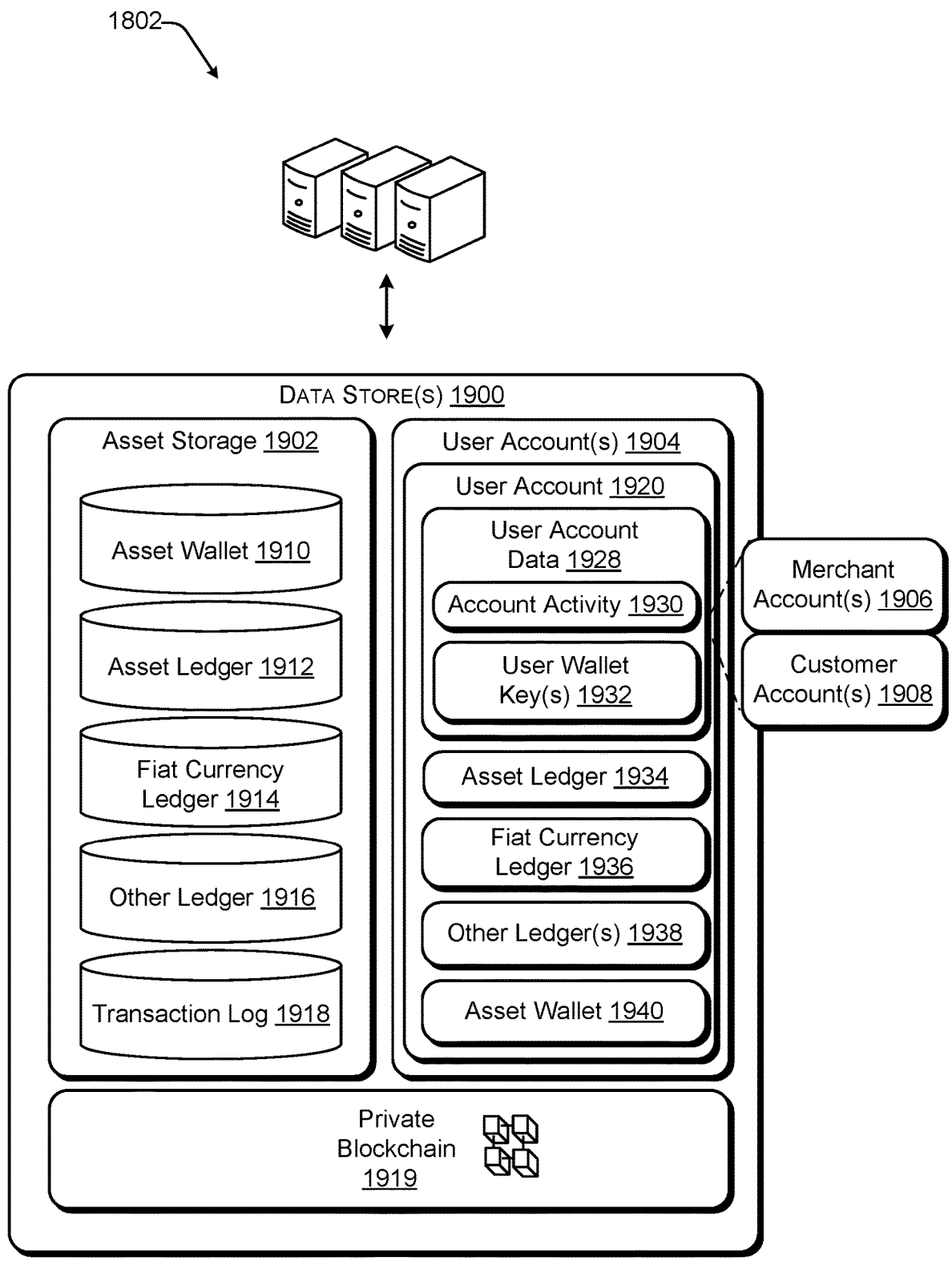
FIG. 19 is an environment associated with a ledger system with which techniques described herein can be implemented, according to an embodiment described herein.

In some examples, the service provider can utilize a ledger system to track transfers of assets between users 1814. FIG. 19, below, provides additional details associated with such a ledger system. The ledger system can enable users 1814 to own fractional shares of assets that are not conventionally available. For instance, a user can own a fraction of a Bitcoin or a stock. Additional details are described herein.

In at least one example, the service provider can facilitate transfers and can send notifications related thereto to instances of the payment application 1818 executing on user device(s) of payee(s). As an example, the service provider can transfer assets from an account of user 1816(A) to an account of the user 1816(B) and can send a notification to the user device 1808(B) of the user 1816(B) for presentation via a user interface. The notification can indicate that a transfer is in process, a transfer is complete, or the like. In some examples, the service provider can send additional or alternative information to the instances of the payment application 1818 (e.g., low balance to the payor, current balance to the payor or the payee, etc.). In some examples, the payor and/or payee can be identified automatically, e.g., based on context, proximity, prior transaction history, and so on. In other examples, the payee can send a request for funds to the payor prior to the payor initiating the transfer of funds. In some embodiments, the service provider funds the request to payee on behalf of the payor, to speed up the transfer process and compensate for any lags that may be attributed to the payor's financial network.

In some examples, the service provider can trigger the peer-to-peer payment process through identification of a "payment proxy" having a particular syntax. For example, the syntax can include a monetary currency indicator prefixing one or more alphanumeric characters (e.g., $Cash). The currency indicator operates as the tagging mechanism that indicates to the server(s) 1802 to treat the inputs as a request from the payor to transfer assets, where detection of the syntax triggers a transfer of assets. The currency indicator can correspond to various currencies including but not limited to, dollar ($), euro (€), pound (£), rupee (₹), yuan (¥), etc. Although use of the dollar currency indicator ($) is used herein, it is to be understood that any currency symbol could equally be used. In some examples, additional or alternative identifiers can be used to trigger the peer-to-peer payment process. For instance, email, telephone number, social media handles, and/or the like can be used to trigger and/or identify users of a peer-to-peer payment process.

In some examples, the peer-to-peer payment process can be initiated through instances of the payment application 1818 executing on the user devices 1806. In at least some embodiments, the peer-to-peer process can be implemented within a landing page associated with a user and/or an identifier of a user. The term "landing page," as used here, refers to a virtual location identified by a personalized location address that is dedicated to collect payments on behalf of a recipient associated with the personalized location address. The personalized location address that identifies the landing page can include a payment proxy discussed above. The service provider can generate the landing page to enable the recipient to conveniently receive one or more payments from one or more senders. In some examples, the personalized location address identifying the landing page can be a uniform resource locator (URL) that incorporates the payment proxy. In such examples, the landing page can be a web page, e.g., www.cash.me/$Cash.

In some examples, the peer-to-peer payment process can be implemented within a forum. The term "forum," as used here, refers to a content provider's media channel (e.g., a social networking platform, a microblog, a blog, video sharing platform, a music sharing platform, etc.) that enables user interaction and engagement through comments, posts, messages on electronic bulletin boards, messages on a social networking platform, and/or any other types of messages. In some examples, the content provider can be the service provider as described with reference to FIG. 18 or a third-party service provider associated with the server(s) 1810. In examples where the content provider is a third-party service provider, the server(s) 1810 can be accessible via one or more APIs or other integrations. The forum can be employed by a content provider to enable users of the forum to interact with one another (e.g., through creating messages, posting comments, etc.). In some examples, "forum" may also refer to an application or webpage of an e-commerce or retail organization that offers products and/or services. Such websites can provide an online "form" to complete before or after the products or services are added to a virtual cart. The online form may include one or more fields to receive user interaction and engagement. Examples include name and other identification of the user, shipping address of the user, etc. Some of these fields may be configured to receive payment information, such as a payment proxy, in lieu of other kinds of payment mechanisms, such as credit cards, debit cards, prepaid cards, gift cards, virtual wallets, etc.

In some embodiments, the peer-to-peer process can be implemented within a communication application, such as a messaging application. The term "messaging application," as used here, refers to any messaging application that enables communication between users (e.g., sender and recipient of a message) over a wired or wireless communications network, through use of a communication message. The messaging application can be employed by the service provider referenced in FIG. 18. For instance, the service provider can offer messaging services that provides a communication service to users via a messaging application (e.g., chat or messaging capability). The messaging application can include, for example, a text messaging application for communication between phones (e.g., conventional mobile telephones or smartphones), or a cross-platform instant messaging application for smartphones and phones that use the Internet for communication. The messaging application can be executed on a user device 1806 (e.g., mobile device or conventional personal computer (PC)) based on instructions transmitted to and from the server(s) 1802 (which, in such an example can be called a "messaging server"). In some instances, the messaging application can include a payment application with messaging capability that enables users of the payment application to communicate with one another. In such instances, the payment application can be executed on a user device 1806 based on instructions transmitted to and from the server(s) 1802 (e.g., the payment service discussed in this description or another payment service that supports payment transactions). In some examples, the messaging application can be provided by a third-party service provider associated with the server(s) 1810. In examples where the messaging application is a third-party service provider, the server(s) 1810 can be accessible via one or more APIs or other integrations.

As described above, the service provider can facilitate peer-to-peer transactions, which can enable users 1814 to transfer fiat currency, non-fiat currency, cryptocurrency, securities, or other assets, or portions thereof, to other users 1814. In at least one example, individual users can be associated with user accounts. Additional details associated with user accounts and the transfer of assets between users 1814 are described below with reference to FIG. 19.

Furthermore, the service provider of FIG. 18 can enable users 1814 to perform banking transactions via instances of the payment application 1818. For example, users can configure direct deposits or other deposits for adding assets to their various ledgers/balances. Further, users 1814 can configure bill pay, recurring payments, and/or the like using assets associated with their accounts. In addition to sending and/or receiving assets via peer-to-peer transactions, users 1814 buy and/or sell assets via asset networks such as cryptocurrency networks, securities networks, and/or the like.

FIG. 19 illustrates example data store(s) 1900 that can be associated with the server(s) 1802, e.g., usable to perform the transaction of FIG. 15. In at least one example, the data store(s) 1900 can store assets in an asset storage 1902, as well as data in user account(s) 1904. In some examples, user account(s) 1904 can include merchant account(s) 1906, and/or customer account(s) 1908. In at least one example, the asset storage 1902 can be used to store assets managed by the service provider of FIG. 18. In at least one example, the asset storage 1902 can be used to record whether individual of the assets are registered to users. For example, the asset storage 1902 can include an asset wallet 1910 for storing records of assets owned by the service provider of FIG. 18, such as cryptocurrency, securities, or the like, and communicating with one or more asset networks, such as cryptocurrency networks, securities networks, or the like. In some examples, the asset network can be a first-party network or a third-party network, such as a cryptocurrency exchange or the stock market. In examples where the asset network is a third-party network, the server(s) 1810 can be associated therewith. In some examples, the asset wallet 1910 can communicate with the asset network via one or more components associated with the server(s) 1802.

The asset wallet 1910 can be associated with one or more addresses and can vary addresses used to acquire assets (e.g., from the asset network(s)) so that its holdings are represented under a variety of addresses on the asset network. In examples where the service provider of FIG. 18 has its own holdings of cryptocurrency (e.g., in the asset wallet 1910), a user can acquire cryptocurrency directly from the service provider of FIG. 18. In some examples, the service provider of FIG. 18 can include logic for buying and selling cryptocurrency to maintain a desired level of cryptocurrency. In some examples, the desired level can be based on a volume of transactions over a period of time, balances of collective cryptocurrency ledgers, exchange rates, or trends in changing of exchange rates such that the cryptocurrency is trending towards gaining or losing value with respect to the fiat currency. In all of these scenarios, the buying and selling of cryptocurrency, and therefore the associated updating of the public ledger of asset network can be separate from any customer-merchant transaction or peer-to-peer transaction, and therefore not necessarily time-sensitive. This can enable batching transactions to reduce computational resources and/or costs. The service provider can provide the same or similar functionality for securities or other assets.

The asset storage 1902 may contain ledgers that store records of assignments of assets to users 1814. Specifically, the asset storage 1902 may include asset ledger 1912, fiat currency ledger 1914, and other ledger(s) 1916, which can be used to record transfers of assets between users 1814 of the service provider and/or one or more third-parties (e.g., merchant network(s), payment card network(s), ACH network(s), equities network(s), the asset network, securities networks, etc.). In doing so, the asset storage 1902 can maintain a running balance of assets managed by the service provider of FIG. 18. The ledger(s) of the asset storage 1902 can further indicate some of the running balance for each of the ledger(s) stored in the asset storage 1902 is assigned or registered to one or more user account(s) 1904.

In at least one example, the asset storage 1902 can include transaction logs 1918, which can include records of past transactions involving the service provider of FIG. 18. In at least one example, transaction data, as described herein, can be stored in association with the transaction logs 1918.

In some examples, the data store(s) 1900 can store a private blockchain 1919. A private blockchain 1919 can function to record sender addresses, recipient addresses, public keys, values of cryptocurrency transferred, and/or can be used to verify ownership of cryptocurrency tokens to be transferred. In some examples, the service provider of FIG. 18 can record transactions taking place within the service provider of FIG. 18 involving cryptocurrency until the number of transactions has exceeded a determined limit (e.g., number of transactions, storage space allocation, etc.). Based at least in part on determining that the limit has been reached, the service provider of FIG. 18 can publish the transactions in the private blockchain 1919 to a public blockchain (e.g., associated with the asset network), where miners can verify the transactions and record the transactions to blocks on the public blockchain. In at least one example, the service provider of FIG. 18 can participate as miner(s) at least for its transactions to be posted to the public blockchain.

In at least one example, the data store(s) 1900 can store and/or manage accounts, such as user account(s) 1904, merchant account(s) 1906, and/or customer account(s) 1908. In at least one example, the user account(s) 1904 may store records of user accounts associated with the users 1814. In at least one example, the user account(s) 1904 can include a user account 1920, which can be associated with a user (of the users 1814). Other user accounts of the user account(s) 1904 can be similarly structured to the user account 1920, according to some examples. In other examples, other user accounts may include more or less data and/or account information than that provided by the user account 1920. In at least one example, the user account 1920 can include user account data 1928, which can include, but is not limited to, data associated with user identifying information (e.g., name, phone number, address, etc.), user identifier(s) (e.g., alphanumeric identifiers, etc.), user preferences (e.g., learned or user-specified), purchase history data (e.g., identifying one or more items purchased (and respective item information), linked payment sources (e.g., bank account(s), stored balance(s), etc.), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, user service data, loyalty data (e.g., loyalty account numbers, rewards redeemed, rewards available, etc.), risk indicator(s) (e.g., level(s) of risk), etc.

In at least one example, the user account data 1928 can include account activity 1930 and user wallet key(s) 1932. The account activity 1930 may include a transaction log for recording transactions associated with the user account 1920. In some examples, the user wallet key(s) 1932 can include a public-private key-pair and a respective address associated with the asset network or other asset networks. In some examples, the user wallet key(s) 1932 may include one or more key pairs, which can be unique to the asset network or other asset networks.

In addition to the user account data 1928, the user account 1920 can include ledger(s) for account(s) managed by the service provider of FIG. 18, for the user. For example, the user account 1920 may include an asset ledger 1934, a fiat currency ledger 1936, and/or other ledger 1938. The ledger(s) can indicate that a corresponding user utilizes the service provider of FIG. 18 to manage corresponding accounts (e.g., a cryptocurrency account, a securities account, a fiat currency account, etc.). It should be noted that in some examples, the ledger(s) can be logical ledger(s) and the data can be represented in a single database. In some examples, individual of the ledger(s), or portions thereof, can be maintained by the service provider of FIG. 18.

In some examples, the asset ledger 1934 can store a balance for each of one or more cryptocurrencies (e.g., Bitcoin, Ethereum, Litecoin, etc.) registered to the user account 1920. In at least one example, the asset ledger 1914 can further record transactions of cryptocurrency assets associated with the user account 1920. For example, the user account 1920 can receive cryptocurrency from the asset network using the user wallet key(s) 1932. In some examples, the user wallet key(s) 1932 may be generated for the user upon request. User wallet key(s) 1932 can be requested by the user in order to send, exchange, or otherwise control the balance of cryptocurrency held by the service provider of FIG. 18 (e.g., in the asset wallet 1910) and registered to the user. In some examples, the user wallet key(s) 1932 may not be generated until a user account requires such. This on-the-fly wallet key generation provides enhanced security features for users, reducing the number of access points to a user account's balance and, therefore, limiting exposure to external threats.

Each account ledger can reflect a positive balance when funds are added to the corresponding account. An account can be funded by transferring currency in the form associated with the account from an external account (e.g., transferring a value of cryptocurrency to the service provider of FIG. 18 and the value is credited as a balance in asset ledger 1914), by purchasing currency in the form associated with the account using currency in a different form (e.g., buying a value of cryptocurrency from the service provider of FIG. 18 using a value of fiat currency reflected in fiat currency ledger 1916, and crediting the value of cryptocurrency in asset ledger 1914), or by conducting a transaction with another user (customer or merchant) of the service provider of FIG. 18 wherein the account receives incoming currency (which can be in the form associated with the account or a different form, in which the incoming currency may be converted to the form associated with the account). In some examples, the user account data 1928 can include preferences for maintaining balances of individual of the ledgers.

For example, the service provider of FIG. 18 can automatically debit the fiat currency ledger 1916 to increase the asset ledger 1914, or another account associated with the user whenever the cryptocurrency balance (e.g., of the asset ledger 1914) falls below a stated level (e.g., a threshold). Conversely, in some embodiments, the service provider of FIG. 18 can automatically credit the fiat currency ledger 1916 to decrease the asset ledger 1914 whenever cryptocurrency balance rises above a stated level (e.g., a threshold). In some examples, automatic transactions can be further defined by an exchange rate between the cryptocurrency and the fiat currency such that transactions to buy or sell cryptocurrency can occur when exchange rates are favorable.

With specific reference to funding a cryptocurrency account, a user may have a balance of cryptocurrency stored in another cryptocurrency wallet. In some examples, the other cryptocurrency wallet can be associated with a third-party unrelated to the service provider of FIG. 18 (i.e., an external account). In at least one example, the user can transfer all or a portion of a balance of the cryptocurrency stored in the third-party cryptocurrency wallet to the service provider of FIG. 18. Such a transaction can require the user to transfer an amount of the cryptocurrency in a message signed by user's private key to an address provided by the service provider of FIG. 18. In at least one example, the transaction can be sent to miners to bundle the transaction into a block of transactions and to verify the authenticity of the transactions in the block. Once a miner has verified the block, the block is written to a public, distributed blockchain where the service provider of FIG. 18 can then verify that the transaction has been confirmed and can credit the user's asset ledger 1914 with the transferred amount. When an account is funded by transferring cryptocurrency from a third-party cryptocurrency wallet, an update can be made to the public blockchain. Importantly, this update of the public blockchain need not take place at a time critical moment, such as when a transaction is being processed by a merchant in store or online.

In some examples, a user can purchase cryptocurrency to fund their cryptocurrency account. In some examples, the user can purchase cryptocurrency through services offered by the service provider of FIG. 18. As described above, in some examples, the service provider of FIG. 18 can acquire cryptocurrency from a third-party source. In such examples, the asset wallet 1910 can be associated with different addresses and can vary addresses used to acquire cryptocurrency so that its holdings are represented under a variety of addresses on a blockchain. When the service provider of FIG. 18 has their own holdings of cryptocurrency, users can acquire cryptocurrency directly from the service provider of FIG. 18. In some examples, the service provider of FIG. 18 can include logic for buying and selling cryptocurrency in order to maintain a desired level of cryptocurrency. The desired level can be based on a volume of transactions over a period, balances of collective user profiles cryptocurrency ledgers, exchange rates, or trends in changing of exchange rates such that the cryptocurrency is trending towards gaining or losing value with respect to the fiat currency. In all of these examples, the buying and selling of cryptocurrency, and therefore the associated updating of the public ledger can be separate from any customer-merchant transaction, and therefore not necessarily time-sensitive.

In examples where the service provider of FIG. 18 has its own cryptocurrency assets, cryptocurrency transferred in a transaction (e.g., data with address provided for receipt of transaction and a balance of cryptocurrency transferred in the transaction) can be stored in the asset wallet 1910. In at least one example, the service provider of FIG. 18 can credit the asset ledger 1914 of the user. Additionally, while the service provider of FIG. 18 recognizes that the user retains the value of the transferred cryptocurrency through crediting the asset ledger 1914, any person that inspects the blockchain will see the cryptocurrency as having been transferred to the service provider of FIG. 18. In some examples, the asset wallet 1910 can be associated with many different addresses. In such examples, any person that inspects the blockchain may not easily associate all cryptocurrency stored in asset wallet 1910 as belonging to the same entity. It is this presence of a private ledger that is used for real-time transactions and maintained by the service provider of FIG. 18, combined with updates to the public ledger at other times, that allows for extremely fast transactions using cryptocurrency to be achieved. In some examples, the "private ledger" can refer to the asset ledger 1912, which in some examples, can utilize the private blockchain 1919, as described herein. The "public ledger" can correspond to a public blockchain associated with the asset network.

In at least one example, a user's asset ledger 1914, fiat currency ledger 1916, or the like can be credited when conducting a transaction with another user (customer or merchant) wherein the user receives incoming currency. In some examples, a user can receive cryptocurrency in the form of payment for a transaction with another user. In at least one example, such cryptocurrency can be used to fund the asset ledger 1914. In some examples, a user can receive fiat currency or another currency in the form of payment for a transaction with another user. In at least one example, at least a portion of such funds can be converted into cryptocurrency by the service provider of FIG. 18 and used to fund the asset ledger 1914 of the user.

As addressed above, in some examples, users can also have other accounts maintained by the service provider of FIG. 18. For example, a user can also have an account in U.S. dollars, which can be tracked, for example, via the fiat currency ledger 1916. Such an account can be funded by transferring money from a bank account at a third-party bank to an account maintained by the service provider of FIG. 18 as is conventionally known. In some examples, a user can receive fiat currency in the form of payment for a transaction with another user. In such examples, at least a portion of such funds can be used to fund the fiat currency ledger 1916.

In some examples, a user can have one or more internal payment cards registered with the service provider of FIG. 18. Internal payment cards can be linked to one or more of the accounts associated with the user account 1920. In some embodiments, options with respect to internal payment cards can be adjusted and managed using an application (e.g., the payment application 1818).

In at least one example, as described above, each ledger can correspond to an account of the user that is managed by the service provider of FIG. 18. In at least one example, individual of the accounts can be associated with a wallet or a stored balance for use in payment transactions, peer-to-peer transactions, payroll payments, etc.

In at least one example, the user account 1920 can be associated with an asset wallet 1940. The asset wallet 1940 of the user can be associated with account information that can be stored in the user account data 1928 and, in some examples, can be associated with the user wallet key(s) 1932. In at least one example, the asset wallet 1940 can store data indicating an address provided for receipt of a cryptocurrency transaction. In at least one example, the balance of the asset wallet 1940 can be based at least in part on a balance of the asset ledger 1914. In at least one example, funds availed via the asset wallet 1940 can be stored in the asset wallet 1940 or the asset wallet 1910. Funds availed via the asset wallet 1910 can be tracked via the asset ledger 1914. The asset wallet 1940, however, can be associated with additional cryptocurrency funds.

In at least one example, when the service provider of FIG. 18 includes a private blockchain 1919 for recording and validating cryptocurrency transactions, the asset wallet 1940 can be used instead of, or in addition to, the asset ledger 1914. For example, at least one example, a merchant can provide the address of the asset wallet 1940 for receiving payments. In an example where a customer is paying in cryptocurrency and the customer has their own cryptocurrency wallet account associated with the service provider of FIG. 18, the customer can send a message signed by its private key including its wallet address (i.e., of the customer) and identifying the cryptocurrency and value to be transferred to the merchant's asset wallet 1940. The service provider of FIG. 18 can complete the transaction by reducing the cryptocurrency balance in the customer's cryptocurrency wallet and increasing the cryptocurrency balance in the merchant's asset wallet 1940. In addition to recording the transaction in the respective cryptocurrency wallets, the transaction can be recorded in the private blockchain 1919 and the transaction can be confirmed. A user can perform a similar transaction with cryptocurrency in a peer-to-peer transaction as described above. In at least one example, the cryptocurrency wallet account can be funded by a balance transfer from a third-party cryptocurrency wallet, as described above. Such a transaction can involve transfer by a user of an amount of cryptocurrency in a message signed by the user's private key to an address of the cryptocurrency wallet account. The transferred amount of cryptocurrency can then be within the cryptocurrency wallet account for use in later transactions.

While the asset ledger 1914 and/or asset wallet 1940 are each described above with reference to cryptocurrency, the asset ledger 1914 and/or asset wallet 1940 can alternatively be used in association with securities. In some examples, different ledgers and/or wallets can be used for different types of assets. That is, in some examples, a user can have multiple asset ledgers and/or asset wallets for tracking cryptocurrency, securities, or the like.

It should be noted that user(s) having accounts managed by the service provider of FIG. 18 is an aspect of the technology disclosed that enables technical advantages of increased processing speed and improved security.

Figure 20:
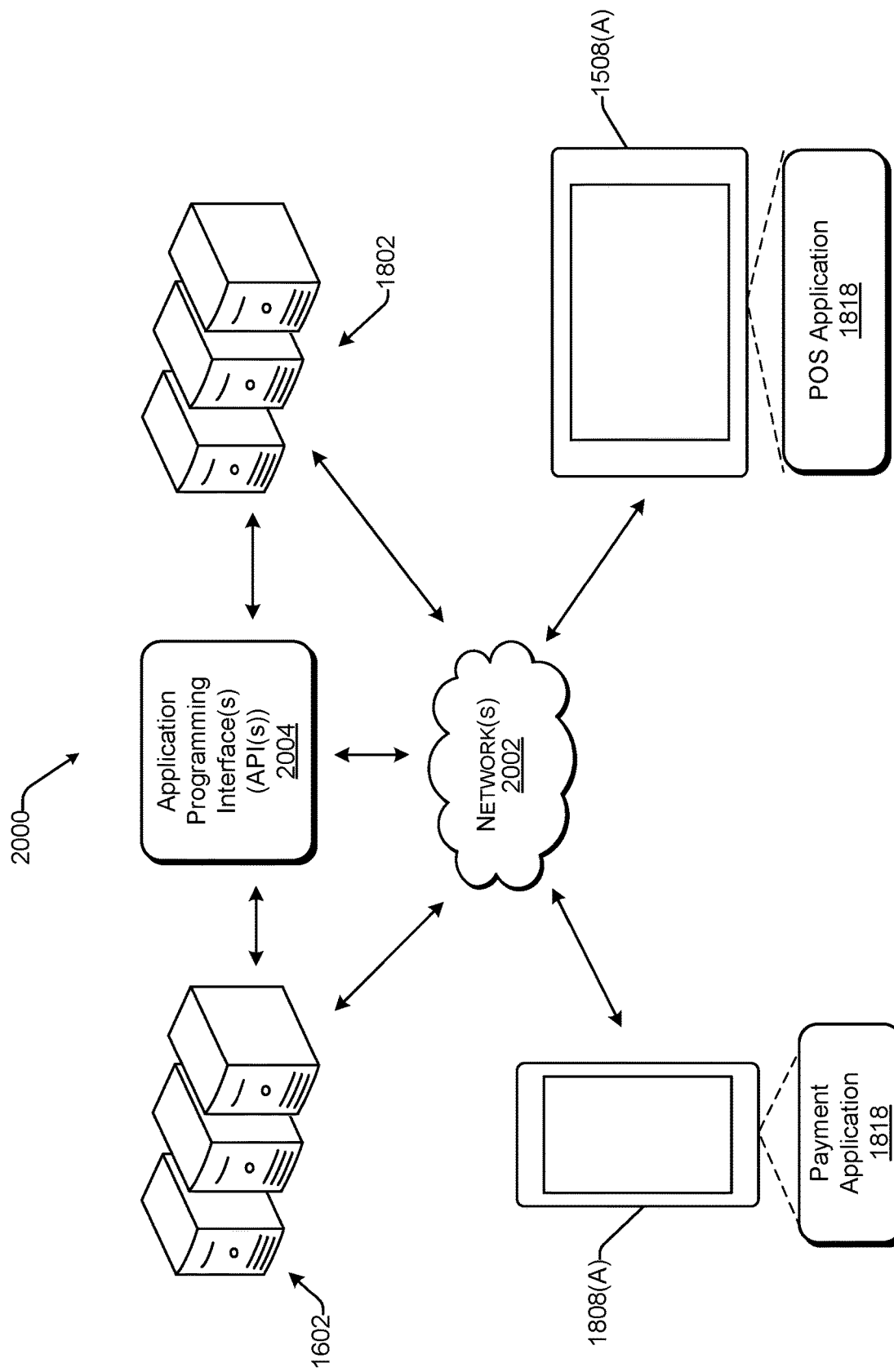
FIG. 20 is an example environment in which the environments of FIGS. 17 and 18 can be integrated to enable payments at the point-of-sale using assets associated with user accounts in the peer-to-peer environment of FIG. 19 with which techniques described herein can be implemented, according to an embodiment described herein.

FIG. 20 illustrates an example environment 2000 wherein the environment 1700 and the environment 1800 can be integrated to enable payments at the point-of-sale using assets associated with user accounts in the peer-to-peer environment of FIG. 18. As illustrated, each of the components can communicate with one another via one or more networks 2002. In some examples, one or more APIs 2004 or other functional components can be used to facilitate such communication.

In at least one example, the example environment can enable contactless payments, via integration of peer-to-peer payment, or other payment making, platform(s) and payment processing platform(s), are described herein. For the purpose of FIG. 19, the environment 1700 can refer to a payment processing platform and the environment 1800 can refer to a peer-to-peer payment, or payment making, platform. In an example, such an integration can enable a customer to participate in a transaction via their own computing device instead of interacting with a merchant device of a merchant, such as the merchant device 1708(A). In such an example, the POS application 1718, associated with a payment processing platform and executable by the merchant device 1708(A) of the merchant, can present a Quick Response (QR) code, or other code that can be used to identify a transaction (e.g., a transaction code), in association with a transaction between the customer and the merchant. The QR code, or other transaction code, can be provided to the POS application 1718 via an API associated with the peer-to-peer payment platform. In an example, the customer can utilize their own computing device, such as the user device 1808(A), to capture the QR code, or the other transaction code, and to provide an indication of the captured QR code, or other transaction code, to server(s) 1702 and/or server(s) 1802.

Based at least in part on the integration of the peer-to-peer payment platform and the payment processing platform (e.g., via the API), the server(s) 1702 and/or 1802 associated with each can exchange communications with each other—and with a payment application 1818 associated with the peer-to-peer payment platform and/or the POS application 1718—to process payment for the transaction using a peer-to-peer payment where the customer is a first "peer" and the merchant is a second "peer." In at least one example, the peer-to-peer payment platform can transfer funds from an account of the customer, maintained by the peer-to-peer payment platform, to an account of the merchant, maintained by the payment processing platform, thereby facilitating a contactless (peer-to-peer) payment for the transaction. That is, based at least in part on receiving an indication of which payment method a user (e.g., customer or merchant) intends to use for a transaction, techniques described herein utilize an integration between a peer-to-peer payment platform and payment processing platform (which can be a first- or third-party integration) such that a QR code, or other transaction code, specific to the transaction can be used for providing transaction details, location details, customer details, or the like to a computing device of the customer, such as the user device 1808(A), to enable a contactless (peer-to-peer) payment for the transaction.

In at least one example, techniques described herein can offer improvements to conventional payment technologies at both brick-and-mortar points of sale and online points of sale. For example, at brick-and-mortar points of sale, techniques described herein can enable customers to "scan to pay," by using their computing devices to scan QR codes, or other transaction codes, encoded with data as described herein, to remit payments for transactions. In such a "scan to pay" example, a customer computing device, such as the user device 1808(A), can be specially configured as a buyer-facing device that can enable the customer to view cart building in near real-time, interact with a transaction during cart building using the customer computing device, authorize payment via the customer computing device, apply coupons or other incentives via the customer computing device, add gratuity, loyalty information, feedback, or the like via the customer computing device, etc. In another example, merchants can "scan for payment" such that a customer can present a QR code, or other transaction code, that can be linked to a payment instrument or stored balance. Funds associated with the payment instrument or stored balance can be used for payment of a transaction.

As described above, techniques described herein can offer improvements to conventional payment technologies at online points of sale, as well as brick-and-mortar points of sale. For example, multiple applications can be used in combination during checkout. That is, the POS application 1718 and the payment application 1818, as described herein, can process a payment transaction by routing information input via the merchant application to the payment application for completing a "frictionless" payment. This can be referred to as "in-application payment." In another example of "in-application payment," the payment application described herein can be created or modified via a software developer kit (SDK) to enable in-application payment.

Returning to the "scan to pay" examples described herein, QR codes, or other transaction codes, can be presented in association with a merchant web page or ecommerce web page. In at least one example, techniques described herein can enable customers to "scan to pay," by using their computing devices to scan or otherwise capture QR codes, or other transaction codes, encoded with data, as described herein, to remit payments for online/ecommerce transactions. In such a "scan to pay" example, a customer computing device, such as the user device 1808(A), can be specially configured as a buyer-facing device that can enable the customer to view cart building in near real-time, interact with a transaction during cart building using the customer computing device, authorize payment via the customer computing device, apply coupons or other incentives via the customer computing device, add gratuity, loyalty information, feedback, or the like via the customer computing device, etc.

In an example, a customer can desire to purchase items from a merchant. When the customer approaches the merchant to check out, the merchant (e.g., a worker associated therewith) can add indications of the items to a virtual cart via the POS application 1718, associated with a payment processing platform, on the merchant device 1708(A). In an example, the merchant can use the payment processing platform to process payments, and the payment processing platform can process payments for the merchant, as well as other merchants. That is, the payment processing platform can be an aggregator. After adding the first item, or otherwise providing an indication to start a transaction, a display of the merchant device 1708(A) can present a QR code, or other transaction code, that can be associated with a peer-to-peer payment platform. The customer can use a camera associated with the user device 1808(A) to scan, or otherwise capture, the QR code. If the customer is already associated with the peer-to-peer payment platform (e.g., has an existing account, previously onboarded, etc.), the peer-to-peer platform can provide an indication of the scanned QR code to the payment processing platform. This interaction—between the customer computing device and the QR code—can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. Such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

As an additional or alternative example, a customer can desire to purchase items from a merchant. When the customer approaches the merchant to check out, the merchant (e.g., a worker associated therewith) can add indications of the items to a virtual cart via the POS application 1718, associated with a payment processing platform, on the merchant device 1708(A). In an example, the merchant can use the payment processing platform to process payments, and the payment processing platform can process payments for the merchant, as well as other merchants. That is, the payment processing platform can be an aggregator. After adding the first item, or otherwise providing an indication to start a transaction, the POS application 1718 can cause a text message with a resource locator (e.g., uniform resource locator (URL)) that can be associated with a peer-to-peer payment platform to be sent to the user device 1808(A). The customer can interact with the resource locator and, if the customer is already associated with the peer-to-peer payment platform (e.g., has an existing account, previously onboarded, etc.), the peer-to-peer payment platform can provide an indication of the interaction with the resource locator to the payment processing platform. This interaction—between the customer and the resource locator presented via the customer computing device—can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. As described above, such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

The same or similar techniques can be applicable in online and/or ecommerce selling channels as well. In such an example, a QR code, or other transaction code, can be presented via an online store/ecommerce web page of a merchant. The customer can use a camera associated with a customer computing device, such as the user device 1808 (A), to scan, or otherwise capture, the QR code. If the customer is already associated with the peer-to-peer payment platform (e.g., has an existing account, previously onboarded, etc.), the peer-to-peer platform can provide an indication of the scanned QR code to the payment processing platform. This interaction—between the customer computing device and the QR code—can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. Such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

As described above, techniques described herein offer improvements to conventional payment technologies. In an example, techniques described herein can enable transaction data to be sent from a POS application 1718 of a merchant device 1708(A) at a brick-and-mortar store of a merchant to a payment application 1818 of a user device 1808(A) of a customer to enable the customer to participate in a transaction via their own computing device. For instance, in a "scan to pay" example as described above, based at least in part on capturing the QR code, or other transaction code, via the user device 1808(A), the payment processing platform can provide transaction data to the peer-to-peer payment platform for presentation via the payment application 1818 on the user device 1808(A). In some examples, the customer can watch items being added to their cart (e.g., via a user interface presented via the payment application). As an item is added to a virtual cart by the merchant—via the POS application 1718 on the merchant device 1708(A) of the merchant—the customer can see the item in their virtual cart on their own computing device in near-real time. In another example, the peer-to-peer payment platform can analyze transaction data as it is received to determine whether an incentive (e.g., a discount, a loyalty reward, prioritized access or booking, etc.) is applicable to the transaction and can automatically apply the incentive or send a recommendation to the payment application 1818 for presentation via a user interface associated therewith. In addition to enabling a customer to participate in a transaction during cart building, techniques described herein can enable a customer to complete a transaction, and in some examples, provide gratuity (i.e., a tip), feedback, loyalty information, or the like, via the user device 1808(A) during or after payment of the transaction.

In some examples, based at least in part on capturing the QR code, or other transaction code, the payment processing platform can provide transaction data to the peer-to-peer payment platform for presentation via the payment application 1818 on the computing device of the customer, such as the user device 1808(A), to enable the customer to complete the transaction via their own computing device. In some examples, in response to receiving an indication that the QR code, or other transaction code, has been captured or otherwise interacted with via the customer computing device, the peer-to-peer payment platform can determine that the customer authorizes payment of the transaction using funds associated with a stored balance of the customer that is managed and/or maintained by the peer-to-peer payment platform. Such authorization can be implicit such that the interaction with the transaction code can imply authorization of the customer. In some examples, in response to receiving an indication that the QR code, or other transaction code, has been captured or otherwise interacted with via the customer computing device, the peer-to-peer payment platform can request authorization to process payment for the transaction using the funds associated with the stored balance and the customer can interact with the payment application to authorize the settlement of the transaction. A response to such a request can provide an express authorization of the customer. In some examples, such an authorization (implicit or express) can be provided prior to a transaction being complete and/or initialization of a conventional payment flow. That is, in some examples, such an authorization can be provided during cart building (e.g., adding item(s) to a virtual cart) and/or prior to payment selection. In some examples, such an authorization can be provided after payment is complete (e.g., via another payment instrument). Based at least in part on receiving an authorization to use funds associated with the stored balance (e.g., implicitly or explicitly) of the customer, the peer-to-peer payment platform can transfer funds from the stored balance of the customer to the payment processing platform. In at least one example, the payment processing platform can deposit the funds, or a portion thereof, into a stored balance of the merchant that is managed and/or maintained by the payment processing platform. That is, techniques described herein enable the peer-to-peer payment platform to transfer funds to the payment processing platform to settle payment of the transaction. In such an example, the payment processing platform can be a "peer" to the customer in a peer-to-peer transaction.

In some examples, techniques described herein can enable the customer to interact with the transaction after payment for the transaction has been settled. For example, in at least one example, the payment processing platform can cause a total amount of a transaction to be presented via a user interface associated with the payment application 1818 such that the customer can provide gratuity, feedback, loyalty information, or the like, via an interaction with the user interface. In some examples, because the customer has already authorized payment via the peer-to-peer payment platform, if the customer inputs a tip, the peer-to-peer payment platform can transfer additional funds, associated with the tip, to the payment processing platform. This pre-authorization (or maintained authorization) of sorts can enable faster, more efficient payment processing when the tip is received. Further, the customer can provide feedback and/or loyalty information via the user interface presented by the payment application, which can be associated with the transaction.

As described above—and also below—techniques described herein enable contactless payments. That is, by integrating the payment processing platform with the peer-to-peer payment platform, merchants and customers can participate in transactions via their own computing devices without needing to touch, or otherwise be in contact, with one another. By moving aspects of a transaction that are traditionally performed on a computing device of a merchant to a computing device of a customer, customers can have more control over the transaction and can have more privacy. That is, customers can monitor items that are added to their cart to ensure accuracy. Further, customers can authorize payments, use rewards, claim incentives, add gratuity, or the like without being watched by the merchant or other customers.

In some examples, such as when the QR code, or other transaction code, is captured by the computing device of the customer prior to a payment selection user interface being presented via the POS application 1718, payment for the transaction can be pre-authorized such that when the time comes to complete the transaction, neither the payment processing platform nor the peer-to-peer payment platform need to re-authorize payment at that time. That is, techniques described herein can enable faster, more efficient transactions. Further, in some examples, when a customer adds a tip after payment for a transaction has been settled, in some examples, because the peer-to-peer payment platform has already been authorized, the peer-to-peer payment platform and the payment processing platform may not need to obtain another authorization to settle funds associated with the tip.

That is, in such examples, fewer data transmissions are required and thus, techniques described herein can conserve bandwidth and reduce network congestion.

Moreover, as described above, funds associated with tips can be received faster and more efficiently than with conventional payment technologies.

In addition to the improvements described above, techniques described herein can provide enhanced security in payment processing. In some examples, if a camera, or other sensor, used to capture a QR code, or other transaction code, is integrated into a payment application 1818 (e.g., instead of a native camera, or other sensor), techniques described herein can utilize an indication of the QR code, or other transaction code, received from the payment application for two-factor authentication to enable more secure payments.

It should be noted that, while techniques described herein are directed to contactless payments using QR codes or other transaction codes, in additional or alternative examples, techniques described herein can be applicable for contact payments. That is, in some examples, instead of scanning, capturing, or otherwise interacting with a QR code or transaction code, a customer can swipe a payment instrument (e.g., a credit card, a debit card, or the like) via a reader device associated with a merchant device, dip a payment instrument into a reader device associated with a merchant computing device, tap a payment instrument with a reader device associated with a merchant computing device, or the like, to initiate the provisioning of transaction data to the customer computing device. For example, based at least in part on detecting a dip, tap, swipe, or the like, the payment processing platform can associate a customer with a transaction and provide at least a portion of transaction data associated with the transaction to a customer computing device associated therewith. In some examples, the payment instrument can be associated with the peer-to-peer payment platform as described herein (e.g., a debit card linked to a stored balance of a customer) such that when the payment instrument is caused to interact with a payment reader, the payment processing platform can exchange communications with the peer-to-peer payment platform to authorize payment for a transaction and/or provision associated transaction data to a computing device of the customer associated with the transaction. The transaction for instance, may support the workflow of FIG. 15.

Figure 21:
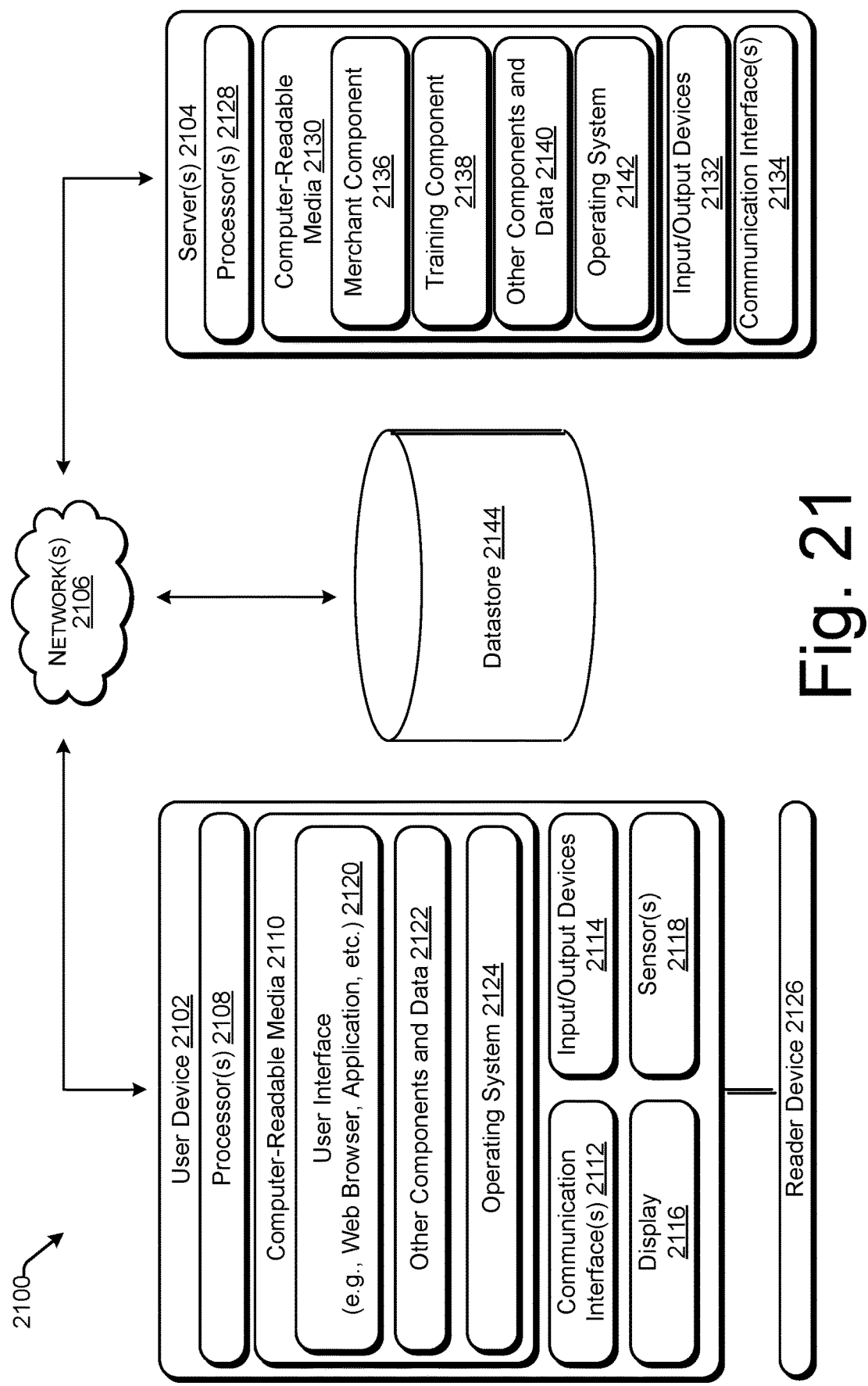
FIG. 21 is a block diagram showing a system for performing techniques described herein with which techniques described herein can be implemented, according to an embodiment described herein.

FIG. 21 depicts an illustrative block diagram illustrating a system 2100 for performing techniques described herein. The system 2100 includes a user device 2102, that communicates with server computing device(s) (e.g., server(s) 2104) via network(s) 2106 (e.g., the Internet, cable network(s), cellular network(s), cloud network(s), wireless network(s) (e.g., Wi-Fi) and wired network(s), as well as close-range communications such as Bluetooth®, Bluetooth® low energy (BLE), and the like). While a single user device 2102 is illustrated for the edge device 106 and the second edge device 146, in additional or alternate examples, the system 2100 can have multiple user devices.

In at least one example, the user device 2102 can be any suitable type of computing device, e.g., portable, semi-portable, semi-stationary, or stationary. Some examples of the user device 2102 can include, but are not limited to, a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. That is, the user device 2102 can be any computing device capable of sending communications and performing the functions according to the techniques described herein. The user device 2102 can include devices, e.g., payment card readers, or components capable of accepting payments, as described below.

In the illustrated example, the user device 2102 includes one or more processors 2108, one or more computer-readable media 2110, one or more communication interface(s) 2112, one or more input/output (I/O) devices 2114, a display 2116, and sensor(s) 2118.

In at least one example, each processor 2108 can itself comprise one or more processors or processing cores. For example, the processor(s) 2108 can be implemented as one or more microprocessors, microcomputers, microcontrollers, digital signal processors, central processing units, state machines, logic circuitries, and/or any devices that manipulate signals based on operational instructions. In some examples, the processor(s) 2108 can be one or more hardware processors and/or logic circuits of any suitable type specifically programmed or configured to execute the algorithms and processes described herein. The processor(s) 2108 can be configured to fetch and execute computer-readable processor-executable instructions stored in the computer-readable media 2110.

Depending on the configuration of the user device 2102, the computer-readable media 2110 can be an example of tangible non-transitory computer storage media and can include volatile and nonvolatile memory and/or removable and non-removable media implemented in any type of technology for storage of information such as computer-readable processor-executable instructions, data structures, program components or other data. The computer-readable media 2110 can include, but is not limited to, RAM, ROM, EEPROM, flash memory, solid-state storage, magnetic disk storage, optical storage, and/or other computer-readable media technology. Further, in some examples, the user device 2102 can access external storage, such as RAID storage systems, storage arrays, network attached storage, storage area networks, cloud storage, or any other medium that can be used to store information and that can be accessed by the processor(s) 2108 directly or through another computing device or network. Accordingly, the computer-readable media 2110 can be computer storage media able to store instructions, components or components that can be executed by the processor(s) 2108. Further, when mentioned, non-transitory computer-readable media exclude media such as energy, carrier signals, electromagnetic waves, and signals per se.

The computer-readable media 2110 can be used to store and maintain any number of functional components that are executable by the processor(s) 2108. In some implementations, these functional components comprise instructions or programs that are executable by the processor(s) 2108 and that, when executed, implement operational logic for performing the actions and services attributed above to the user device 2102. Functional components stored in the computer-readable media 2110 can include a user interface 2120 to enable users to interact with the user device 2102, and thus the server(s) 2104 and/or other networked devices. In at least one example, the user interface 2120 can be presented via a web browser, or the like. In other examples, the user interface 2120 can be presented via an application, such as a mobile application or desktop application, which can be provided by a service provider associated with the server(s) 2104, or which can be an otherwise dedicated application. In some examples, the user interface 2120 can include user interfaces and shown and described in relation to FIGS. 5, 13, 14, and 15. In at least one example, a user can interact with the user interface via touch input, spoken input, gesture, or any other type of input. The word "input" is also used to describe "contextual" input that may not be directly provided by the user via the user interface 2120. For example, user's interactions with the user interface 2120 are analyzed using, e.g., natural language processing techniques, to determine context or intent of the user, which may be treated in a manner similar to "direct" user input.

Depending on the type of the user device 2102, the computer-readable media 2110 can also optionally include other functional components and data, such as other components and data 2122, which can include programs, drivers, etc., and the data used or generated by the functional components. In addition, the computer-readable media 2110 can also store data, data structures and the like, that are used by the functional components. Further, the user device 2102 can include many other logical, programmatic and physical components, of which those described are merely examples that are related to the discussion herein.

In at least one example, the computer-readable media 2110 can include additional functional components, such as an operating system 2124 for controlling and managing various functions of the user device 2102 and for enabling basic user interactions.

The communication interface(s) 2112 can include one or more interfaces and hardware components for enabling communication with various other devices, such as over the network(s) 2106 or directly. For example, communication interface(s) 2112 can enable communication through one or more network(s) 2106, which can include, but are not limited any type of network known in the art, such as a local area network or a wide area network, such as the Internet, and can include a wireless network, such as a cellular network, a cloud network, a local wireless network, such as Wi-Fi and/or close-range wireless communications, such as Bluetooth®, BLE, NFC, RFID, a wired network, or any other such network, or any combination thereof. Accordingly, network(s) 2106 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

Embodiments of the disclosure may be provided to users through a cloud computing infrastructure. Cloud computing refers to the provision of scalable computing resources as a service over a network, to enable convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

The user device 2102 can further include one or more input/output (I/O) devices 2114. The I/O devices 2114 can include speakers, a microphone, a camera, and various user controls (e.g., buttons, a joystick, a keyboard, a keypad, etc.), a haptic output device, and so forth. The I/O devices

2114 can also include attachments that leverage the accessories (audio-jack, USB-C, Bluetooth, etc.) to connect with the user device 2102.

In at least one example, user device 2102 can include a display 2116. Depending on the type of computing device(s) used as the user device 2102, the display 2116 can employ any suitable display technology. For example, the display 2116 can be a liquid crystal display, a plasma display, a light emitting diode display, an OLED (organic light-emitting diode) display, an electronic paper display, or any other suitable type of display able to present digital content thereon. In at least one example, the display 2116 can be an augmented reality display, a virtual reality display, or any other display able to present and/or project digital content. In some examples, the display 2116 can have a touch sensor associated with the display 2116 to provide a touchscreen display configured to receive touch inputs for enabling interaction with a graphic interface presented on the display 2116. Accordingly, implementations herein are not limited to any particular display technology. Alternatively, in some examples, the user device 2102 may not include the display 2116, and information can be presented by other means, such as aurally, haptically, etc.

In addition, the user device 2102 can include sensor(s) 2118. The sensor(s) 2118 can include a GPS device able to indicate location information. Further, the sensor(s) 2118 can include, but are not limited to, an accelerometer, gyroscope, compass, proximity sensor, camera, microphone, and/or a switch.

In some example, the GPS device can be used to identify a location of a user. In at least one example, the location of the user can be used by the service provider, described above, to provide one or more services. That is, in some examples, the service provider can implement geofencing to provide particular services to users. As an example, with a lending service, location can be used to confirm that a stated purpose of a loan corresponds to evidence of use (e.g., Is the user using the loan consistent with what he or she said he or she was going to use it for?). Furthermore, in some examples, location can be used for payroll purposes. As an example, if a contractor completes a project, the contractor can provide a geo-tagged image (e.g., tagged based on location information availed by the GPS device). In some examples, location can be used for facilitating peer-to-peer payments between nearby users and/or for sending users notifications regarding available appointments with merchant(s) located proximate to the users. In at least one example, location can be used for taking payments from nearby customers when they leave a geofence, or location can be used to initiate an action responsive to users enter a brick-and-mortar store of a merchant. Location can be used in additional or alternative ways as well.

Additionally, the user device 2102 can include various other components that are not shown, examples of which include removable storage, a power source, such as a battery and power control unit, a barcode scanner, a printer, a cash drawer, and so forth.

In addition, in some examples, the user device 2102 can include, be connectable to, or otherwise be coupled to a reader device 2126, for reading payment instruments and/or identifiers associated with payment objects. In some examples, as described above, the reader device 2126 can plug in to a port in the user device 2102, such as a microphone port, a headphone port, an audio-jack, a data port, or other suitable port. In additional or alternative examples, the reader device 2126 can be coupled to the user device 2102 via another wired or wireless connection, such as via a Bluetooth®, BLE, and so on. The reader device 2126 can include a read head for reading a magnetic strip of a payment card, and further can include encryption technology for encrypting the information read from the magnetic strip. Additionally or alternatively, the reader device 2126 can be an EMV payment reader, which in some examples, can be embedded in the user device 2102. Moreover, numerous other types of readers can be employed with the user device 2102 herein, depending on the type and configuration of the user device 2102.

The reader device 2126 may be a portable magnetic stripe card reader, optical scanner, smartcard (card with an embedded IC chip) reader (e.g., an EMV-compliant card reader or short-range communication-enabled reader), RFID reader, or the like, configured to detect and obtain data off any payment instrument. Accordingly, the reader device 2126 may include hardware implementation, such as slots, magnetic tracks, and rails with one or more sensors or electrical contacts to facilitate detection and acceptance of a payment instrument. That is, the reader device 2126 may include hardware implementations to enable the reader device 2126 to interact with a payment instrument via a swipe (i.e., a card-present transaction where a customer slides a card having a magnetic strip through a payment reader that captures payment data contained in the magnetic strip), a dip (i.e., a card-present transaction where a customer inserts a card having an embedded microchip (i.e., chip) into a payment reader first until the payment reader prompts the customer to remove the card), or a tap (i.e., a card-present transaction where a customer may tap or hover his or her electronic device such as a smart phone running a payment application over a payment reader to complete a transaction via short-range communication) to obtain payment data associated with a customer. Additionally or optionally, the reader device 2126 may also include a biometric sensor to receive and process biometric characteristics and process them as payment instruments, given that such biometric characteristics are registered with the payment service and connected to a financial account with a bank server.

The reader device 2126 may include processing unit(s), computer-readable media, a reader chip, a transaction chip, a timer, a clock, a network interface, a power supply, and so on. The processing unit(s) of the reader device 2126 may execute one or more components and/or processes to cause the reader device 2126 to perform a variety of functions, as set forth above and explained in further detail in the following disclosure. In some examples, the processing unit(s) may include a central processing unit (CPU), a graphics processing unit (GPU), a CPU and a GPU, or processing units or components known in the art. Additionally, each of the processing unit(s) may possess its own local memory, which also may store program components, program data, and/or one or more operating systems. Depending on the exact configuration and type of the reader device 2126, the computer-readable media may include volatile memory (such as RAM), non-volatile memory (such as ROM, flash memory, miniature hard drive, memory card, or the like), or some combination thereof. In at least one example, the computer-readable media of the reader device 2126 may include at least one component for performing various functions as described herein.

The reader chip may perform functionalities to control the operations and processing of the reader device 2126. That is, the reader chip may perform functionalities to control payment interfaces (e.g., a contactless interface, a contact interface, etc.), a wireless communication interface, a wired interface, a user interface (e.g., a signal condition device (FPGA)), etc. Additionally, the reader chip may perform functionality to control the timer, which may provide a timer signal indicating an amount of time that has lapsed following a particular event (e.g., an interaction, a power-down event, etc.). Moreover, the reader chip may perform functionality to control the clock, which may provide a clock signal indicating a time. Furthermore, the reader chip may perform functionality to control the network interface, which may interface with the network(s) 2106, as described below.

Additionally, the reader chip may perform functionality to control the power supply. The power supply may include one or more power supplies such as a physical connection to AC power or a battery. Power supply may include power conversion circuitry for converting AC power and generating a plurality of DC voltages for use by components of reader device 2126. When power supply includes a battery, the battery may be charged via a physical power connection, via inductive charging, or via any other suitable method.

The transaction chip may perform functionalities relating to processing of payment transactions, interfacing with payment instruments, cryptography, and other payment-specific functionality. That is, the transaction chip may access payment data associated with a payment instrument and may provide the payment data to a POS terminal, as described above. The payment data may include, but is not limited to, a name of the customer, an address of the customer, a type (e.g., credit, debit, etc.) of a payment instrument, a number associated with the payment instrument, a verification value (e.g., PIN Verification Key Indicator (PVKI), PIN Verification Value (PVV), Card Verification Value (CVV), Card Verification Code (CVC), etc.) associated with the payment instrument, an expiration data associated with the payment instrument, a primary account number (PAN) corresponding to the customer (which may or may not match the number associated with the payment instrument), restrictions on what types of charges/debts may be made, etc. Additionally, the transaction chip may encrypt the payment data upon receiving the payment data.

It should be understood that in some examples, the reader chip may have its own processing unit(s) and computer-readable media and/or the transaction chip may have its own processing unit(s) and computer-readable media. In other examples, the functionalities of reader chip and transaction chip may be embodied in a single chip or a plurality of chips, each including any suitable combination of processing units and computer-readable media to collectively perform the functionalities of reader chip and transaction chip as described herein.

While, the user device 2102, which can be a POS terminal, and the reader device 2126 are shown as separate devices, in additional or alternative examples, the user device 2102 and the reader device 2126 can be part of a single device, which may be a battery-operated device. In such an example, components of both the user device 2102 and the reader device 2126 may be associated with the single device. In some examples, the reader device 2126 can have a display integrated therewith, which can be in addition to (or as an alternative of) the display 2116 associated with the user device 2102.

The server(s) 2104 can include one or more servers or other types of computing devices that can be embodied in any number of ways. For example, in the example of a server, the components, other functional components, and data can be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of the server(s) 2104 as being present in a single location, these components and data can alternatively be distributed across different computing devices and different locations in any manner. Consequently, the functions can be implemented by one or more server computing devices, with the various functionality described above distributed in various ways across the different computing devices. Multiple server(s) 2104 can be located together or separately, and organized, for example, as virtual servers, server banks and/or server farms. The described functionality can be provided by the servers of a single merchant or enterprise, or can be provided by the servers and/or services of multiple different customers or enterprises.

In the illustrated example, the server(s) 2104 can include one or more processors 2128, one or more computer-readable media 2130, one or more I/O devices 2132, and one or more communication interfaces 2134. Each processor 2128 can be a single processing unit or a number of processing units, and can include single or multiple computing units or multiple processing cores. The processor(s) 2128 can be implemented as one or more microprocessors, microcomputers, microcontrollers, digital signal processors, central processing units, state machines, logic circuitries, and/or any devices that manipulate signals based on operational instructions. For example, the processor(s) 2128 can be one or more hardware processors and/or logic circuits of any suitable type specifically programmed or configured to execute the algorithms and processes described herein. The processor(s) 2128 can be configured to fetch and execute computer-readable instructions stored in the computer-readable media 2130, which can program the processor(s) 2128 to perform the functions described herein.

The computer-readable media 2130 can include volatile and nonvolatile memory and/or removable and non-removable media implemented in any type of technology for storage of information, such as computer-readable instructions, data structures, program components, or other data. Such computer-readable media 2130 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the server(s) 2104, the computer-readable media 2130 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 2130 can be used to store any number of functional components that are executable by the processor(s) 2128. In many implementations, these functional components comprise instructions or programs that are executable by the processors 2128 and that, when executed, specifically configure the one or more processors 2128 to perform the actions attributed above to the service provider and/or payment processing service. Functional components stored in the computer-readable media 2130 can optionally include the digital wallet 136, sentiment application 138, and modules of the node manager module 120 and sentiment document 130.

The merchant component 2136 can be configured to receive transaction data from POS systems. The merchant component 2136 can transmit requests (e.g., authorization, capture, settlement, etc.) to payment service server computing device(s) to facilitate POS transactions between merchants and customers. The merchant component 2136 can communicate the successes or failures of the POS transactions to the POS systems.

The training component 2138 can be configured to train models using machine-learning mechanisms. For example, a machine-learning mechanism can analyze training data to train a data model that generates an output, which can be a recommendation, a score, and/or another indication. Machine-learning mechanisms can include, but are not limited to supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc. In at least one example, machine-trained data models can be stored in a datastore associated with the user device(s) 2102 and/or the server(s) 2104 for use at a time after the data models have been trained (e.g., at runtime).

The one or more other components and data 2140 the functionality of which is described, at least partially, above. Further, the one or more other components and data 2140 can include programs, drivers, etc., and the data used or generated by the functional components. Further, the server(s) 2104 can include many other logical, programmatic and physical components, of which those described above are merely examples that are related to the discussion herein.

The one or more "components" referenced herein may be implemented as more components or as fewer components, and functions described for the components may be redistributed depending on the details of the implementation. The term "component," as used herein, refers broadly to software stored on non-transitory storage medium (e.g., volatile or non-volatile memory for a computing device), hardware, or firmware (or any combination thereof) components. Modules are typically functional such that the modules generate useful data or other output using specified input(s). A component may or may not be self-contained. An application program (also called an "application") may include one or more components, or a component may include one or more application programs that can be accessed over a network or downloaded as software onto a device (e.g., executable code causing the device to perform an action). An application program (also called an "application") may include one or more components, or a component may include one or more application programs. In additional and/or alternative examples, the component(s) may be implemented as computer-readable instructions, various data structures, and so forth via at least one processing unit to configure the computing device(s) described herein to execute instructions and to perform operations as described herein.

In some examples, a component may include one or more application programming interfaces (APIs) to perform some or all of its functionality (e.g., operations). In at least one example, a software developer kit (SDK) can be provided by the service provider to allow third-party developers to include service provider functionality and/or avail service provider services in association with their own third-party applications. Additionally or alternatively, in some examples, the service provider can utilize a SDK to integrate third-party service provider functionality into its applications. That is, API(s) and/or SDK(s) can enable third-party developers to customize how their respective third-party applications interact with the service provider or vice versa.

The computer-readable media 2130 can additionally include an operating system 2142 for controlling and managing various functions of the server(s) 2104.

The communication interface(s) 2134 can include one or more interfaces and hardware components for enabling communication with various other devices, such as over the network(s) 2106 or directly. For example, communication interface(s) 2134 can enable communication through one or more network(s) 2106, which can include, but are not limited any type of network known in the art, such as a local area network or a wide area network, such as the Internet, and can include a wireless network, such as a cellular network, a local wireless network, such as Wi-Fi and/or close-range wireless communications, such as Bluetooth®, BLE, NFC, RFID, a wired network, or any other such network, or any combination thereof.

Accordingly, network(s) 2106 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

The server(s) 2104 can further be equipped with various I/O devices 2132. Such I/O devices 2132 can include a display, various user interface controls (e.g., buttons, joystick, keyboard, mouse, touch screen, biometric or sensory input devices, etc.), audio speakers, connection ports and so forth.

In at least one example, the system 2100 can include a datastore 2144 that can be configured to store data that is accessible, manageable, and updatable. In some examples, the datastore 2144 can be integrated with the user device 2102 and/or the server(s) 2104. In other examples, as shown in FIG. 21, the datastore 2144 can be located remotely from the server(s) 2104 and can be accessible to the server(s) 2104. The datastore 2144 can comprise multiple databases and/or servers connected locally and/or remotely via the network(s) 2106.

In at least one example, the datastore 2144 can store user profiles, which can include merchant profiles, customer profiles, and so on.

Merchant profiles can store, or otherwise be associated with, data associated with merchants. For instance, a merchant profile can store, or otherwise be associated with, information about a merchant (e.g., name of the merchant, geographic location of the merchant, operating hours of the merchant, employee information, etc.), a merchant category classification (MCC), item(s) offered for sale by the merchant, hardware (e.g., device type) used by the merchant, transaction data associated with the merchant (e.g., transactions conducted by the merchant, payment data associated with the transactions, items associated with the transactions, descriptions of items associated with the transactions, itemized and/or total spends of each of the transactions, parties to the transactions, dates, times, and/or locations associated with the transactions, etc.), loan information associated with the merchant (e.g., previous loans made to the merchant, previous defaults on said loans, etc.), risk information associated with the merchant (e.g., indications of risk, instances of fraud, chargebacks, etc.), appointments information (e.g., previous appointments, upcoming (scheduled) appointments, timing of appointments, lengths of appointments, etc.), payroll information (e.g., employees, payroll frequency, payroll amounts, etc.), employee information, reservations data (e.g., previous reservations, upcoming (scheduled) reservations, interactions associated with such reservations, etc.), inventory data, customer service data, etc. The merchant profile can securely store bank account information as provided by the merchant. Further, the merchant profile can store payment information associated with a payment instrument linked to a stored balance of the merchant, such as a stored balance maintained in a ledger by the service provider.

Customer profiles can store customer data including, but not limited to, customer information (e.g., name, phone number, address, banking information, etc.), customer preferences (e.g., learned or customer-specified), purchase history data (e.g., identifying one or more items purchased (and respective item information), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, customer service data, etc.

Furthermore, in at least one example, the datastore 2144 can store inventory database(s) and/or catalog database(s). As described above, an inventory can store data associated with a quantity of each item that a merchant has available to the merchant. Furthermore, a catalog can store data associated with items that a merchant has available for acquisition. The datastore 2144 can store additional or alternative types of data as described herein.

The phrases "in some examples," "according to various examples," "in the examples shown," "in one example," "in other examples," "various examples," "some examples," and the like generally mean the particular feature, structure, or characteristic following the phrase is included in at least one example of the present invention, and may be included in more than one example of the present invention. In addition, such phrases do not necessarily refer to the same examples or to different examples.

If the specification states a component or feature "can," "may," "could," or "might" be included or have a characteristic, that particular component or feature is not required to be included or have the characteristic.

Further, the aforementioned description is directed to devices and applications that are related to payment technology. However, it will be understood, that the technology can be extended to any device and application. Moreover, techniques described herein can be configured to operate irrespective of the kind of payment object reader, POS terminal, web applications, mobile applications, POS topologies, payment cards, computer networks, and environments.

Various figures included herein are flowcharts showing example methods involving techniques as described herein. The methods illustrated are described with reference to components described in the figures for convenience and ease of understanding. However, the methods illustrated are not limited to being performed using components described the figures and such components are not limited to performing the methods illustrated herein.

Furthermore, the methods described above are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the methods can be combined in whole or in part with each other or with other methods.

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
    generating a decentralized network of nodes, the nodes individually configured to store, receive, and transmit data based on rules associated with the nodes;
    associating a first entity with a select node of the nodes;
    presenting a user interface including one or more options at an edge device of the first entity, the options supporting inputs specifying identification of a second entity, sentiment regarding the second entity, and supporting information describing why the sentiment is expressed towards the second entity;
    generating a sentiment document based on the inputs;
    storing the sentiment document at the selected node associated with the first entity;
    forming a query for communication to a resolve node to locate a decentralized identifier associated with the select node;
    forming a request for communication using the decentralized identifier to the select node to obtain data from the sentiment document; and
    displaying a user interface indicative of the sentiment expressed by the first entity towards the second entity based on the data received from the sentiment document.

2. The method of claim 1, wherein the generating of the sentiment document includes:
    obtaining a sentiment schema defining organization of the sentiment document regarding how to specify an entity description, a description of sentiment regarding the second entity, and a description of supporting information of the sentiment document; and
    configuring input data received via the inputs according to the sentiment schema as forming the sentiment document.

3. The method of claim 2, wherein the configuring of the input data according to the sentiment schema is performed using generative artificial intelligence techniques implemented using one or more machine-learning models.

4. The method of claim 1, wherein the inputs specifying the identification of the second entity are configured to cause:
   locating data describing the second entity; and
   configuring the user interface to include options, based on the located data, that are usable to input the sentiment regarding the second entity and supporting information describing why the sentiment is expressed towards the second entity.

5. The method of claim 4, wherein the input specifying the identification of the second entity is provided using a digital image captured by the edge device of the first entity and used to output the user interface.

6. The method of claim 4, wherein the configuring includes:
   determining a type associated with the second entity based on the located data; and
   selecting the options from a plurality of options based on the type.

7. The method of claim 1, wherein the user interface is further configured to receive inputs to specify an application programming interface, via which respective portions of sentiment document data from the sentiment document are accessible.

8. The method of claim 6, wherein the user interface is further configured to specify:
   a type of the located data; and
   an association of the type of the located data with an application programming interface of a plurality of application programming interfaces based on the type.

9. The method of claim 8, wherein each application programming interface of the plurality of application programming interfaces is accessible, respectively, via a respective decentralized identifier of a plurality of decentralized identifiers.

10. The method of claim 1, wherein the forming of the query and the forming of the request is performed as part of a digital wallet that maintains one or more cryptographic keys.

11. A system comprising:
   one or more processors; and
   memory coupled to the one or more processors with instructions stored thereon that, when executed by the one or more processors, cause the one or more processors to perform operations comprising:
      generating a decentralized network of nodes, the nodes individually configured to store, receive, and transmit data based on rules associated with the nodes;
      associating a first entity with a select node of the nodes;
      presenting a user interface including one or more options at an edge device of the first entity, the options supporting inputs specifying identification of a second entity, sentiment regarding the second entity, and supporting information describing why the sentiment is expressed towards the second entity;
      generating a sentiment document based on the inputs;
      storing the sentiment document at the selected node associated with the first entity;
      forming a query for communication to a resolve node to locate a decentralized identifier associated with the select node;
      forming a request for communication using the decentralized identifier to the select node to obtain data from the sentiment document; and
      displaying a user interface indicative of the sentiment expressed by the first entity towards the second entity based on the data received from the sentiment document.

12. The system of claim 11, wherein the generating of the sentiment document includes:
   obtaining a sentiment schema defining organization of the sentiment document regarding how to specify an entity description, a description of sentiment regarding the second entity, and a description of supporting information of the sentiment document; and
   configuring input data received via the inputs according to the sentiment schema as forming the sentiment document.

13. The system of claim 12, wherein the configuring of the input data according to the sentiment schema is performed using generative artificial intelligence techniques implemented using one or more machine-learning models.

14. The system of claim 11, wherein the inputs specifying the identification of the second entity are configured to cause:
   locating data describing the second entity; and
   configuring the user interface to include options, based on the located data, that are usable to input the sentiment regarding the second entity and supporting information describing why the sentiment is expressed towards the second entity.

15. The system of claim 14, wherein the input specifying the identification of the second entity is provided using a digital image captured by the edge device of the first entity and used to output the user interface.

16. The system of claim 14, wherein the configuring includes:
   determining a type associated with the second entity based on the located data; and
   selecting the options from a plurality of options based on the type.

17. A non-transitory computer-readable medium with instructions stored thereon that, when executed by a processor, cause the processor to perform operations comprising:
   generating a decentralized network of nodes, the nodes individually configured to store, receive, and transmit data based on rules associated with the nodes;
   associating a first entity with a select node of the nodes;
   presenting a user interface including one or more options at an edge device of the first entity, the options supporting inputs specifying identification of a second entity, sentiment regarding the second entity, and supporting information describing why the sentiment is expressed towards the second entity;
   generating a sentiment document based on the inputs;
   storing the sentiment document at the selected node associated with the first entity;
   forming a query for communication to a resolve node to locate a decentralized identifier associated with the select node;
   forming a request for communication using the decentralized identifier to the select node to obtain data from the sentiment document; and
   displaying a user interface indicative of the sentiment expressed by the first entity towards the second entity based on the data received from the sentiment document.

18. The non-transitory computer-readable medium of claim 17, wherein the generating of the sentiment document includes:

obtaining a sentiment schema defining organization of the sentiment document regarding how to specify an entity description, a description of sentiment regarding the second entity, and a description of supporting information of the sentiment document; and configuring input data received via the inputs according to the sentiment schema as forming the sentiment document.

19. The non-transitory computer-readable medium of claim 18, wherein the configuring of the input data according to the sentiment schema is performed using generative artificial intelligence techniques implemented using one or more machine-learning models.

20. The non-transitory computer-readable medium of claim 17, wherein the inputs specifying the identification of the second entity are configured to cause:

locating data describing the second entity; and configuring the user interface to include options, based on the located data, that are usable to input the sentiment regarding the second entity and supporting information describing why the sentiment is expressed towards the second entity.

\* \* \* \* \*